US012090753B2

(12) United States Patent
Watari et al.

(10) Patent No.: US 12,090,753 B2
(45) Date of Patent: Sep. 17, 2024

(54) MEDIUM CASSETTE AND IMAGE RECORDING APPARATUS

(71) Applicant: BROTHER KOGYO KABUSHIKI KAISHA, Nagoya (JP)

(72) Inventors: Takahiko Watari, Nagoya (JP); Yuji Hori, Hashima-gun (JP); Masatomo Yamaguchi, Inazawa (JP); Masao Mimoto, Kitanagoya (JP); Shoko Kodama, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 375 days.

(21) Appl. No.: 17/168,327

(22) Filed: Feb. 5, 2021

(65) Prior Publication Data

US 2021/0237492 A1 Aug. 5, 2021

(30) Foreign Application Priority Data

Feb. 5, 2020 (JP) ................................. 2020-017757
Mar. 27, 2020 (JP) ................................. 2020-058443
Mar. 31, 2020 (JP) ................................. 2020-064155

(51) Int. Cl.
*B41J 15/04* (2006.01)
*B65H 7/04* (2006.01)
(Continued)

(52) U.S. Cl.
CPC .............. *B41J 15/044* (2013.01); *B65H 7/04* (2013.01); *B65H 7/14* (2013.01); *B65H 20/02* (2013.01); *G03G 15/6502* (2013.01); *G03G 15/6511* (2013.01); *G03G 15/6517* (2013.01); *B65H 35/06* (2013.01); *B65H 2301/12* (2013.01); *B65H 2701/1131* (2013.01); *B65H 2701/1133* (2013.01); *B65H 2701/182* (2013.01); *B65H 2701/184* (2013.01); *B65H 2801/03* (2013.01)

(58) Field of Classification Search
CPC ............... B41J 15/044; G03G 15/6502; G03G 15/6511; G03G 15/6517; B65H 2301/12; B65H 2701/182; B65H 2701/184; B65H 7/04; B65H 7/14; B65H 20/02; B65H 35/06; B65H 2701/1131; B65H 2701/1133; B65H 2801/03
See application file for complete search history.

(56) References Cited

U.S. PATENT DOCUMENTS 5,072,306 A * 12/1991 Matsumoto ........ H04N 1/00567 399/385
5,130,726 A 7/1992 Fukushima et al.
(Continued)

FOREIGN PATENT DOCUMENTS

JP H02-227271 A 9/1990
JP H02-264559 A 10/1990
(Continued)

*Primary Examiner* — Yaovi M Ameh
(74) *Attorney, Agent, or Firm* — Scully, Scott, Murphy & Presser, P.C.

(57) ABSTRACT

A medium cassette of the present disclosure is a medium cassette configured to be inserted and removed with respect to an apparatus main body and capable of selectively accommodating any recording medium of a roll medium having a continuous medium which is wound in a roll shape and a single sheet medium.

28 Claims, 25 Drawing Sheets

(51) Int. Cl.

| | |
|---|---|
| ***B65H 7/14*** | (2006.01) |
| ***B65H 20/02*** | (2006.01) |
| ***G03G 15/00*** | (2006.01) |
| *B65H 35/06* | (2006.01) |

(56) References Cited

U.S. PATENT DOCUMENTS

| | | | | |
|---|---|---|---|---|
| 5,760,923 | A | 6/1998 | Kenmochi | |
| 2012/0056365 | A1 | 3/2012 | Kato | |
| 2016/0136976 | A1* | 5/2016 | Shinjo | B41J 15/16 347/104 |

FOREIGN PATENT DOCUMENTS

| | | | | | |
|---|---|---|---|---|---|
| JP | H05-333634 | A | | 12/1993 | |
| JP | H06-315065 | A | | 11/1994 | |
| JP | H07-031391 | U | | 6/1995 | |
| JP | H07-187495 | A | | 7/1995 | |
| JP | H10-039556 | A | | 2/1998 | |
| JP | 2000-177884 | A | | 6/2000 | |
| JP | 2003-012167 | A | | 1/2003 | |
| JP | 2006036542 | A | * | 2/2006 | B41J 11/706 |
| JP | 2012-056110 | A | | 3/2012 | |
| JP | 2016-036975 | A | | 3/2016 | |
| JP | 2017-134238 | A | | 8/2017 | |
| JP | 2017-218314 | A | | 12/2017 | |

* cited by examiner

MEDIUM CASSETTE AND IMAGE RECORDING APPARATUS

CROSS-REFERENCE TO RELATED APPLICATIONS

This application is based upon and claims the benefit of priority from prior Japanese patent application No. 2020-017757 filed on Feb. 5, 2020, Japanese patent application No. 2020-058443 filed on Mar. 27, 2020, and Japanese patent application No. 2020-064155 filed on Mar. 31, 2020, the entire contents of which are incorporated herein by reference.

TECHNICAL FIELD

Aspects of the present disclosure relates to a medium cassette in which any recording medium of a roll medium and a single sheet medium can be selectively accommodated, and an image recording apparatus having the medium cassette.

BACKGROUND ART

Related-art discloses a feeder device configured to rotate a spool passing through a roll sheet in forward and reverse directions and to determine whether a recording medium is a cut sheet or a roll sheet based on a change in amount of bending of the recording medium.

In addition, for example, related-art discloses an image recording apparatus configured to selectively set a cut sheet or a roll sheet. In order to know which of the cut sheet and the roll sheet is set, the image recording apparatus is provided with a tip end detection sensor. The tip end detection sensor is provided in a positional relation with respect to the cut sheet and the roll sheet so as to output a signal indicating that there is no sheet in a state where the cut sheet is set and to output a signal indicating that there is a sheet in a state where the roll sheet is set.

Related-art also discloses a recording apparatus capable of determining whether the recording medium is the cut sheet or the roll sheet by rotating the spool capable of supporting the roll sheet in the forward and reverse directions. In the recording apparatus, the spool is rotated in the forward and reverse directions in a state where the recording medium is nipped at a nip position downstream of the spool with respect to a conveying direction of the recording medium. In a case where the recording medium is the roll sheet, a tension in the recording medium upstream of the nip position with respect to the conveying direction varies and an amount of bending changes, in conformity to the operation of rotating the spool in the forward and reverse directions. On the other hand, in a case where the recording medium is the cut sheet, since a part of the recording medium upstream of the nip position with respect to the conveying direction is not fixed, the tension in the recording medium does not change, even though the spool is rotated in the forward and reverse directions. Therefore, it is possible to determine whether the recording medium is the cut sheet or the roll sheet, based on the change in amount of bending of the recording medium when the spool is rotated in the forward and reverse directions.

In the feeder device disclosed in related-art, the roll sheet is set in the feeder device with the spool passing therethrough, and when replacing the roll sheet, the spool is taken out, and the spool is again enabled to pass through a new roll sheet, which is then set in the feeder device. In a support configuration for the roll sheet in the feeder device, the replacement operation for the roll sheet may be troublesome. For example, when supporting the new roll sheet in the feeder device, it may be necessary to perform an operation of adjusting a position of the roll sheet so that the spool passing through the roll sheet is appropriately mounted.

Further, in general, when performing image formation with the roll sheet being set, a conveying resistance changes depending on a residual amount of the roll sheet. That is, when consumption of the roll sheet is small and the residual amount is large, a weight of the entire roll is heavy, so that the conveying resistance is large. When the roll sheet is consumed and the residual amount is correspondingly reduced, the weight of the entire roll become lighter and the conveying resistance is reduced. Therefore, in order to keep the high conveying accuracy, it is necessary to perform an appropriate conveying control, such as adjustment of torque according to the residual amount of the roll sheet.

In the image recording apparatus disclosed in related-art, the tip end detection sensor can detect that the roll sheet is set. However, it is not possible to detect the residual amount of the set roll sheet. For this reason, it is necessary to newly provide a separate sensor so as to detect the residual amount of the roll sheet, which increases the manufacturing cost and enlarges the apparatus.

Further, examples of the roll sheet include a roll sheet whose rear end portion is not fixed to a winding core and a roll sheet whose rear end portion is fixed to a winding core. In the related-art recording apparatus, when the roll sheet whose rear end portion is not fixed to a winding core has run out, a part of the recording medium upstream of the nip position with respect to the conveying direction is in an unfixed state, so that it may be erroneously detected as a cut sheet. In a case of a roll sheet whose rear end portion is fixed to a winding core, when rotating the spool in the forward and reverse directions at the time the sheet has run out, a change aspect in amount of bending of the recording medium is different from before the sheet has run out. As a result, it may not be possible to accurately detect that the sheet has run out.

SUMMARY

Regarding the replacement operation for the roll sheet, the present inventor studied a configuration of a medium cassette having a support part configured to support a roll medium in contact with an outer peripheral surface of a lower part of the roll medium, so as to facilitate the replacement operation for the roll medium (for example, the roll sheet). Note that, the related-art does not disclose technology for determining which of the cut sheet and the roll sheet is set, in the configuration where the roll sheet is supported from below by the support part. In such configuration, when recording an image on a continuous medium configuring the roll medium, a single sheet medium (for example, the cut sheet) may be accommodated in the medium cassette in a state where it is not possible to detect whether a medium supported on the support part in the medium cassette is a roll medium. In this case, an image is erroneously recorded on the single sheet medium, so that the single sheet medium, a recording agent and time are wasted.

An aspect of the present disclosure provides a medium cassette and an image recording apparatus capable of facilitating a replacement operation for a roll medium and detecting whether a roll medium is supported on a support part.

Another aspect of the present disclosure provides an image recording apparatus capable of executing, with one sensor, both identification as to which of a single sheet medium or a roll medium is set and detection of a residual amount when the roll medium is set.

Another aspect of the present disclosure provides an image recording apparatus capable of determining whether a recording medium accommodated in a medium cassette is a roll medium or a single sheet medium and also correctly determining that the roll medium has run out.

According to an aspect of the present disclosure, there is provided a medium cassette configured to be inserted and removed with respect to an apparatus main body and capable of selectively accommodating any recording medium of a roll medium having a continuous medium which is wound in a roll shape and a single sheet medium.

According to another aspect of the present disclosure, there is provided an image recording apparatus including: the above-described medium cassette according; and the apparatus main body, wherein the medium cassette further includes: a support part configured to rotatably support the roll medium by contacting an outer peripheral surface of a lower part of the roll medium accommodated in the medium cassette, and a sensor configured to output a signal as to whether the roll medium is supported on the support part, wherein the apparatus main body is provided therein with: a conveying mechanism configured to convey the continuous medium of the roll medium or the single sheet medium accommodated in the medium cassette, a recording unit configured to record an image on the continuous medium or the single sheet medium which is conveyed by the conveying mechanism, and a controller configured to control the conveying mechanism and the recording unit, and wherein the controller permits image recording on the continuous medium of the roll medium in a case where it is determined based on the signal that the roll medium is supported on the support part, and does not permit image recording on the continuous medium of the roll medium in a case where it is determined based on the signal that the roll medium is not supported on the support part.

According to another aspect of the present disclosure, there is provided an image recording apparatus including: the above-described medium cassette; a recording unit configured to record an image on the roll medium or the single sheet medium; and an optical sensor provided above the medium cassette and including a light-emitting unit and a light-receiving unit, wherein the optical sensor is arranged so that an optical axis of emission light from the light-emitting unit is inclined at an inclination at which reflected light from the single sheet medium is not received by the light-receiving unit and reflected light from the roll medium is received by the light-receiving unit.

According to another aspect of the present disclosure, there is provided an image recording apparatus including: the above-described medium cassette; a feeding unit configured to feed the recording medium from the medium cassette; and a recording unit configured to record an image on the recording medium fed from the medium cassette by the feeding unit, wherein the medium cassette includes: a support part configured to rotatably support the roll medium by contacting an outer peripheral surface of a lower part of the roll medium accommodated in the medium cassette; a first sensor configured to detect whether the roll medium is supported on the support part; and a second sensor configured to detect whether the recording medium exists at a detection position, the detection position being located on a path which is between the support part and the feeding unit and through which the recording medium unwound from the roll medium passes.

DESCRIPTION OF EMBODIMENTS

First Embodiment

Figure 1:
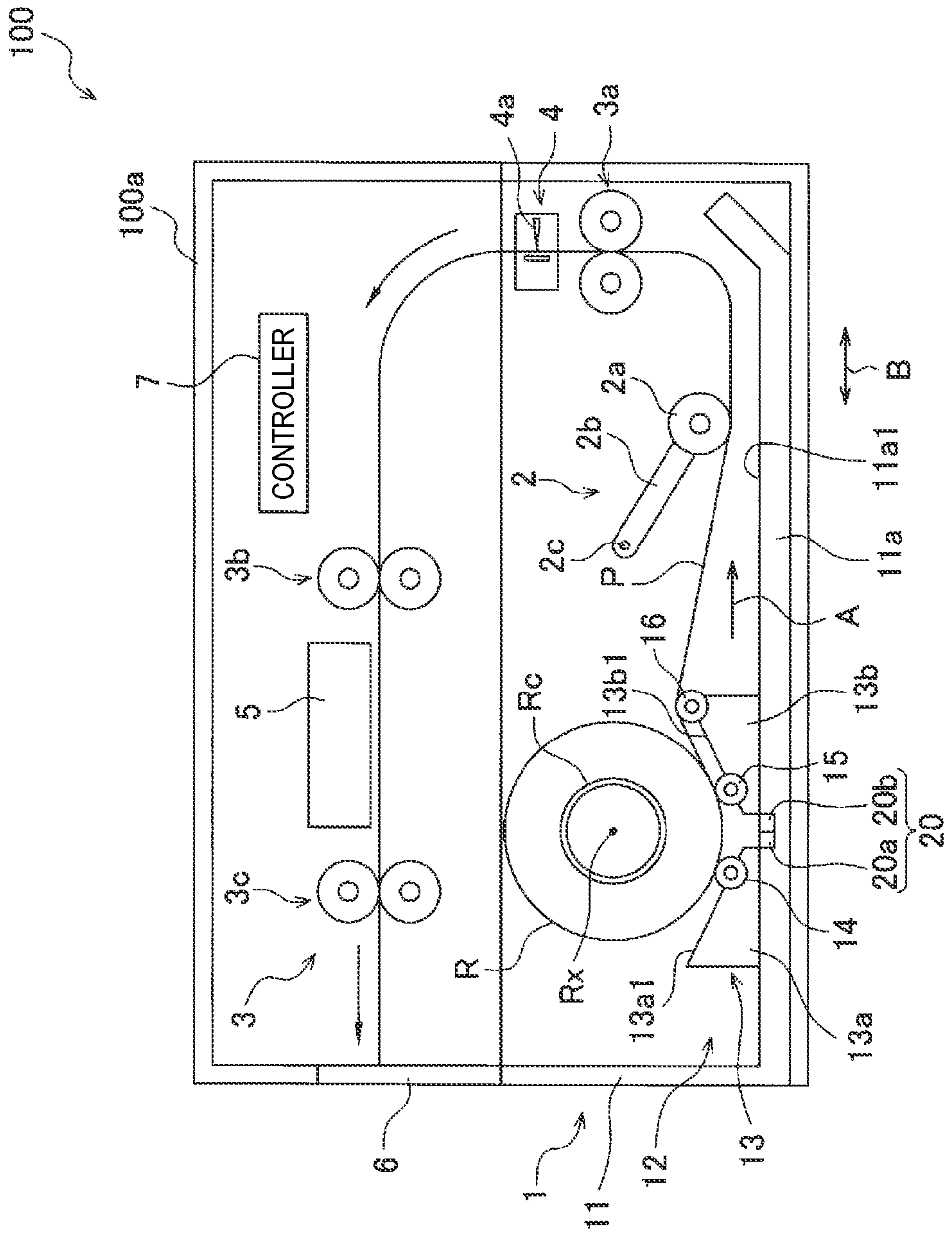
FIG. 1 is a schematic configuration view of a printer in which a sheet feeding cassette in accordance with a first embodiment of the present disclosure is adopted.

Hereinbelow, a printer 100 in which a sheet feeding cassette 1 in accordance with a first embodiment of the present disclosure is adopted will be described.

The printer 100 includes a housing 100*a*, a sheet feeding cassette 1, a sheet feeding unit 2, a conveying unit 3, a cutting unit 4, a head 5, a sheet discharge tray 6, and a controller 7. The sheet feeding cassette (medium cassette) 1 can be detachably mounted to a lower part of the housing 100*a*. The sheet discharge tray 6 configures one side wall of an upper part of the housing 100*a*, and can be opened and closed with respect to the housing 100*a*.

In the sheet feeding cassette 1, a roll sheet R corresponding to the "roll medium" of the present disclosure and a cut sheet K (shown with the dashed-dotted line in FIG. 2) corresponding to the "single sheet medium" of the present disclosure can be selectively accommodated. The roll sheet R has a configuration where a sheet P corresponding to the "continuous medium" of the present disclosure is wound in a roll shape on an outer peripheral surface of a cylindrical core member (paper tube) Rc. The roll sheet R is arranged so that an axis direction (a perpendicular direction to the drawing sheet of FIG. 1) along a rotation axis Rx (a central axis of the core member Rc) is perpendicular to a vertical direction. The axis direction of the rotation axis Rx also corresponds to a width direction of the sheet P. Also, in the present embodiment, an unwinding direction A of the sheet P from the roll sheet R is substantially the right direction, as shown in FIG. 1. The cut sheet K is partially arranged on a support part 12, which will be described later, or the support part 12 is demounted and the cut sheet K is entirely arranged on a bottom surface 11*a*1 of a tray 11, which will be described later.

As shown in FIG. 1, the sheet feeding cassette 1 includes a tray 11, a support part 12 configured to rotatably support the roll sheet R with supporting an outer peripheral surface of a lower part of the roll sheet R, and an optical sensor 20. The tray 11 has a box shape opened upward, and is configured to selectively accommodate the roll sheet R and the cut sheet K. The support part 12 includes a support base 13, and three rollers 14 to 16.

Figure 2A:
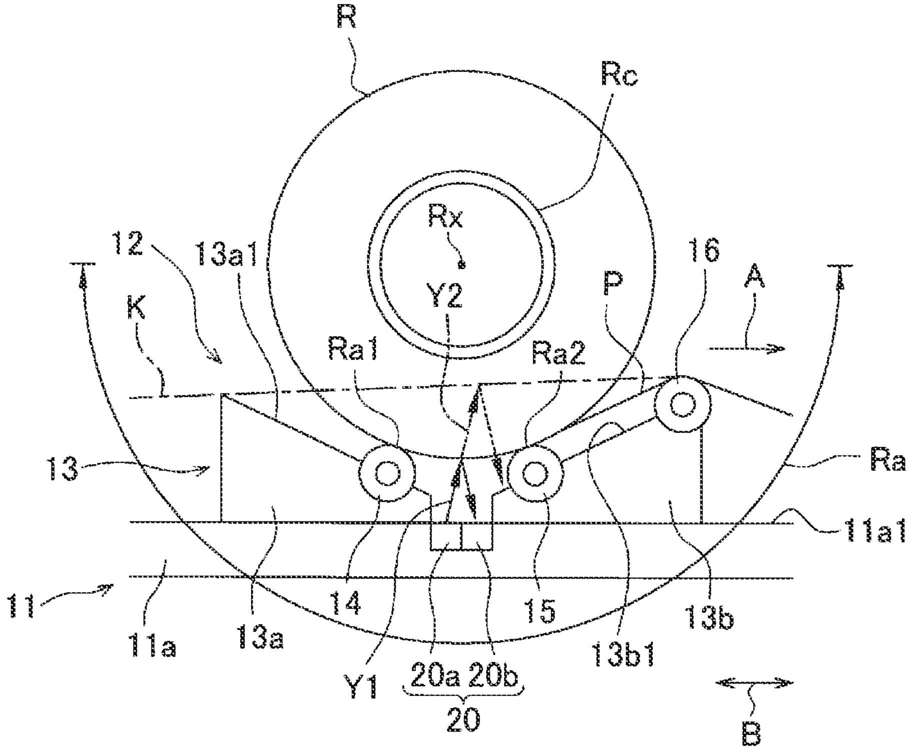
FIG. 2A is a partially enlarged view of the sheet feeding cassette, depicting a situation where a sheet of a roll sheet is wound in two or more turns.
Figure 2B:
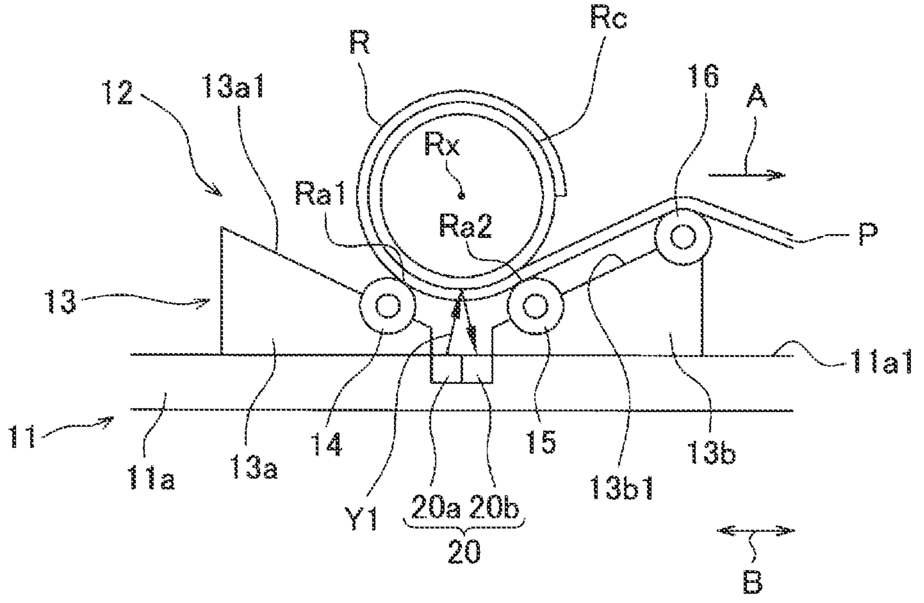
FIG. 2B is a partially enlarged view of the sheet feeding cassette, depicting a situation where a sheet of a roll sheet is wound in one turn.

As shown in FIGS. 2A and 2B, the support base 13 includes two base parts 13*a* and 13*b* arranged apart from each other in a horizontal direction B perpendicular to the rotation axis Rx. The two base parts 13*a* and 13*b* are provided to be detachably mounted on a bottom part 11*a* of the tray 11. Also, each of the base parts 13*a* and 13*b* extends lengthwise in the axis direction of the rotation axis Rx. In the present embodiment, the base parts 13*a* and 13*b* are formed to be slightly longer than a width of the sheet P, i.e., the roll sheet R. The base part 13*a* is arranged on a further upstream side (a left side in FIG. 1) than the rotation axis Rx of the roll sheet R supported on the support part 12 with respect to the unwinding direction A. The base part 13*a* has an inclined surface 13*a*1 that is inclined downward toward the unwinding direction A. The base part 13*b* is arranged on a further downstream side (a right side in FIG. 1) than the rotation axis Rx of the roll sheet R supported on the support part 12 with respect to the unwinding direction A. The base part 13*b* has an inclined surface 13*b*1 that is inclined upward toward the unwinding direction A. In other words, the two inclined surfaces 13*a*1 and 13*b*1 of the support base 13 are each inclined so that a height from the bottom surface 11*a*1 of the tray 11 increases in the horizontal direction B as a distance from the rotation axis Rx increases.

The three rollers 14 to 16 also extend lengthwise in the axis direction of the rotation axis Rx, and are each formed to be slightly greater than the width of the roll sheet R. Note that, the rollers 14 to 16 may also be each configured by a plurality of divided rollers arranged apart from each other in the axis direction of the rotation axis Rx. The roller 14 is rotatably supported on the base part 13*a*. The roller 14 is also arranged on a lower side of the inclined surface 13*a*1. The two rollers 15 and 16 are rotatably supported on the base part 13*b*. The roller 15 is arranged on a lower side of the inclined surface 13*b*1, and the roller 16 is arranged on an upper side of the inclined surface 13*b*1. The two rollers 14 and 15 are configured to support the roll sheet R from below in contact with an outer peripheral surface of a lower part of the roll sheet R, in the present embodiment, in contact with a lower semicircular region Ra of the outer peripheral surface of the roll sheet R, as shown in FIG. 2A. The two rollers 14 and 15 are also configured to support the roll sheet R in contact with the outer peripheral surface (lower semicircular region Ra) of the roll sheet R at two contact places Ra1 and Ra2 at which a lower end of the roll sheet R is sandwiched in the horizontal direction B.

The optical sensor 20 is arranged on the bottom part 11*a* of the tray 11. More specifically, the optical sensor 20 is arranged at a position between the two base parts 13*a* and 13*b* of the support base 13 and is capable of facing the lower end of the roll sheet R arranged on the support base 13. That is, the optical sensor 20 is arranged at a position, which is located lower than the contact places Ra1 and Ra2 of the roll sheet R in contact with the two rollers 14 and 15 and faces the lower end of the roll sheet R, and is configured to detect the lower end of the roll sheet R. The optical sensor 20 includes a light-emitting element 20*a* and a light-receiving element 20*b*. As shown with a solid line arrow in FIG. 2, the light-emitting element 20*a* is configured to emit light toward the outer peripheral surface of the roll sheet R. As shown with a solid line arrow Y1 in FIG. 2A, the light-receiving element 20*b* is configured to receive the light emitted from the light-emitting element 20*a* and reflected on the outer peripheral surface of the roll sheet R. Note that, a surface of the core member Rc has a light reflectance lower than that of the sheet P. Also, the light-emitting element 20*a* and the light-receiving element 20*b* are arranged so that the light emitted from the light-emitting element 20*a* is reflected on the roll sheet R and is then received by the light-receiving element 20*b*. As shown in FIG. 2A, in a case where the cut sheet K instead of the roll sheet R is arranged to overlap the support base 13, even though the light emitted from the light-emitting element 20*a* is reflected on the cut sheet K, the reflected light is directed toward a lower part of the inclined surface 13*b*1 and is not received by the light-receiving element 20*b*, as shown with a dashed-two dotted line arrow Y2 in FIG. 2A. Even if the support part 12 is demounted from the bottom part 11*a* and the cut sheet K is then arranged on the bottom surface 11*a*1, the light-emitting element 20*a* is directly covered by the cut sheet K, so that the light-receiving element 20*b* cannot receive the light emitted from the light-emitting element 20*a*.

Also, as shown in FIG. 2B, in a near empty state where a residual amount of the sheet P of the roll sheet R is reduced to such extent that only one turn of the sheet is wound on the core member Rc, the light-receiving element 20*b* receives the reflected light emitted from the light-emitting element 20*a* and reflected from the sheet P and the core member Rc via the sheet P. At this time, an amount of received light is smaller than a case where the sheet P is stacked by two or more layers and is larger than a case where the sheet P is not stacked and the reflected light directly reflected on the core member Rc is received. Note that, the state where the sheet P is stacked by two or more layers is a state where two or more turns of the sheet P remain wound on the core member Rc. At this time, the light-receiving element 20*b* receives the reflected light reflected on the outermost sheet P and the sheet P adjacent to the outermost sheet P. The light-receiving element 20*b* is configured to output a signal indicating each amount of received light (i.e., a signal indicating whether the roll sheet R is supported on the support part 13) to the controller 7.

Figure 3:
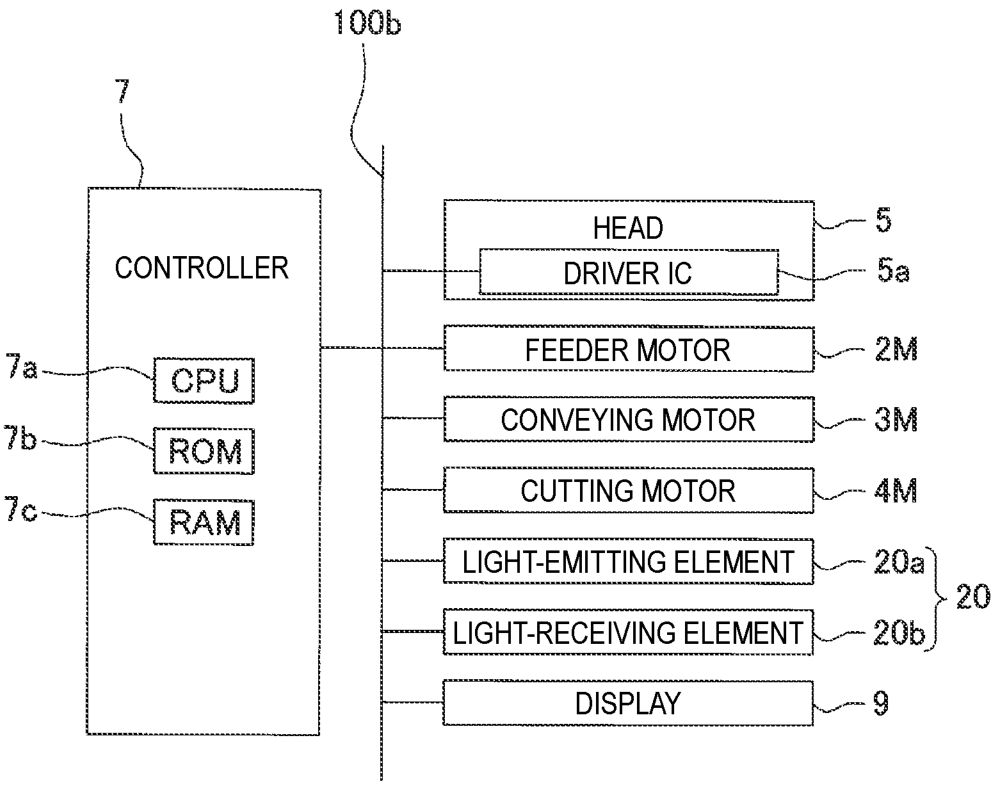
FIG. 3 is a block diagram of a controller.

The sheet feeding unit 2 includes a feeder roller 2*a*, an arm 2*b*, and a feeder motor 2M (refer to FIG. 3). The feeder roller 2*a* is pivotally supported by a tip end of the arm 2*b*. The arm 2*b* is rotatably supported by a support shaft 2*c*, and is urged to rotate downward by a spring or the like so that the feeder roller 2*a* is in contact with the tray 11. The arm 2*b* is also configured to retreat upward when mounting and demounting the tray 11. When the feeder motor 2M is driven under control of the controller 7, power of the feeder motor 2M is transmitted to the feeder roller 2*a* via a transmission mechanism (not shown), so that the feeder roller 2*a* is rotated to feed the sheet P of the roll sheet R or the cut sheet K accommodated in the tray 11.

The conveying unit 3 includes three sets of conveying roller pairs 3*a* to 3*c*, and a conveying motor 3M (refer to FIG. 3). The conveying roller pairs 3*a* to 3*c* are each configured by a drive roller configured to rotate by drive of the conveying motor 3M and a driven roller configured to rotate in conjunction with the drive roller. The conveying motor 3M is driven under control of the controller 7 and each of the conveying roller pairs 3*a* to 3*c* rotates while sandwiching the sheet P or the cut sheet K, so that the sheet P or the cut sheet K is conveyed.

The cutting unit 4 is arranged above the conveying roller pair 3*a*. The cutting unit 4 includes a cutter 4*a*, and a cutting motor 4M (refer to FIG. 3) configured to drive the cutter 4*a*. The cutting motor 4M is driven under control of the controller 7, so that the sheet P unwound from the roll sheet R is cut by the cutter 4*a*. Thereby, a rear end of the sheet P is formed.

The head 5 includes a plurality of nozzles (not shown) formed in a lower surface thereof, and a driver IC 5*a* (refer to FIG. 3). When the driver IC 5*a* is driven under control of the controller 7, ink is ejected from the nozzles, so that an image is recorded on the sheet P or the cut sheet K conveyed by the conveying unit 3. Note that, the head 5 corresponds to the "recording unit" of the present disclosure, and may be a line type configured to eject ink from nozzles in a position fixed state or a serial type configured to eject ink from nozzles while moving in the axis direction of the rotation axis Rx. The sheet P having an image recorded by the head 5 and cut by the cutter 4*a* is accommodated on the sheet discharge tray 6 opened with respect to the housing 100*a*.

As shown in FIG. 3, the controller 7 is connected to the feeder motor 2M, the conveying motor 3M, the driver IC 5*a*, the cutting motor 4M, the light-emitting element 20*a*, the light-receiving element 20*b* and a display 9 via an internal bus 100*b*. The display 9 is provided on an outer surface of the housing 100*a*. The controller 7 is configured to transmit a signal relating to light-emitting to the light-emitting element 20*a*, and to receive a signal indicative of an amount of received light from the light-receiving element 20*b*.

The controller 7 includes a CPU (Central Processing Unit) 7*a*, a ROM (Read Only Memory) 7*b* and a RAM (Random Access Memory) 7*c*. In the ROM 7*b*, programs and data necessary for the CPU 7*a* to execute a variety of controls are stored. In the RAM 7*c*, data that is used when the CPU 7*a* executes the programs is temporarily stored.

Figure 4:
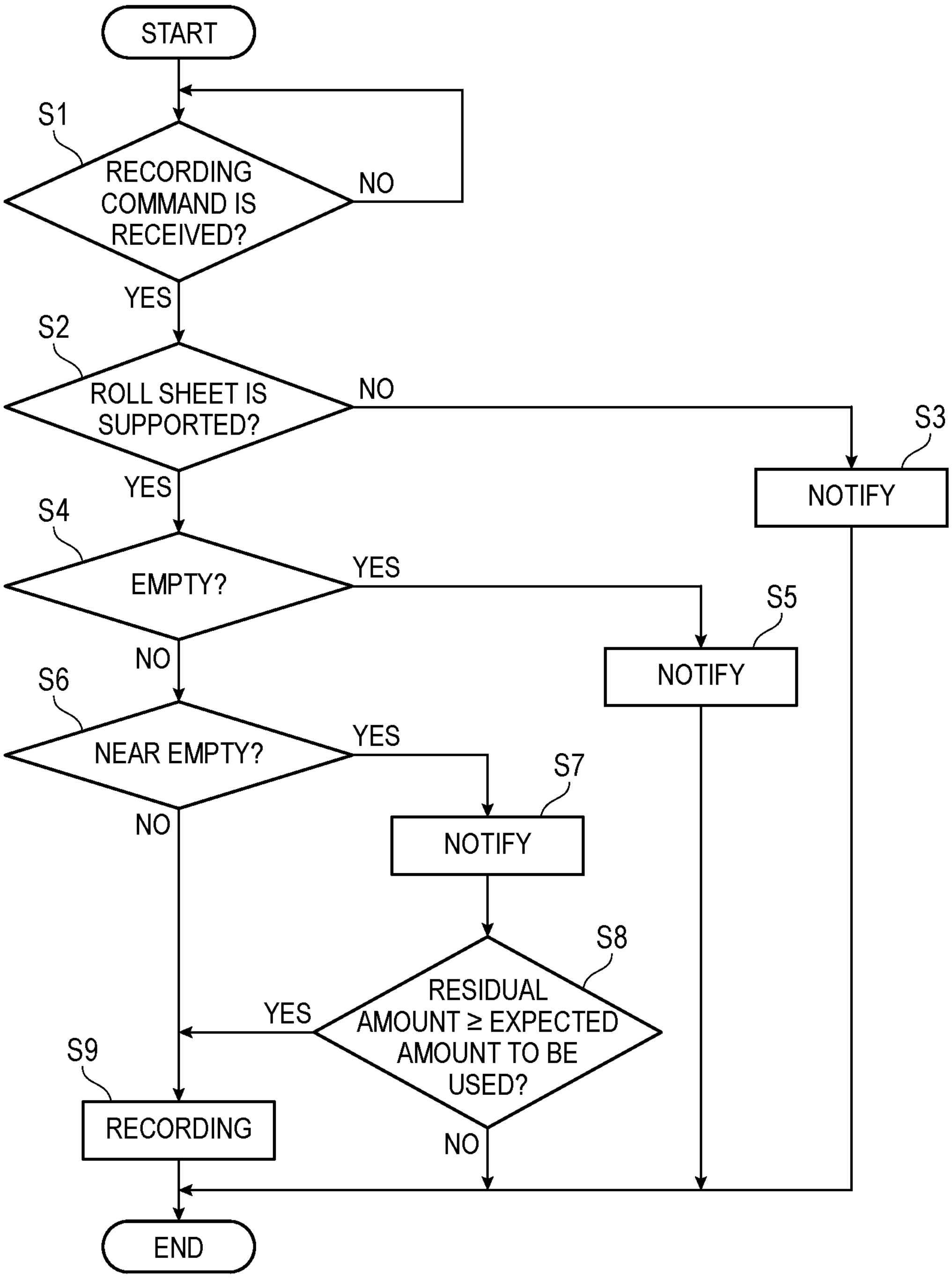
FIG. 4 is a flowchart depicting processing that is executed by the controller of the printer shown in FIG. 1.

Subsequently, processing that is executed by the controller 7 is described with reference to FIG. 4. Note that, in the below, processing that is executed when a recording command for roll sheet, which is for recording an image on the roll sheet R, is received is described.

The controller 7 first determines whether a recording command for roll sheet including image data and the like is received from an external apparatus such as a PC (Personal Computer) (S1). In a case where it is determined that the recording command is not received (S1: NO), the controller 7 repeats the processing of S1.

In a case where it is determined that the recording command is received (S1: YES), the controller 7 transmits a light-emitting relating signal to the light-emitting element 20*a*, and determines whether a signal indicative of an amount of received light is received from the light-receiving element 20*b*. That is, the controller 7 determines whether the roll sheet R is supported on the support part 12 by receiving the signal indicative of an amount of received light (S2).

In a case where it is determined that the signal indicative of an amount of received light is not received (S2: NO), the controller 7 determines that the roll sheet R is not supported on the support part 12, and displays an image, which indicates that the roll sheet R is not accommodated in the sheet feeding cassette 1, on the display 9, thereby notifying the same to the user (S3). Then, the controller 7 does not permit image recording on the sheet P, based on the determination result in S2, and ends the flow.

In a case where it is determined that the signal indicative of an amount of received light is received (S2: YES), the controller 7 determines whether a residual amount of the sheet P is empty, according to the amount of received light based on the signal indicative of the amount of received light (S4). In a case where it is determined that a residual amount of the sheet P is empty (S4: YES), the controller 7 displays an image, which indicates that the residual amount of the sheet P of the roll sheet R is empty, on the display 9, thereby notifying the same to the user (S5). Then, the controller 7 ends the flow.

In a case where it is determined that a residual amount of the sheet P is not empty (S4: NO), the controller 7 determines whether a residual amount of the sheet P is near empty, according to the amount of received light based on the signal indicative of the amount of received light (S6). In a case where it is determined that a residual amount of the sheet P is near empty (S6: YES), the controller 7 displays an image, which indicates that the residual amount of the sheet P of the roll sheet R is near empty (the residual amount is small), on the display 9, thereby notifying the same to the user (S7).

After the processing of S7, the controller 7 determines whether the residual amount of the sheet P of the roll sheet R in the near empty state is equal to or larger than an expected amount to be used (a length of the sheet P that is deduced from the image data included in the recording command received in S1 and is used for recording relating to the recording command) (S8).

In a case where it is determined that the residual amount of the sheet Pis smaller than the expected amount to be used (S8: NO), the controller 7 ends the flow. On the other hand, in a case where it is determined that the residual amount of the sheet P is equal to or larger than the expected amount to be used (S8: YES), the controller 7 proceeds to S9.

In a case where it is determined in S6 that the residual amount of the sheet P is not near empty (S6: NO), or in a case where it is determined in S8 that the residual amount of the sheet P is equal to or larger than the expected amount to be used (S8: YES), the controller 7 executes recording processing (S9). That is, in a case where it is determined in S2 that the roll sheet R is supported and then the flow proceeds to S9, the controller 7 permits image recording. In S9, the controller 7 causes the sheet feeding unit 2 and the conveying unit 3 to convey the sheet P, the head 5 to record an image on the sheet P and the cutting unit 4 to cut the sheet P, based on the recording command received in S1. In this way, after the recording processing is executed, the flow is over.

As described above, according to the sheet feeding cassette 1 and the printer 100 of the first embodiment, the support part 12 supports the roll sheet R by contacting the outer peripheral surface (lower semicircular region Ra) of the lower part of the roll sheet R. For this reason, it is not necessary to perform an operation of adjusting a position of the roll sheet R, which facilitates a replacement operation for the roll sheet R. Also, it is determined whether the roll sheet R is supported on the support part 12, based on the signal output from the optical sensor 20 (S2). In a case where it is determined that the roll sheet R is supported on the support part 12, the image recording on the sheet P of the roll sheet R is permitted (S2: YES), and in a case where it is determined that the roll sheet R is not supported on the support part 12, the image recording on the sheet P of the roll sheet R is not permitted (S2: NO). For this reason, when recording an image on the sheet P of the roll sheet R (S9), even when the cut sheet K is accommodated in the sheet feeding cassette 1, it is possible to suppress a situation where an image is erroneously recorded on the cut sheet K and thus, the cut sheet K, a recording agent (ink) and time are wasted.

The support part 12 is configured to support the roll sheet R by contacting the outer peripheral surface of the lower part of the roll sheet R at the two contact places Ra1 and Ra2 at which the lower end of the roll sheet R is sandwiched in the horizontal direction B. That is, the lower end of the roll sheet R is locate between the two contact places Ra1 and Ra2 in the horizontal direction B. Thereby, even when the roll sheet R rotates around the rotation axis Rx, the roll sheet R is difficult to fall off from the support part 12.

In addition, the support part 12 includes the two rollers 14 and 15 which are capable of rotating about the rotation axis parallel to the rotation axis Rx while being in contact with the outer peripheral surface of the lower part of the roll sheet R at the two contact places Ra1 and Ra2. Thereby, it is possible to support the roll sheet R from below while enabling smooth rotation around the rotation axis of the roll sheet R.

The optical sensor 20 is arranged to detect the lower end of the roll sheet R below the two contact places Ra1 and Ra2 of the outer peripheral surface of the roll sheet R at which the two rollers 14 and 15 come into contact. Thereby, it is possible to detect the lower end of the roll sheet R supported on the support part 12 by the optical sensor 20. Also, in a case where the roll sheet R has the sheet P wound on the core member Rc and the light reflectances of the core member Rc and the sheet P are different from each other, when the roll sheet is in the near empty state where only one turn of the sheet Pis wound on the core member Rc, for example, the light reflected from the sheet P and the core member Rc via the sheet P is received, so that it is possible to detect the near empty state where the residual amount of the sheet P of the roll sheet R is small. In addition, by detecting a terminal end of the sheet P (a boundary between the sheet P and the core member Rc), it is also possible to detect an empty state where there is no residual amount of the sheet P of the roll sheet R.

Figure 5:
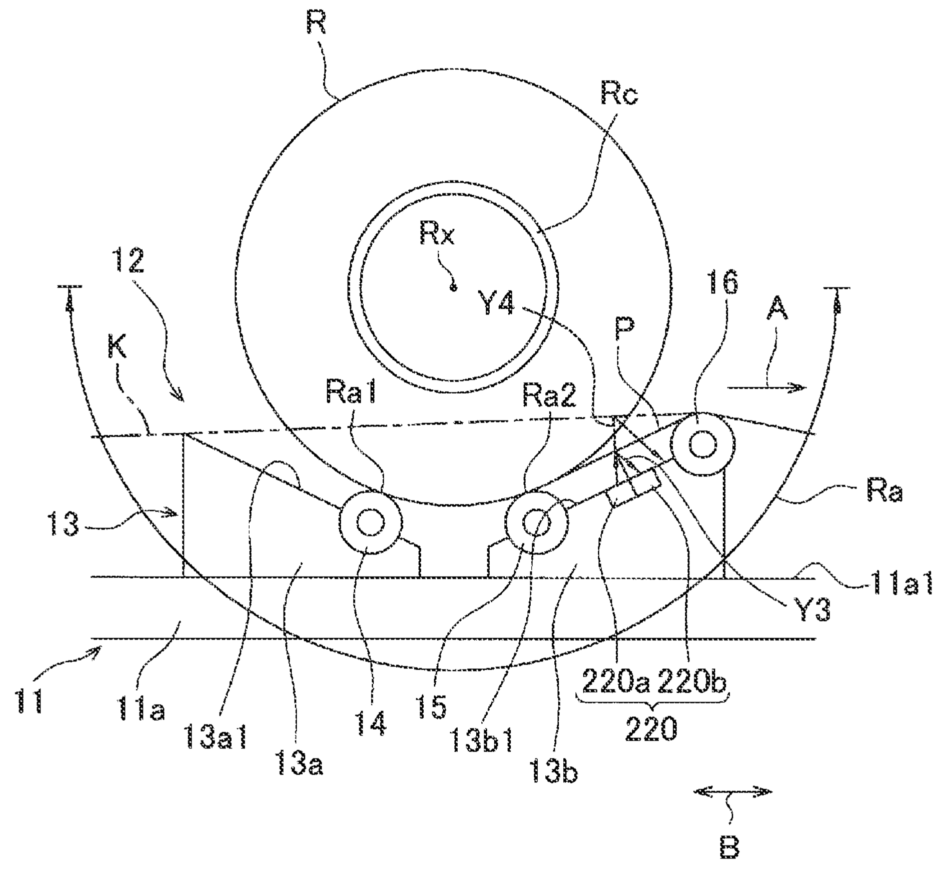
FIG. 5 is a partially enlarged view of a sheet feeding cassette in accordance with a first modified embodiment of the first embodiment of the present disclosure.

In the first embodiment, the optical sensor 20 is arranged on the bottom part 11*a* of the tray 11 but may also be arranged on the support base 13, for example. In a first modified embodiment, as shown in FIG. 5, an optical sensor 220 has a similar configuration to the optical sensor 20, except an arrangement position. The similar parts to the above embodiment are denoted with the same reference signs, and the detailed descriptions thereof are omitted.

In the present modified embodiment, as shown in FIG. 5, the optical sensor 220 is arranged on the inclined surface 13*b*1 of the base part 13*b* of the support base 13. Also, the optical sensor 220 is arranged to face the sheet P unwound from the roll sheet R supported on the support base 13 via the two rollers 14 and 15 and following the inclined surface 13*b*1 and is configured to detect the sheet P. More specifically, the optical sensor 220 also includes a light-emitting element 220*a* and a light-receiving element 220*b*. As shown with a solid line arrow Y3 in FIG. 5, the light-emitting element 220*a* is configured to emit light toward the sheet P unwound the roll sheet R. As shown with the solid line arrow Y3 in FIG. 5, the light-receiving element 220*b* is configured to receive the light emitted from the light-emitting element 220*a* and reflected on the sheet P. Note that, the light emitted from the light-emitting element 220*a* is not received by the light-receiving element 220*b* in a state where the sheet P of the roll sheet R has run out. Also, as shown in FIG. 5, in a case where the cut sheet K instead of the roll sheet R is arranged to overlap the support base 13, even when the light emitted from the light-emitting element 20*a* is reflected on the cut sheet K, the reflected light is shifted from the light-receiving element 220*b* toward the roller 16 and is not received by the light-receiving element 220*b*, as shown with a dashed-two dotted line arrow Y4 in FIG. 5. Even if the support base 13 is demounted from the bottom surface 11*a*1 of the tray 11 and the cut sheet K is then arranged on the bottom surface 11*a*1, the optical sensor 220 itself is demounted, so that the sheet P cannot be detected.

In this way, the optical sensor 220 is arranged on the inclined surface 13*b*1, so that it is possible to detect whether there is the sheet P unwound from the roll sheet R. For this reason, similarly to the processing of S2 in the above embodiment, the controller 7 can determine whether the roll sheet R is supported on the support part 12 by receiving the signal indicative of the amount of received light. Therefore, like the above embodiment, when recording an image on the sheet P of the roll sheet R, even though the cut sheet K is accommodated in the sheet feeding cassette 1, it is possible to suppress a situation where an image is erroneously recorded on the cut sheet K and thus, the cut sheet K, a recording agent (ink) and time are wasted. In addition, since it is possible to detect that the sheet P has run out, it is possible to detect that the sheet P of the roll sheet R is in an empty state.

Figure 6:
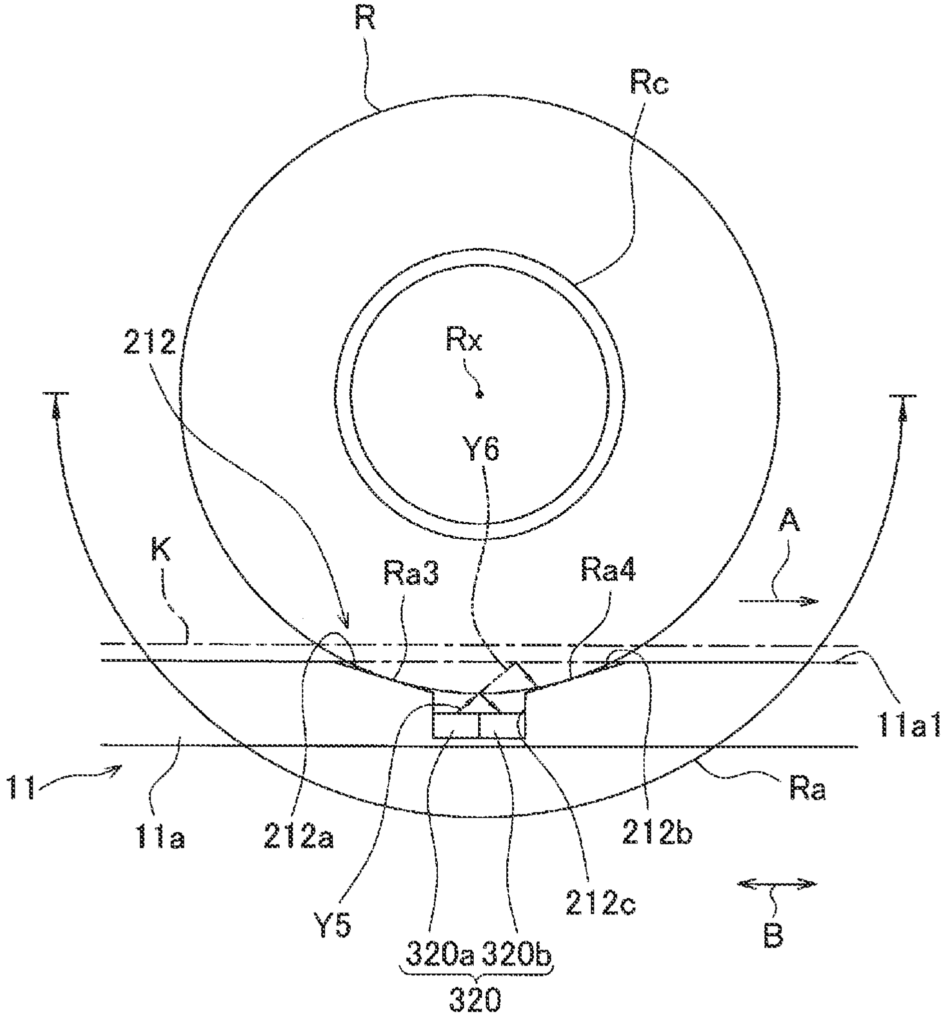
FIG. 6 is a partially enlarged view of a sheet feeding cassette in accordance with a second modified embodiment of the first embodiment of the present disclosure.

In the first embodiment and the first modified embodiment, the roll sheet R is supported on the support base 13 via the two rollers 14 and 15. However, the support base 13 may be demounted from the bottom part 11*a*, a support part 212 may be directly formed on the bottom part 11*a* of the tray 11, and the roll sheet R may be supported on the support part 212. The support part 212 of a second modified embodiment has a concave shape opened upward, as shown in FIG. 6. The support part 212 has two inclined surfaces 212*a* and 212*b* and a groove portion 212*c* arranged between the inclined surfaces 212*a* and 212*b*, and extends lengthwise in the axis direction of the rotation axis Rx of the roll sheet R. The two inclined surfaces 212*a* and 212*b* are located higher than the groove portion 212*c* and in the vicinity of the opening of the support part 212, and lower ends thereof are each connected to an upper end of the groove portion 212*c*. The inclined surface 212*a* is arranged on a further upstream side (a left side in FIG. 6) than the rotation axis Rx of the roll sheet R supported on the support part 212 with respect to the unwinding direction A, and is inclined downward toward the unwinding direction A. The inclined surface 212*b* is arranged on a further downstream side (a right side in FIG. 6) than the rotation axis Rx of the roll sheet R supported on the support part 212 with respect to the unwinding direction A, and is inclined upward toward the unwinding direction A. In other words, the two inclined surfaces 212*a* and 212*b* of the support part 212 are each inclined so that a height from the bottom surface 11*a*1 increases in the horizontal direction B as a distance from the rotation axis Rx increases. The roll sheet R is arranged on the inclined surfaces 212*a* and 212*b*, so that the roll sheet R comes into contact with the inclined surfaces 212*a* and 212*b* at two contact places Ra3 and Ra4 of the outer peripheral surface (lower semicircular region Ra) of the lower part of the roll sheet R and is stably arranged in the tray 11. Note that, the inclined surfaces 212*a* and 212*b* may be provided with rollers for supporting the roll sheet R, and the rollers may support the outer peripheral surface of the lower part of the roll sheet R. An optical sensor 320 similar to the optical sensor 20 is arranged at a center of the groove portion 212 in the axis direction of the rotation axis Rx.

As shown in FIG. 6, the optical sensor 320 of the present modified embodiment is arranged at a position facing the lower end of the roll sheet R supported on the two inclined surfaces 212*a* and 212*b*, and is configured to detect the lower end of the roll sheet R. More specifically, the optical sensor 320 also includes a light-emitting element 320*a* and a light-receiving element 320*b*. As shown with a solid line arrow Y5 in FIG. 6, the light-emitting element 320*a* is configured to emit light toward the outer peripheral surface of the roll sheet R. As shown with the solid line arrow Y5 in FIG. 6, the light-receiving element 320*b* is configured to receive the light emitted from the light-emitting element 320*a* and reflected on the outer peripheral surface of the roll sheet R. Note that, the optical sensor 320 of the present modified embodiment is configured to receive the light emitted from the light-emitting element 320*a* by the light-receiving element 320*b*, similarly to the optical sensor 20 of the above embodiment. That is, the controller 7 is configured to determine whether the roll sheet R is supported on the support part 212, whether the sheet P is in the near empty state and whether the sheet P is in the empty state, based on a signal from the optical sensor 320. As shown in FIG. 6, in a case where the cut sheet K instead of the roll sheet R is arranged on the bottom part 11*a* of the tray 11, even though the light emitted from the light-emitting element 320*a* is reflected on the cut sheet K, the reflected light is directed toward the inclined surface 212*b* and is not received by the light-receiving element 320*b*, as shown with a dashed-two dotted line arrow Y6 in FIG. 6. Also in the present modified embodiment, similarly to the first embodiment, the support part 212 is configured to support the roll sheet R by contacting the outer peripheral surface (lower semicircular region Ra) of the lower part of the roll sheet R. For this reason, it is not necessary to perform an operation of adjusting a position of the roll sheet R, which facilitates a replacement operation for the roll sheet R. Also, it is determined whether the roll sheet R is supported on the support part 312, based on the signal output from the optical sensor 320. Therefore, similarly to the above embodiment, when recording an image on the sheet P of the roll sheet R, even when the cut sheet K is accommodated in the sheet feeding cassette 1, it is possible to suppress a situation where an image is erroneously recorded on the cut sheet K and thus, the cut sheet K, a recording agent (ink) and time are wasted.

Figure 7:
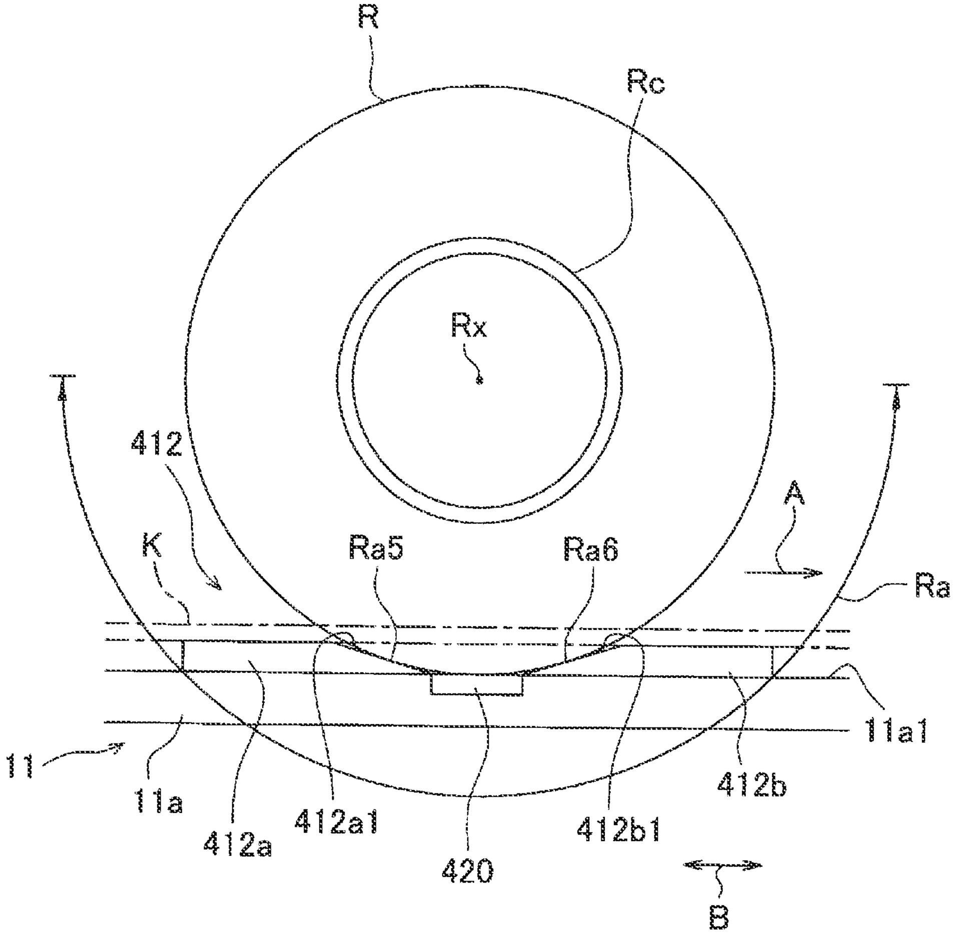
FIG. 7 is a partially enlarged view of a sheet feeding cassette in accordance with a third modified embodiment of the first embodiment of the present disclosure.

In the first embodiment and the first and second modified embodiments, the roll sheet R is detected by the optical sensor 20, 220, 320. However, whether the roll sheet R is supported on a support part 412 may also be determined by a pressure sensor 420. In a third modified embodiment, as shown in FIG. 7, the support part 412 is configured by two plate-shaped members 412*a* and 412*b* arranged on the bottom part 11*a* of the tray 11. The plate-shaped members 412*a* and 412*b* extend lengthwise in the axis direction of the rotation axis Rx of the roll sheet R, and are arranged apart from each other in the horizontal direction B. In the present modified embodiment, the plate-shaped members 412*a* and 412*b* are formed greater than the width of the sheet P, i.e., the roll sheet R. The plate-shaped member 412*a* is arranged on a further upstream side (a left side in FIG. 7) than the rotation axis Rx of the roll sheet R with respect to the unwinding direction A. The plate-shaped member 412*a* has an inclined surface 412*a*1 inclined downward toward the unwinding direction A. The plate-shaped member 412*b* is arranged on a further downstream side (a right side in FIG. 7) than the rotation axis Rx of the roll sheet R with respect to the unwinding direction A. The plate-shaped member 412*b* has an inclined surface 412*b*1 inclined upward toward the unwinding direction A. In other words, the two inclined surfaces 412*a*1 and 412*b*1 of the plate-shaped members 412*a* and 412*b* are each inclined so that a height from the bottom surface 11*a*1 increases in the horizontal direction B as a distance from the rotation axis Rx increases. The roll sheet R is arranged on the inclined surfaces 412*a*1 and 412*b*1, so that the roll sheet R comes into contact with the inclined surfaces 412*a*1 and 412*b*1 at two contact places Ra5 and Ra6 of the outer peripheral surface (lower semicircular region Ra) of the lower part of the roll sheet R and is stably arranged in the tray 11.

In the third modified embodiment, the pressure sensor 420 is arranged on the bottom part 11*a* of the tray 11. More specifically, the pressure sensor 420 is arranged at a position between the plate-shaped members 412*a* and 412*b*, at which the pressure sensor can contact the lower end of the roll sheet R supported by the support part 412. The pressure sensor 420 is, for example, a well-known sheet-like pressure distribution sensor having a plurality of pressure-sensitive parts arranged in a matrix shape, and is configured to output a signal relating to a pressing force applied to each pressure-sensitive part to the controller 7. That is, when a part of the pressure sensor 420 (i.e., a central part of the pressure sensor 420 in the horizontal direction B) is pressed by the lower end of the roll sheet R, the pressure sensor 420 outputs a signal relating to a pressing force, which indicates that a pressing force at a central position of the pressure sensor 420 is higher than those at the other positions, to the controller 7. Thereby, the controller 7 can determine whether the roll sheet R is supported on the support part 412. As shown with dashed-two dotted lines in FIG. 7, in a case where the cut sheet K instead of the roll sheet R is accommodated in the tray 11, the cut sheet K is arranged on the plate-shaped members 412*a* and 412*b*. For this reason, since the cut sheet K does not press the pressure sensor 420, a signal is not output from the pressure sensor 420 to the controller 7. Note that, when the support part 412 is demounted from the tray 11 and the cut sheet K is arranged on the bottom part 11*a*, since the cut sheet K presses the entire pressure sensor 420, a signal, which indicates that the pressure sensor 420 is entirely pressed, is output from the pressure sensor 420 to the controller 7. For this reason, the controller 7 can determine whether the roll sheet R is supported on the support part 412.

Also in the present modified embodiment, like the above embodiment, the support part 412 is configured to support the roll sheet R in contact with the outer peripheral surface (lower semicircular region Ra) of the lower part of the roll sheet R. For this reason, it is not necessary to perform an operation of adjusting a position of the roll sheet R, which facilitates a replacement operation for the roll sheet R. Also, it is determined whether the roll sheet R is supported on the support part 412, based on the signal output from the pressure sensor 420. Therefore, similarly to the above embodiment, when recording an image on the sheet P of the roll sheet R, even when the cut sheet K is accommodated in the sheet feeding cassette 1, it is possible to suppress a situation where an image is erroneously recorded on the cut sheet K and thus, the cut sheet K, a recording agent (ink) and time are wasted.

Although the first embodiment of the present disclosure has been described, it would be appreciated that a variety of changes can be made within the scope of the claims. For example, in the first embodiment, the processing of S4 to S8 in the control flow does not necessarily need to be executed. That is, the controller 7 may determine in S2 whether the roll sheet R is supported on the support part 12, and may permit image recording on the sheet P in a case where it is determined that the roll sheet R is supported on the support part 12 (S2: YES) and may not permit image recording on the sheet P in a case where it is determined that the roll sheet R is not supported on the support part 12 (S2: NO).

In the first embodiment, the optical sensor 220 of the first modified embodiment may be further provided, in addition to the optical sensor 20. Thereby, even when one sensor is out of order, since it is possible to detect the roll sheet R by the other sensor, it is possible to detect more reliably whether the roll sheet R is supported on the support part 12.

In addition, the roll sheet R may also be a coreless roll sheet with no core member Rc. The present disclosure can be applied to all medium cassettes capable of accommodating the roll sheet R.

Second Embodiment

<Overall Configuration of Image Recording Apparatus>

Figure 8:
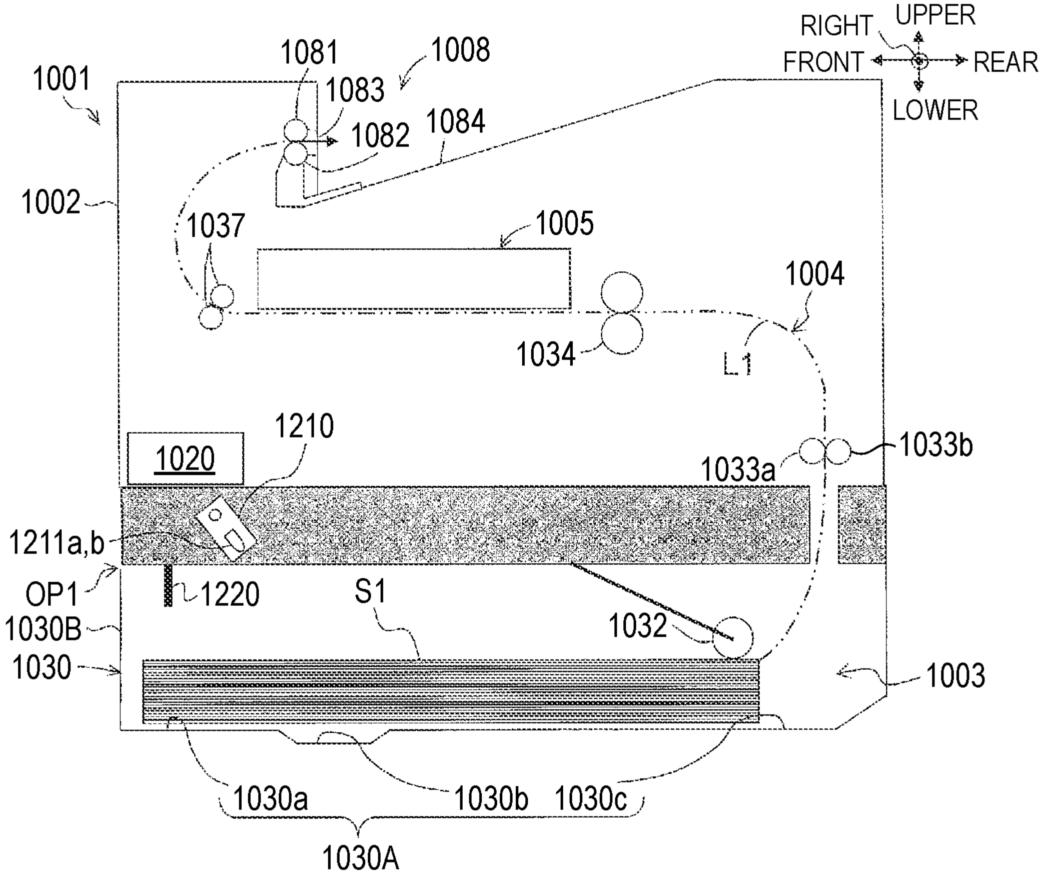
FIG. 8 is a pictorial view depicting an overall configuration of an image recording apparatus in accordance with a second embodiment of the present disclosure.

An overall configuration of an image recording apparatus 1001 in accordance with a second embodiment of the present disclosure is shown in FIG. 8. In FIG. 8, the image recording apparatus 1001 has an apparatus main body 1002. In the apparatus main body 1002, a supply unit 1003, a conveying unit 1004, an image forming unit 1005 and a discharge unit 1008 are provided. Note that, the image forming unit 1005 is an example of the recording unit. A side on which the discharge unit 1008 is provided is a front side of the image recording apparatus 1001, and a side on which the conveying unit 1004 is provided is a rear side of the image recording apparatus 1001. A side on which the supply unit 1003 is provided is a lower side of the image recording apparatus 1001, and a side on which the image forming unit 1005 is provided is an upper side of the image recording apparatus 1001.

<Supply Unit>

The supply unit 1003 includes a cassette 1030 detachably mounted to a lower part of the apparatus main body 1002, and a feeder roller 1032. Note that, the cassette 1030 is an example of the medium cassette.

A lower part of the cassette 1030 is provided with a bottom part 1030A. The bottom part 1030A has a planar part 1030*a* having a substantially plane shape, a concave part 1030*b*, and a planar part 1030*c* having a substantially plane shape from the front side toward the rear side of the image recording apparatus 1001. The planar part 1030*a* and the planar part 1030*c* are substantially flush with each other. The concave part 1030*b* is more depressed downward than the planar part 1030*a* and the planar part 1030*c*.

The cassette 1030 has a housing 1030B configuring an outer shell. In the housing 1030B, any one of a sheet S1 that is an image formation target and a roll R1 capable of unreeling a roll sheet RS1 can be accommodated. FIG. 8 depicts a case where the sheets S1 are accommodated in the housing 1030B of the cassette 1030. Note that, the sheet S1 is an example of the single sheet medium. As shown in FIG. 8, in a case where the sheets S1 are accommodated in the cassette 1030, a plurality of sheets S1 put substantially horizontally is stacked in an upper and lower direction. The lowest sheet S1 is placed in contact with the planar part 1030*a* and the planar part 1030*c*, and is not in contact with the concave part 1030*b*. That is, the plurality of sheets S1 is stacked in the cassette 1030 with a gap between the lowest sheet S1 and the concave part 1030*b*. Note that, the cassette 1030 has the above-described detachable structure, so that an opening OP1 through which an inside and an outside of the housing 1030B communicate is provided between the apparatus main body 1002 and an upper end portion of a wall surface of the housing 1030B on the front side of the image recording apparatus 1001. The front side of the image recording apparatus 1001 is an example of the one side in the front and rear direction.

Figure 9:
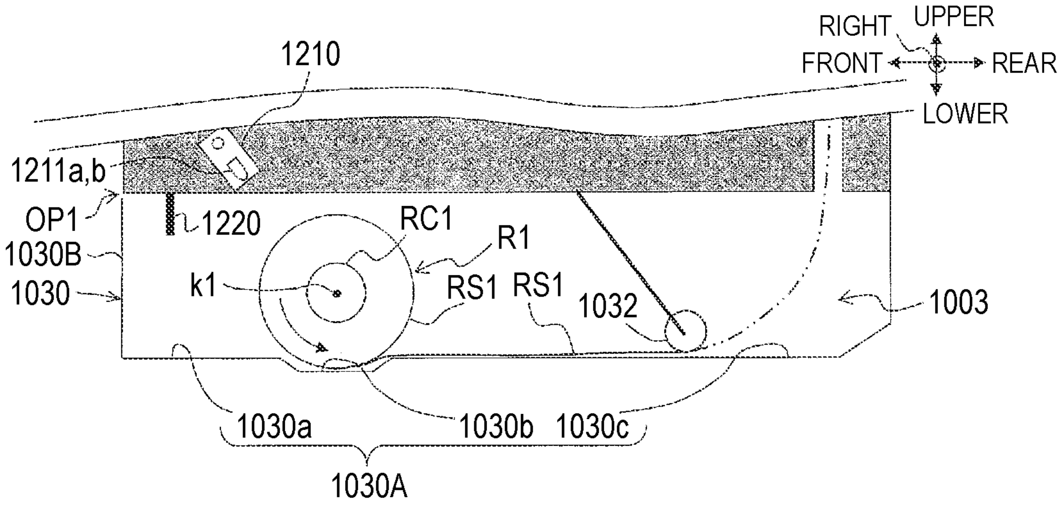
FIG. 9 is a partial pictorial view of a structure shown in FIG. 8, depicting a case where a roll sheet is accommodated in a cassette instead of a sheet.

Note that, FIG. 9 depicts a case where the roll sheet RS1 is accommodated in the housing 1030B of the cassette 1030. In this case, the roll R1 having the roll sheet RS1 wound on a winding core RC1 is rotatably arranged in the cassette 1030. That is, when the roll sheet RS1 is unreeled and conveyed from the roll R1, the roll R1 rotates in a shown arrow direction while keeping a state where a lower end portion of the roll R1 is inserted in the concave part 1030*b*. The concave part 1030*b* has a rectangular shape whose right and left direction is a length direction, as seen from above. In the present example, the concave part 1030*b* is arranged so that long sides of the rectangular shape are parallel to an axis center k1 of the winding core RC1. The lowest roll sheet RS1 of the roll R1 is placed in contact with the concave part 1030*b*, and a position of the axis center k1 is lowered as the roll sheet RS1 is consumed and a diameter of the roll R1 becomes smaller.

In FIGS. 8 and 9, the feeder roller 1032 is provided on a rear side of the roll R1 whose lower end portion is inserted in the concave part 1030*b*, as shown in FIG. 9. The rear side of the image recording apparatus 1001 is an example of the other side in the front and rear direction. In the image recording apparatus 1001, a conveying path L1 from the feeder roller 1032 to the discharge unit 1008 via the conveying unit 1004 and the image forming unit 1005 is formed. In the case where the sheet S1 is held in the cassette 1030, the feeder roller 1032 picks up the sheets S1 in the cassette 1030 one by one, and conveys the same toward the conveying unit 1004 and the image forming unit 1005 along the conveying path L1. In the case where the roll R1 is held in the concave part 1030*b* of the cassette 1030, the feeder roller 1032 conveys the roll sheet RS1 unreeled from the roll R1 rotating in the concave part 1030*b* toward the conveying unit 1004 and the image forming unit 1005 along the conveying path L1.

<Conveying Unit>

The conveying unit 1004 is configured to hold and convey the sheet S1 or the roll sheet RS1 supplied from the supply unit 1003 to the image forming unit 1005. The conveying unit 1004 includes a conveying roller 1033*a* to be driven by a motor (not shown), and registration rollers 1034. The conveying roller 1033*a* is a roller configured to apply a conveying force to the sheet S1 or the roll sheet RS1. The sheet S1 or the roll sheet RS1 conveyed from the feeder roller 1032 toward the conveying roller 1033*a* is sandwiched between the conveying roller 1033*a* and a paper powder removal roller 1033*b*, and is conveyed toward the registration rollers 1034 along the conveying path L1. The registration rollers 1034 correct a posture of the sheet S1 or the roll sheet RS1 and then convey the same to the image forming unit 1005.

<Image Forming Unit>

The image forming unit 1005 is configured to form an image for print on the sheet S1 or the roll sheet RS1 conveyed from the conveying unit 1004 by a well-known electrophotographic method, inkjet method, thermal transfer method or the like. The sheet S1 or the roll sheet RS1 conveyed from the image forming unit 1005 toward conveying rollers 1037 is sandwiched between the conveying rollers 1037, and is conveyed toward a discharge roller 1081 along the conveying path L1.

<Discharge Unit>

The discharge unit 1008 is configured to discharge the sheet S1 or the roll sheet RS1, which has an image formed thereon and is discharged from the image forming unit 1005, to an outside of the image recording apparatus 1001. The discharge unit 1008 includes a discharge roller 1081, a discharge roller 1082, a discharge port 1083, and a discharge tray 1084. The discharge roller 1081 is configured to rotate by power from the above-described motor and to convey the sheet S1 or the roll sheet RS1 discharged from the image forming unit 1005 toward the discharge tray 1084. Note that, in a case where the roll sheet RS1 having an image formed thereon is discharged, a user cuts a part of the roll sheet RS1 discharged to the discharge tray 1084 by using a saw teeth-like cutting blade (not shown) provided to the discharge port 1083.

Note that, an optical sensor 1210 and a protective rib 1220 will be described later.

<Control System>

Figure 10:
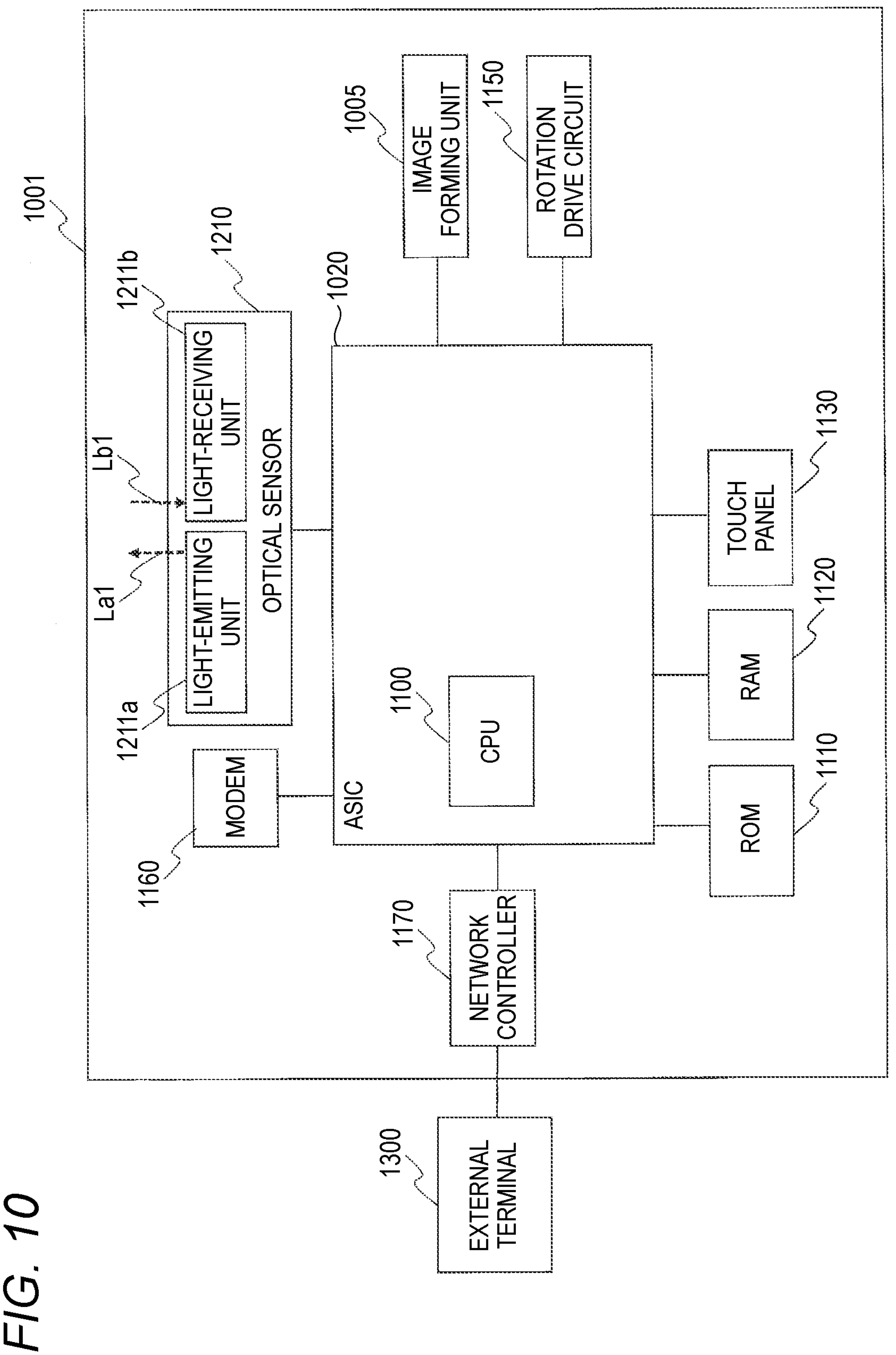
FIG. 10 is a block diagram of a control system of the image recording apparatus.

Operations of each unit of the image recording apparatus 1001, including rotation and stop of the motor, are controlled by an ASIC (application specific integrated circuit) 1020. FIG. 10 depicts a block diagram of a control system of the image recording apparatus 1001 including the ASIC 1020. As shown in FIG. 10, the ASIC 1020 includes a CPU 1100. The ASIC 1020 is connected to a ROM 1110, a RAM 1120, a touch panel 1130 configured to perform a desired display and to be operable by a user, an image forming unit 1005, a rotation drive circuit 1150, a modem 1160, a network controller 1170, and an optical sensor 1210, which will be described later. Note that, the CPU 1100 is an example of the controller.

In the ROM 1110, a variety of control programs necessary for the image recording apparatus 1001 to operate, including a control program for executing each flowchart shown in FIGS. 15, 17 and 20, which will be described later, are stored. The CPU 1100 is configured to control each unit according to a program read out from the ROM 1110, and to execute each flowchart shown in FIGS. 15, 17 and 20, which will be described later.

The CPU 1100 is also configured to output a print instruction signal to the image forming unit 1005 via the ASIC 1020, thereby instructing the image forming unit 1005 to form an image on the sheet S1 or the roll sheet RS1. The CPU 1100 is also configured to output a drive control signal to the rotation drive circuit 1150 configured to control rotation of the motor via the ASIC 1020, thereby controlling rotation of the motor. The CPU 1100 is also configured to control the network controller 1170 via the ASIC 1020, thereby transmitting and receiving information to and from an external terminal 1300 via wired or wireless network communication.

<Optical Sensor>

As described above, in the image recording apparatus 1001 of the present embodiment, the sheet S1 or the roll sheet RS1 can be selectively accommodated in the cassette 1030 of the supply unit 1003. The optical sensor 1210 is provided to identify whether any one of the sheet S1 and the roll sheet RS1 is accommodated.

Figure 12:
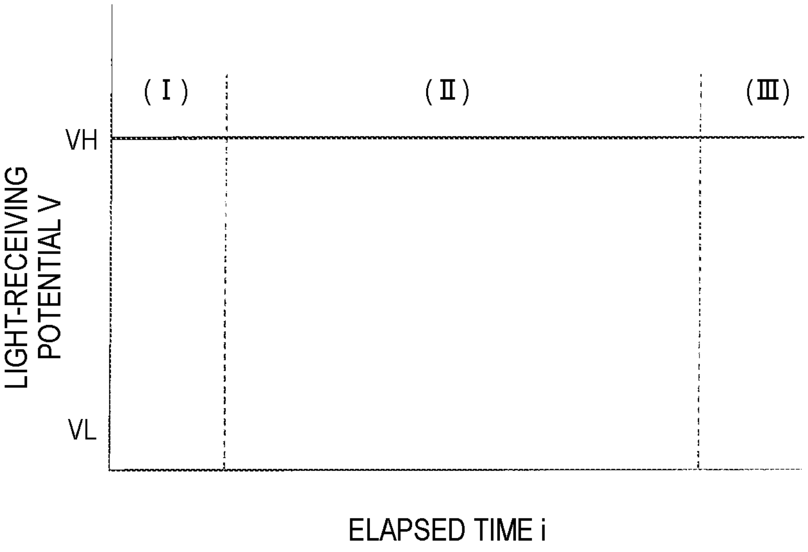
FIG. 12 is a graph depicting a change in light-receiving potential of the optical sensor.
Figure 14:
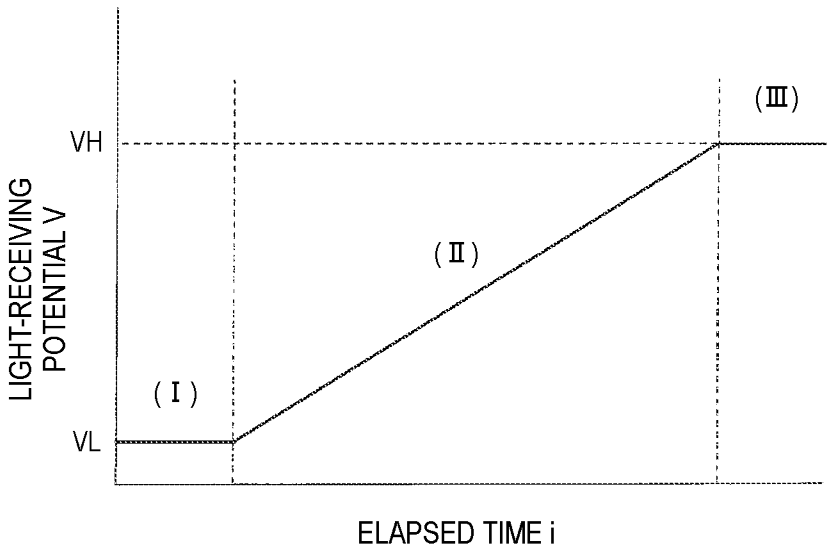
FIG. 14 is a graph depicting a change in light-receiving potential of the optical sensor.

As shown in FIGS. 8 and 9, the optical sensor 1210 is provided obliquely with respect to the upper and lower direction at a part of the apparatus main body 1002 located above the cassette 1030. The optical sensor 1210 is a reflection-type sensor including a light-emitting unit 1211*a* configured to emit emission light and a light-receiving unit 1211*b* capable of receiving reflected light of the emission light emitted from the light-emitting unit 1211*a*. The optical sensor 1210 has a structure where the light-emitting unit 1211*a* and the light-receiving unit 1211*b* each of which is configured by an optical element such as an LED are embedded in one sensor amplifier, for example. The optical sensor 1210 is configured to be in a LOW state of a light-receiving potential V=VL when the light-receiving unit 1211*b* receives the reflected light, and to be in a HIGH state of a light-receiving potential V=VH when the light-receiving unit 1211*b* does not receive the reflected light, as shown in FIGS. 12 and 14, which will be described later.

Note that, a protective rib 1220 is provided at a part, which is located above the cassette 1030 and on a further front side of the image recording apparatus 1001 than the optical sensor 1210, of the apparatus main body 1002. The protective rib 1220 extends in the right and left direction, and a position of a lower end of the protective rib 1220 in the upper and lower direction is lower than a position of a lower end of the optical sensor 1210 in the upper and lower direction.

<Behaviors of Light In State Where Sheet Is Accommodated>

Figure 11:
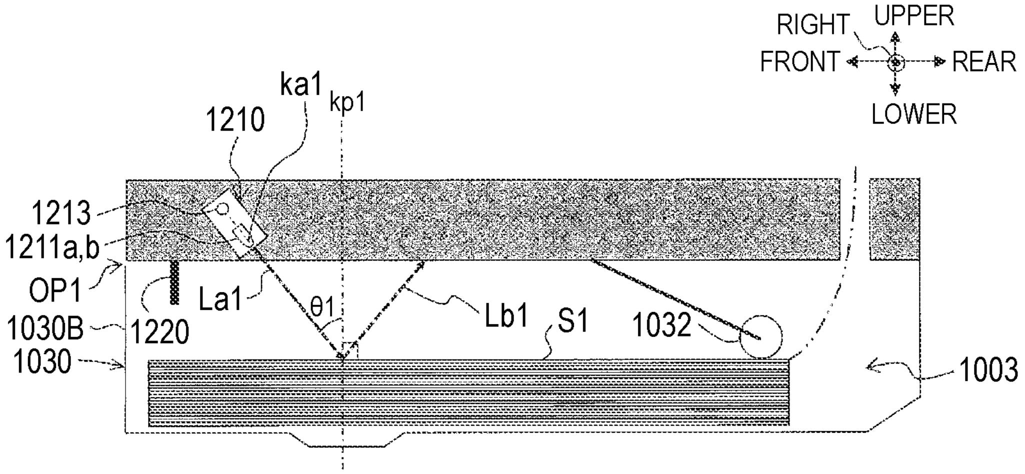
FIG. 11 illustrates a detection behavior of an optical sensor when the sheet is accommodated in the cassette.

A detection behavior of the optical sensor 1210 in a state where the sheet S1 is accommodated in the cassette 1030 is described with reference to FIGS. 11 and 12. As shown in FIG. 11, the optical sensor 1210 is obliquely arranged so that an optical axis ka1 of emission light La1 from the light-emitting unit 1211*a* forms a predetermined acute angle θ1 with respect to an axis kp1 perpendicular to a sheet surface of the sheet S1, on a side sectional view of a section perpendicular to the sheet surface of the sheet S1. That is, the light-emitting unit 1211*a* has a directionality in a predetermined direction, and a light intensity is largest in the direction. The direction in which the light intensity is largest is a direction of the optical axis ka1 of the light-emitting unit 1021*a*.

The optical sensor 1210 is obliquely arranged as described above, so that after the emission light La1 from the light-emitting unit 1211*a* is reflected on a surface of the uppermost sheet S1 loaded in the cassette 1030, the reflected light Lb1 is reflected in an opposite direction to the optical sensor 1210 with respect to the axis kp1 and is not thus incident on the light-receiving unit 1211*b*. Thereby, a light-receiving potential V as a detection signal output from the optical sensor 1210 to the ASIC 1020 is always substantially constant (V=VH) in any of a time section (I), a time section (II) and a time section (III), irrespective of elapsed time i, as shown in FIG. 12. Note that, the time section (I) corresponds to a state where the sheets S1 in the cassette 1030 are not consumed yet. The time section (II) corresponds to a state where the sheets S1 in the cassette 1030 are gradually consumed as the user uses the image recording apparatus 1001. The time section (III) corresponds to a state where the sheets S1 in the cassette 1030 are used up and there is no sheet S1.

<Behaviors of Light In State Where Roll Is Accommodated>

Figure 13:
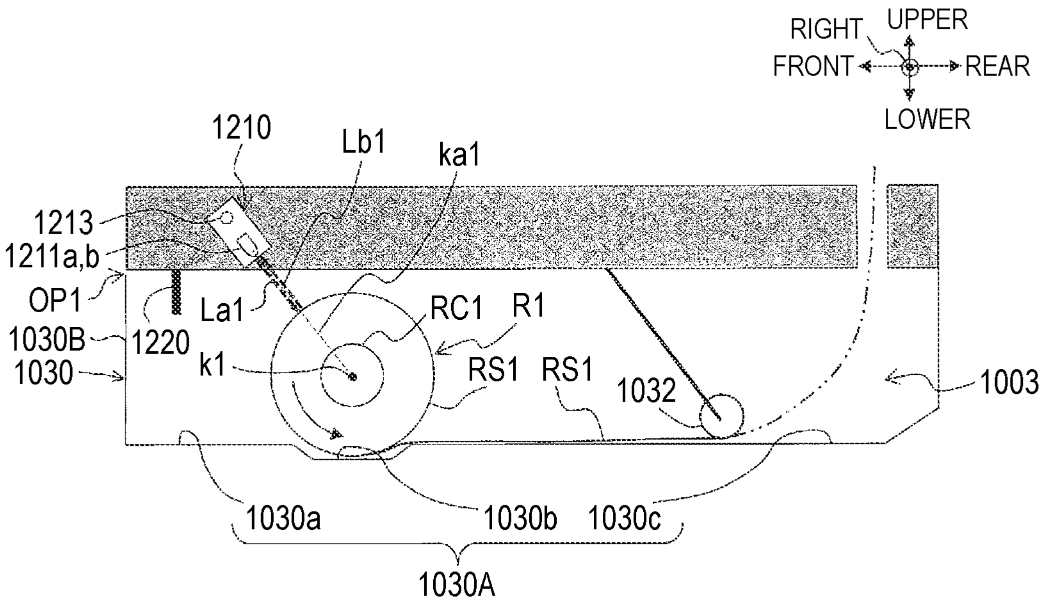
FIG. 13 illustrates a detection behavior of the optical sensor when the roll sheet is accommodated in the cassette.

A detection behavior of the optical sensor 1210 in a state where the roll R1 is accommodated in the cassette 1030 is described with reference to FIGS. 13 and 14. As shown in FIG. 13, due to the oblique arrangement at the predetermined angle θ1 as described above, the optical sensor 1210 is arranged so that the optical axis ka1 of the emission light La1 from the light-emitting unit 1211*a* is substantially directed toward the axis center k1 of the winding core RC1 of the roll R1. Thereby, after the emission light La1 from the light-emitting unit 1211*a* is reflected on a surface of the outermost roll sheet RS1 of the roll R1, the reflected light Lb1 travels toward the optical sensor 1210 and is incident on the light-receiving unit 1211*b*. In other words, the optical sensor 1210 is arranged so that the optical axis ka1 of the emission light La1 from the light-emitting unit 1211*a* is tilted at an inclination at which the reflected light Lb1 from the sheet S1 is not received by the light-receiving unit 1211*b* and the reflected light Lb1 from the roll sheet RS1 is received by the light-receiving unit 1211*b*. Thereby, in the image recording apparatus 1001, it is possible to identify whether the roll sheet RS1 or the sheet S1 is arranged in the cassette 1030, based on the light-receiving behavior in the light-receiving unit 1211*b*.

As a result of the light-receiving behavior of the reflected light Lb1 from the roll sheet RS1, the light-receiving potential V as a detection signal output from the optical sensor 1210 to the ASIC 1020 becomes a behavior shown in FIG. 14. That is, in the time section (I) where the roll sheet RS1 is not consumed, the light-receiving potential V is substantially constant (V=VL). In the time section (II), the light-receiving potential V shows a behavior represented by a straight line rising to the right from VL to VH as elapsed time i increases, i.e., a behavior increasing substantially in proportion to consumption of the roll sheet RS1. The reason is that a light path length after the light emitted from the light-emitting unit 1211*a* is reflected on a surface of the outermost roll sheet RS1 until it is received by the light-receiving unit 1211*b* is gradually lengthened because a distance from the optical sensor 1210 to the roll R1 increases as the roll sheet RS1 is consumed and a diameter of the roll R1 becomes thus smaller. Therefore, in the image recording apparatus 1001, it is possible to detect a consumption, in other words, a residual amount of the roll sheet RS1 of the roll R1 by acquiring the behavior of the light-receiving potential V in the time section (II). In the time section (III) where the roll sheet RS1 in the cassette 1030 is used up and no longer exists, the light-receiving potential V is substantially constant (V=VH).

Note that, as shown in FIG. 13, in a positional relation of the image recording apparatus 1001 in the front and rear direction, the opening OP1 is positioned on a further front side of the image recording apparatus 1001 than the roll R1, and the optical sensor 1210 is positioned on a further rear side of the image recording apparatus 1001 than the opening OP1 and on a further front side of the image recording apparatus 1001 than the roll R1. Also, the protective rib 1220 is positioned on a further rear side of the image recording apparatus 1001 than the opening OP1 and on a further front side of the image recording apparatus 1001 than the optical sensor 1210.

<Control Procedure>

As an example of a method for implementing the above method, a control procedure that is executed by the CPU 1100 is described with reference to a flowchart shown in FIG. 15.

First, it is determined in S10 whether the reflected light Lb1 is received by the light-receiving unit 1211*b*. If received, a determination result is Yes, and the flow proceeds to S20. In S20, it is identified that the roll sheet RS1 is accommodated in the cassette 1030.

Then, in S30, a residual amount of the roll sheet RS1 of the roll R1 is determined according to an amount of received light of the reflected light Lb1 in the light-receiving unit 1211*b*. In the image recording apparatus 1001, for example, a correlation between the amount of received light of the reflected light Lb1 and the residual amount of the roll sheet RS1 is stored in advance in an appropriate place of the ROM 1110 or the like. In S30, the residual amount of the roll sheet RS1 is determined with reference to the correlation. The processing of S30 is an example of the determining of the residual amount of the roll medium.

In S40, it is determined whether the residual amount of the roll sheet RS1 is zero. In a case where it is determined that the residual amount is not zero and a determination result is thus No, the flow returns to S30. In a case where the residual amount of the roll sheet RS1 is zero and the determination result is thus Yes, the flow proceeds to S50. In S50, a predetermined alarm notification indicating that the roll sheet RS1 has run out is executed, and the flow is over.

On the other hand, when it is determined in S10 that the reflected light Lb1 is not received, a determination result is No and the flow proceeds to S60. In S60, it is identified that the sheet S1 is accommodated in the cassette 1030, and then the flow is over. The processing of S60 is an example of the determining that the single sheet medium is accommodated in the medium cassette, and S20 is an example of the determining that the roll medium is accommodated in the medium cassette.

<Effects of Second Embodiment>

As described above, in the second embodiment, the optical sensor 1210 is arranged such that the optical axis ka1 of the emission light La1 from the light-emitting unit 1211*a* is inclined. Due to the inclination, when the emission light La1 from the light-emitting unit 1211*a* is reflected on the roll sheet RS1 in the cassette 1030, the reflected light Lb1 is received by the light-receiving unit 1211*b*, and when the emission light La1 from the light-emitting unit 1211*a* is reflected on the sheet S1 in the cassette 1030, the reflected light Lb1 is not received. By using the difference, in a case where the light-receiving unit 1211*b* receives the reflected light Lb1, the CPU 1100 determines that the roll sheet RS1 is accommodated in the cassette 1030, and in a case where the light-receiving unit 1211*b* does not receive the reflected light Lb1, the CPU 1100 determines that the sheet S1 is accommodated in the cassette 1030.

Also, as described above, the optical sensor 1210 has such configuration that the emission light La1 emitted from the light-emitting unit 1211*a* is reflected on the roll sheet RS1 and the reflected light Lb1 is received by the light-receiving unit 1211*b*. Therefore, when the roll sheet RS1 is consumed and the residual amount becomes smaller, the diameter of the roll R1 having the roll sheet RS1 is decreased to lengthen the light path length after the light emitted from the light-emitting unit 1211*a* is reflected on the roll sheet RS1 until it returns to the light-receiving unit 1211*b*, thereby reducing the amount of received light. By using this property, in a case where it is determined by the CPU 1100 that the roll sheet RS1 is accommodated in the cassette 1030, the residual amount of the roll sheet RS1 is determined based on the amount of received light of the light-receiving unit 1211*b*.

In this way, in the image recording apparatus 1001 of the second embodiment, it is possible to execute, with one optical sensor 1210, both identification as to which of the sheet S1 or the roll sheet RS1 is set and detection of a residual amount when the roll sheet RS1 is set. As a result, it is possible to avoid increase in manufacturing cost and enlargement of the apparatus, which are caused when, for example, two sensors are provided.

Also, in the state where the sheet S1 is accommodated in the cassette 1030, if the light-emitting unit 1211*a* straightly faces the sheet S1, the reflected light Lb1 reflected on the sheet S1 is received by the light-receiving unit 1211*b*. In the present embodiment, particularly, the optical axis ka1 of the emission light La1 from the light-emitting unit 1211*a* is not arranged in a direction perpendicular to the sheet surface of the sheet S1, but is arranged so as to form the acute angle θ1 with respect to the direction perpendicular to the sheet surface of the sheet S1. Thereby, when the emission light La1 emitted from the light-emitting unit 1211*a* is reflected on the sheet S1, the reflected light Lb1 does not return straight toward the optical sensor 1210, but returns in a deviating direction. Therefore, according to the present embodiment, in the state where the sheet S1 is accommodated in the cassette 1030, the reflected light Lb1 reflected on the sheet S1 can be reliably not received by the light-receiving unit 1211*b*.

Also, in the second embodiment, particularly, the optical sensor 1210 is arranged on a further rear side of the image recording apparatus 1001 than the opening OP1 of the housing 1030B of the cassette 1030 and on a further front side of the image recording apparatus 1001 than the roll R1. That is, the opening OP1, the optical sensor 1210 and the roll R1 are arranged in corresponding order from the front side toward the rear side of the image recording apparatus 1001. At this time, since the optical sensor 1210 is arranged obliquely so that the reflected light Lb1 from the roll sheet RS1 is received by the light-receiving unit 1211*b*, the light-receiving unit 1211*b* is in a posture where a back thereof faces the opening OP1, based on the arrangement order. Thereby, even when external light enters the housing 1030B from the opening OP1 of the housing 1030B, the optical sensor 1210 is less likely to be affected by the external light, so that it is possible to improve detection accuracy.

Also, in the second embodiment, particularly, the roll sheet RS1 accommodated in the cassette 1030 is conveyed by the feeder roller 1032 arranged on a further rear side of the image recording apparatus 1001 than the roll R1. During the conveying by the feeder roller 1032, paper powders may be generated due to friction between the feeder roller 1032 and the roll sheet RS1. However, since the optical sensor 1210 is arranged on a further front side of the image recording apparatus 1001 than the roll R1, which is an opposite side to the feeder roller 1032, and is distant from the feeder roller 1032, it is possible to suppress a bad influence of paper powders on the detection accuracy.

Also, in the second embodiment, particularly, the cassette 1030 is detachably mounted to the apparatus main body 1002. Thereby, when the roll sheet RS1 or the sheet S1 in the cassette 1030 is consumed, the user can demount the cassette 1030 from the apparatus main body 1002 and supplement a new roll R1 or sheet S1 in the cassette 1030.

Also, in the second embodiment, particularly, the protective rib 1220 is provided on a further front side of the image recording apparatus 1001 than the optical sensor 1210 and a lower end of the protective rib 1220 is located at a lower position than a lower end of the optical sensor 1210. Thereby, when the user mounts or demounts the cassette 1030 with respect to the apparatus main body 1002 from the front side of the image recording apparatus 1001, it is possible to prevent a user's hand from erroneously contacting the optical sensor 1210.

Modified Embodiments

Note that, the second embodiment can be diversely modified without departing from the gist and technical spirit thereof. In the below, such modified embodiments are sequentially described.

(1) Case Where Residual Amount Detection Is Performed Even For Sheet

Figure 16:
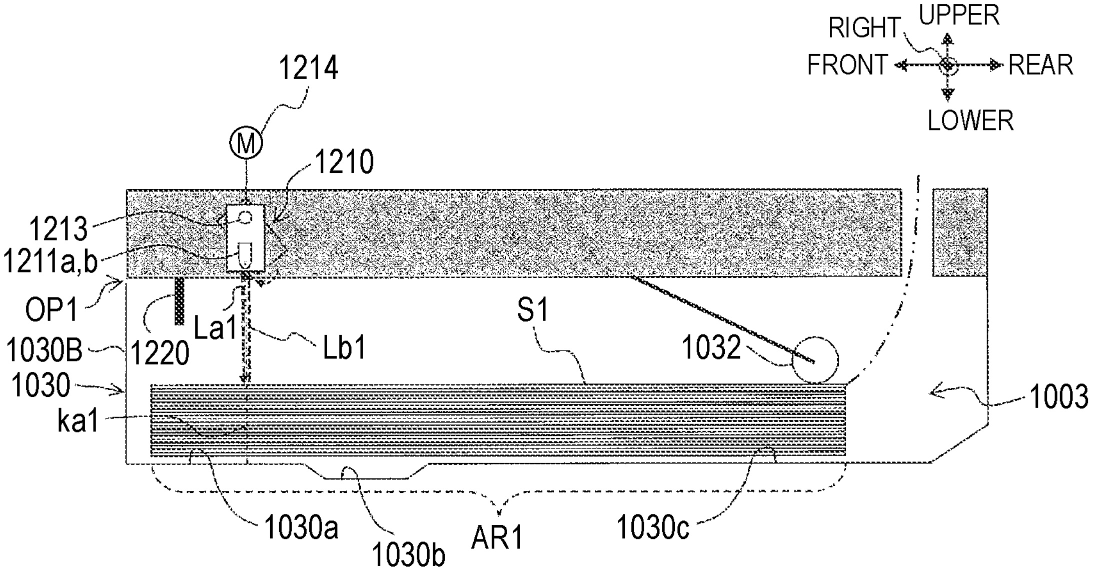
FIG. 16 illustrates a detection behavior of the optical sensor, in a modified embodiment of the second embodiment where a residual amount of the sheet is also detected by changing an inclination of an optical axis.

As described above, in the state where the sheet S1 is accommodated in the cassette 1030, if the light-emitting unit 1211*a* faces straight the sheet S1, the reflected light Lb1 reflected on the sheet S1 is received by the light-receiving unit 1211*b*. From this standpoint, in the present modified embodiment, as shown in FIG. 16, the optical sensor 1210 is configured to be rotatable about a rotary shaft 1213 as a support point. In the case where the sheet S1 is accommodated in the cassette 1030, rotation of a motor 1214 is transmitted to the rotary shaft 1213 to change a posture of the optical sensor 1210 and to variably adjust the optical axis ka1 of the emission light La1 from the light-emitting unit 1211*a* to a direction perpendicular to a sheet surface of the sheet S1. Note that, the motor 1214 and the rotary shaft 1213 are an example of the adjustment mechanism. Thereby, as described above, the residual amount of the sheet S1 in the cassette 1030 is acquired according to the light-receiving behavior of the reflected light Lb1 in the light-receiving unit 1211*b*. Note that, the posture of the optical sensor 1210 may also be changed by another actuator such as a solenoid, instead of the motor 1214. In this case, the rotary shaft 1213 and the actuator are an example of the adjustment mechanism.

<Control Procedure>

As an example of a method for implementing the above method of the present modified embodiment, a control procedure that is executed by the CPU 1100 is described with reference to a flowchart of FIG. 17. In the flow of FIGS. 17, S70 to S100 are newly added to the flow of FIG. 15.

That is, when it is identified in S60 that the sheet S1 is accommodated in the cassette 30, the flow proceeds to S70. In S70, the motor 1214 is driven to adjust an inclination of the optical axis ka1 of the optical sensor 1210 to be perpendicular to the sheet surface of the sheet S1, in other words, so that the light-receiving unit 1211*b* is to receive the reflected light Lb1 from the sheet S1. The processing of S70 is an example of the adjusting of the inclination of the optical axis by controlling the adjustment mechanism so that the light-receiving unit receives reflected light from the single sheet medium.

Then, in S80, similarly to S30, the residual amount of the sheet S1 is determined according to the amount of received light of the reflected light Lb1 in the light-receiving unit 1211*b*. In the image recording apparatus 1001 of the present modified embodiment, a correlation between the amount of received light of the reflected light Lb1 and the residual amount of the sheet S1 is stored in advance in an appropriate place of the ROM 1110 or the like. In S80, the residual amount of the sheet S1 is determined with reference to the correlation. The processing of S80 is an example of the determining of a residual amount of the single sheet medium.

Then, in S90, it is determined whether the residual amount of the sheet S1 is zero. In a case where it is determined that the residual amount is not zero and a determination result is thus No, the flow returns to S80. In a case where the residual amount of the sheet S1 is zero and a determination result is thus Yes, the flow proceeds to S100. In S100, a predetermined alarm notification indicating that the sheet S1 has run out is executed, and the flow is over.

Effects of Modified Embodiment

Also in the present modified embodiment, similarly to the second embodiment, it is possible to execute, with one optical sensor 1210, both identification as to which of the sheet S1 or the roll sheet RS1 is set and detection of a residual amount when the roll sheet RS1 is set.

In addition to this, in the present modified embodiment, particularly, it is possible to adjust the inclination of the optical axis ka1 of the optical sensor 1210. Thereby, in the case where the sheet S1 is accommodated in the cassette 1030, the inclination of the optical axis ka1 is adjusted to cause the light-receiving unit 1211*b* to receive the reflected light Lb1 from the sheet S1. By doing so, when the sheet S1 is consumed and the residual amount becomes smaller, the loaded height of the sheets S1 accommodated in the cassette 1030 is decreased to lengthen the light path length after the light emitted from the light-emitting unit 1211*a* is reflected on the sheet S1 until it returns to the light-receiving unit 1211*b*, thereby reducing the amount of received light. By using this property, in the present modified embodiment, the residual amount of the sheet S1 is determined based on the amount of received light in the light-receiving unit 1211*b*. As a result, in the image recording apparatus 1001 of the present modified embodiment, it is not only possible to perform detection of the residual amount when the roll sheet RS1 is set in the cassette 1030, but also possible to perform detection of the residual amount when the sheet S1 is set in the cassette 1030. Also, at this time, for example, a part, which intersects with the optical axis ka1, of the planar part 1030*a* of the cassette 1030 and a surrounding thereof may be set to a light-absorbing color, for example, black. In this case, when the sheet S1 in the cassette 1030 has run out, the emission light La1 collides with the part and is absorbed and an amount of the reflected light Lb1 in the light-receiving unit 1211 is thus reduced. Therefore, it is possible to detect that the sheet in the cassette 1030 has run out by the CPU 1100.

Figure 18:
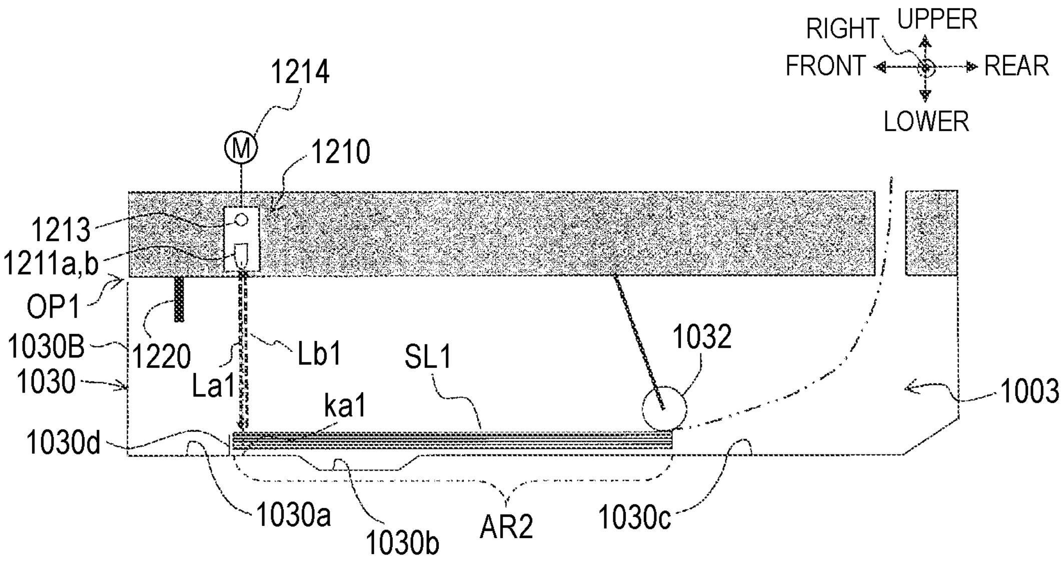
FIG. 18 illustrates a detection behavior of the optical sensor when a recorded sheet having a minimum size is arranged.

Note that, in the image recording apparatus 1001, as the sheet S1, for example, sheets such as A4 size, B5 size, A3 size and the like may be used for recording a desired image. Instead of this, in the image recording apparatus 1001, a variety of recording sheets may be arranged in the cassette 1030. At this time, a recorded sheet SL1 having a postcard size as a minimum size may be used, for example. In this case, as shown in FIG. 18, an area AR2 in which the recorded sheet SL1 is arranged in the cassette 1030 via a holder 1030*d* and an area AR1 in which the sheet S1 shown in FIG. 16 is arranged may overlap in the front and rear direction of the image recording apparatus 1001. The area AR1 is an example of the first area, and the area AR2 is an example of the second area. In this example, the entire area AR2 is the overlapping part. Additionally, in this case, the arrangement of the optical sensor 1210 and the inclination of the optical axis ka1 are adjusted so that the emission light La1 is to collide with the overlapping part when performing detection of the residual amount of the sheet S1. By doing so, even in the arrangement of the recorded sheet SL1 as shown in FIG. 18, it is possible to perform detection of the residual amount in the similar manner to the above.

(2) Case Where Inclination of Optical Axis Is Adjusted According to Reduction in Residual Amount of Roll Sheet When accommodating the roll R1 having the roll sheet RS1 in the cassette 1030, two configurations of a configuration of rotatably supporting a bottom of the roll R1 without supporting the axis center k1 of the roll R1 and a configuration of rotatably supporting the axis center k1 of the roll R1 may be used. In the former configuration, as described above, the position of the axis center k1 of the roll R1 is lowered as the residual amount of the roll sheet RS1 is reduced. As a result, the position and angle at which the emission light La1 emitted from the light-emitting unit 1211*a* collides with the outermost roll sheet RS1 of the roll R1 are changed due to the lowering of the axis center k1, so that the detection of the residual amount may not be accurately performed.

Figure 19A:
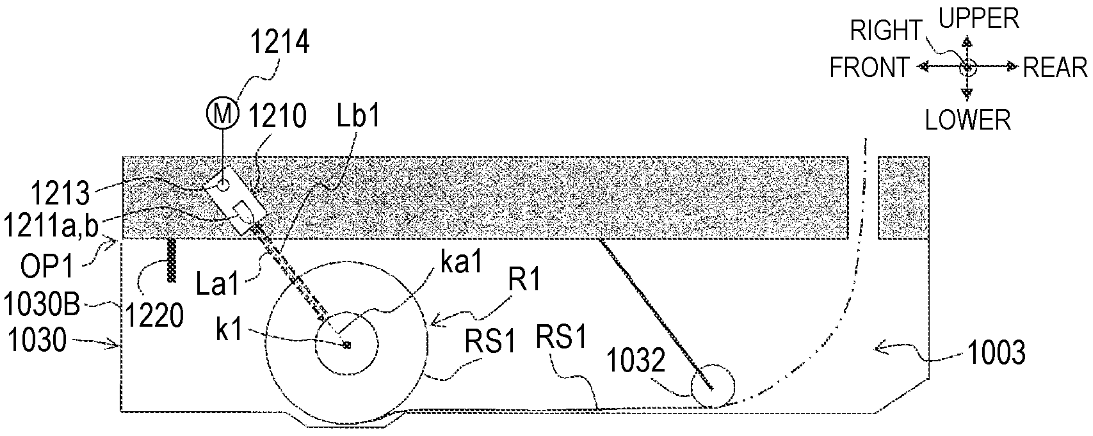
FIG. 19A illustrates a detection behavior of the optical sensor, in a modified embodiment of the second embodiment where an inclination of an optical axis is adjusted according to a decrease in residual amount of the roll sheet.
Figure 19B:
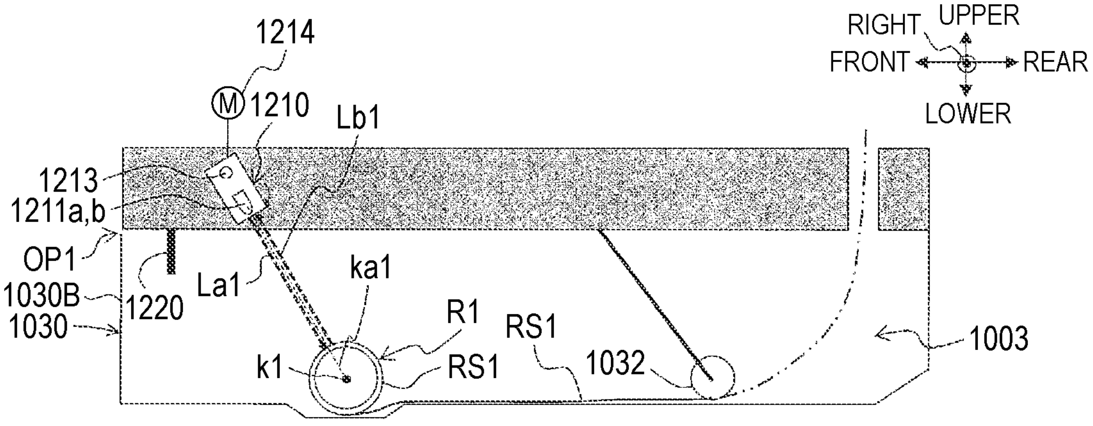
FIG. 19B illustrates a detection behavior of the optical sensor, in a modified embodiment of the second embodiment where the inclination of the optical axis is adjusted according to the decrease in residual amount of the roll sheet.

Therefore, in the present modified embodiment, for example, as compared to a case where the residual amount of the roll sheet RS1 is sufficient and the diameter of the roll R1 is large (FIG. 19A), when the residual amount of the roll sheet RS1 is smaller and the diameter of the roll R1 is smaller (FIG. 19B), the inclination of the optical axis ka1 is adjusted further downward. Specifically, in this example, as shown in FIGS. 19A and 19B, the optical axis ka1 is adjusted to be directed substantially toward the axis center k1 of the roll R1.

<Control Procedure>

As an example of a method for implementing the above method of the present modified embodiment, a control procedure that is executed by the CPU 1100 is described with reference to a flowchart of FIG. 20. In the flow of FIG. 20, S110 is newly added to the flow of FIG. 17.

That is, when it is determined in S40 that the residual amount of the roll sheet RS1 is not zero, the flow proceeds to S110. In S110, the motor 1214 is driven to adjust the inclination of the optical axis ka1 of the optical sensor 1210 according to the residual amount of the roll sheet RS1. Specifically, as described above, the optical axis ka is adjusted to face toward the axis center k1 of the roll R1. In the image recording apparatus 1001, for example, a correlation between the residual amount of the roll sheet RS1 and the position of the axis center k1 of the roll R1 is stored in advance in an appropriate place of the ROM 1110 or the like. In S110, the inclination of the optical axis ka1 is adjusted with reference to the correlation. The processing of S110 is an example of the adjusting of the inclination of the optical axis by controlling the adjustment mechanism according to a change in residual amount of the roll medium.

<Effects of Modified Embodiment>

Also in the present modified embodiment, similarly to the second embodiment, it is possible to execute, with one optical sensor 1210, both identification as to which of the sheet S1 or the roll sheet RS1 is set and detection of a residual amount when the roll sheet RS1 is set. In addition to this, the inclination of the optical axis ka1 is adjusted by the CPU 1100, according to the change in the residual amount of the roll sheet RS1, so that it is possible to perform detection of the residual amount of the roll sheet RS1 with accuracy.

(3) Others (Second Embodiment)

In the second embodiment, the cassette 1030 as the accommodation unit is configured to be used for both the roll sheet RS1 and the sheet S1. However, the present disclosure is not limited thereto. That is, a dedicated cassette for the roll sheet RS1 and a dedicated cassette for the sheet S1 may be individually provided, and the cassettes may be replaced with respect to the apparatus main body 1002 and used. Also in this case, as described above, the optical sensor 1210 is mounted obliquely, so that in a case where the dedicated cassette for the roll sheet RS1 is mounted, the reflected light Lb1 is received by the light-receiving unit 1211*b*, and in a case where the dedicated cassette for the sheet S1 is mounted, the reflected light Lb1 is not received. Therefore, by using the difference, it is determined by the CPU 1100 whether the dedicated cassette for the roll sheet RS1 or the dedicated cassette for the sheet S1 is mounted. When the dedicated cassette for the roll sheet RS1 is mounted, the residual amount of the roll sheet RS1 is determined based on the amount of received light of the light-receiving unit 1211*b*, in the similar manner to the above. Thereby, it is possible to execute, with one optical sensor 1210, both identification as to which of the sheet S1 or the roll sheet RS1 is set and detection of a residual amount when the roll sheet RS1 is set.

Also, the present disclosure is not limited to the configuration where the cassette 1030 detachably mounted to the apparatus main body 1002 is used as the medium cassette. For example, similarly to the cassette 1030, a medium cassette having a structure capable of selectively accommodating the roll R1 or the sheet S1 and fixed to the apparatus main body 1002 may also be used. Also in this case, the optical sensor 1210 is arranged obliquely, so that the similar effects are obtained.

In the second embodiment, as shown in FIG. 9 and the like, the optical sensor 1210 is arranged on the further front side of the image recording apparatus 1001 than the roll R1 so that the optical axis ka1 is tilted toward the rear side of the image recording apparatus 1001. However, the present disclosure is not limited thereto. That is, the optical sensor 1210 may be arranged on a further rear side of the image recording apparatus 1001 than the roll R1 so that the optical axis ka1 is tilted toward the front side of the image recording apparatus 1001. Also in this case, in a case where the emission light La1 emitted from the light-emitting unit 1211*a* is reflected on the roll sheet RS1, the reflected light Lb1 is received by the light-receiving unit 1211*b*, and in a case where the emission light La1 emitted from the light-emitting unit 1211*a* is reflected on the sheet S1 in the cassette 1030, the reflected light Lb1 is not received. Also, it is possible to cause the light-receiving unit 1211*b* to receive the reflected light Lb1, which is generated as the emission light La1 emitted from the light-emitting unit 1211*a* is reflected on the roll sheet RS1, and to perform detection of the residual amount of the roll sheet RS1 by using the same. As a result, it is possible to execute, with one optical sensor 1210, both identification as to which of the sheet S1 or the roll sheet RS1 is set and detection of a residual amount when the roll sheet RS1 is set.

Figure 15:
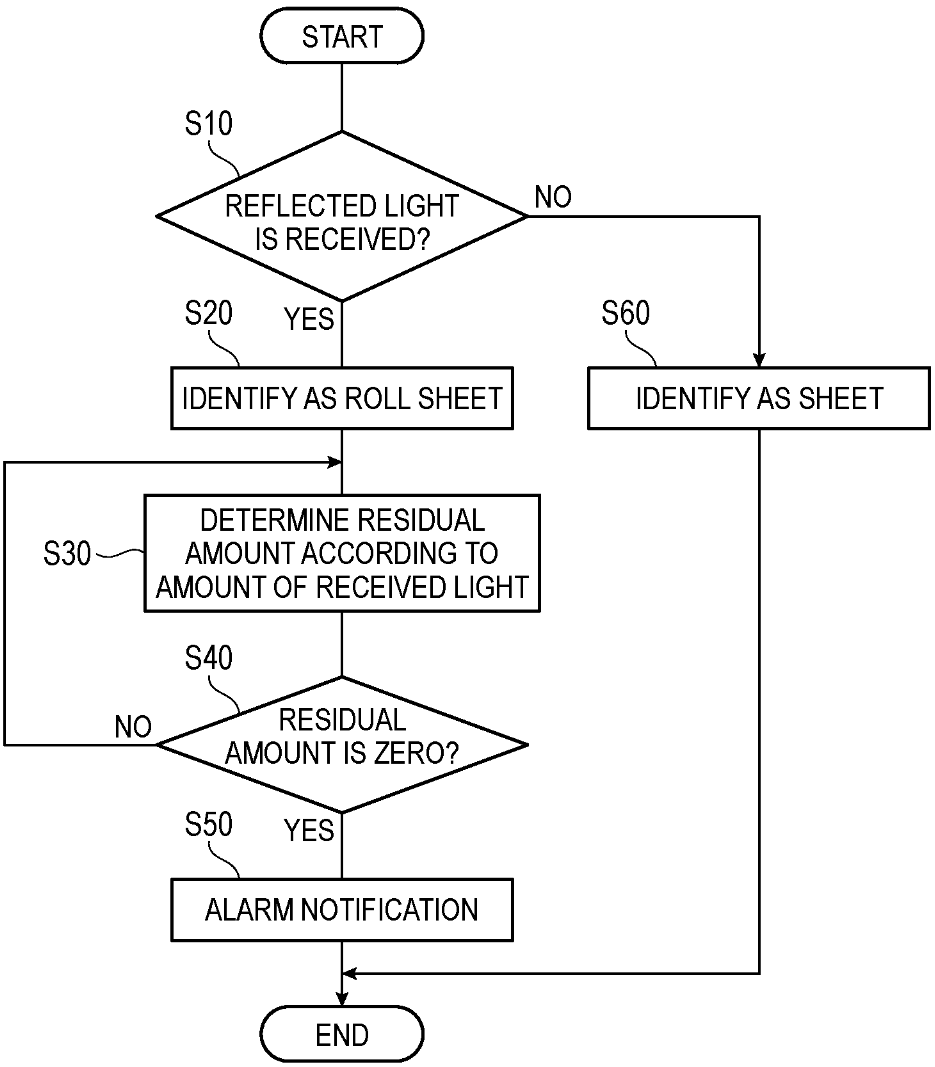
FIG. 15 is a flowchart depicting a control procedure that is executed by a CPU of an ASIC.
Figure 17:
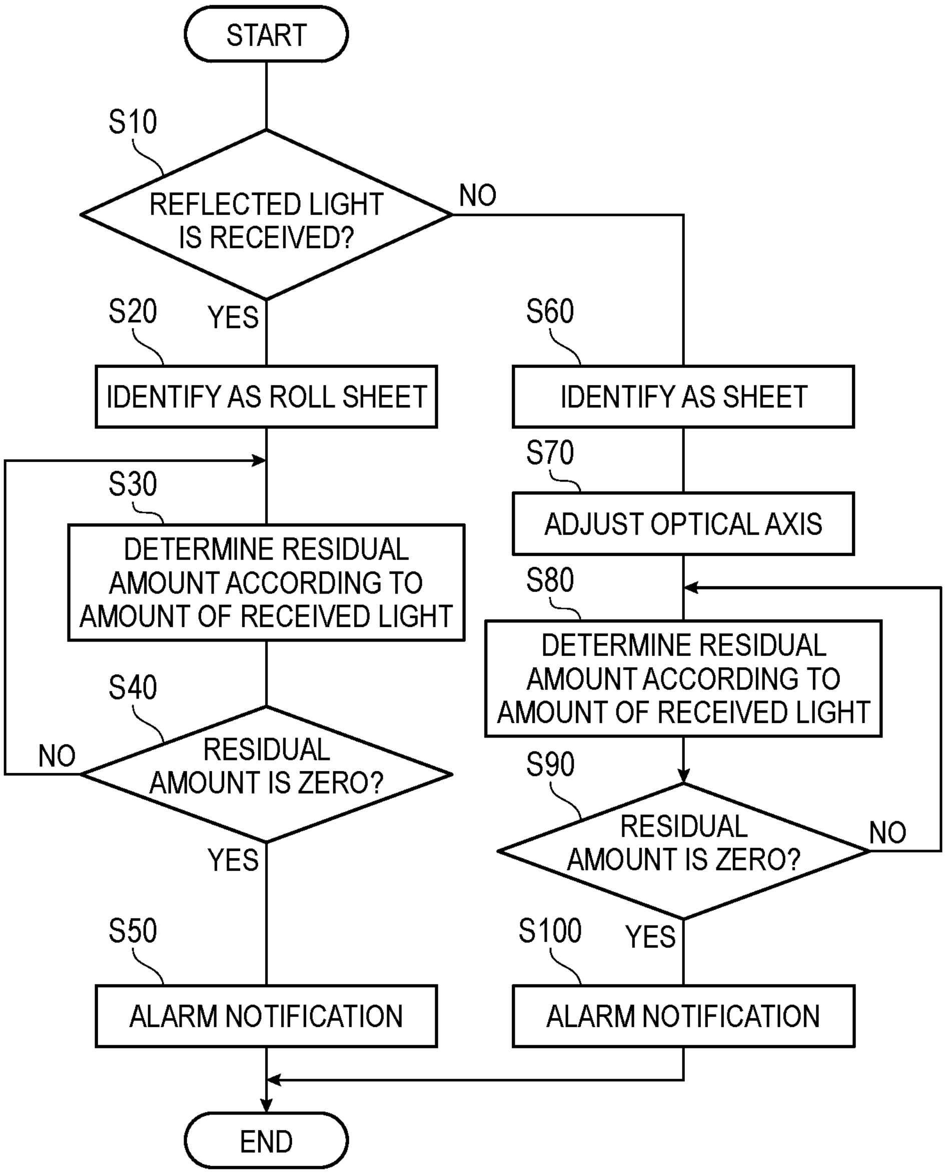
FIG. 17 is a flowchart depicting a control procedure that is executed by the CPU of the ASIC.
Figure 20:
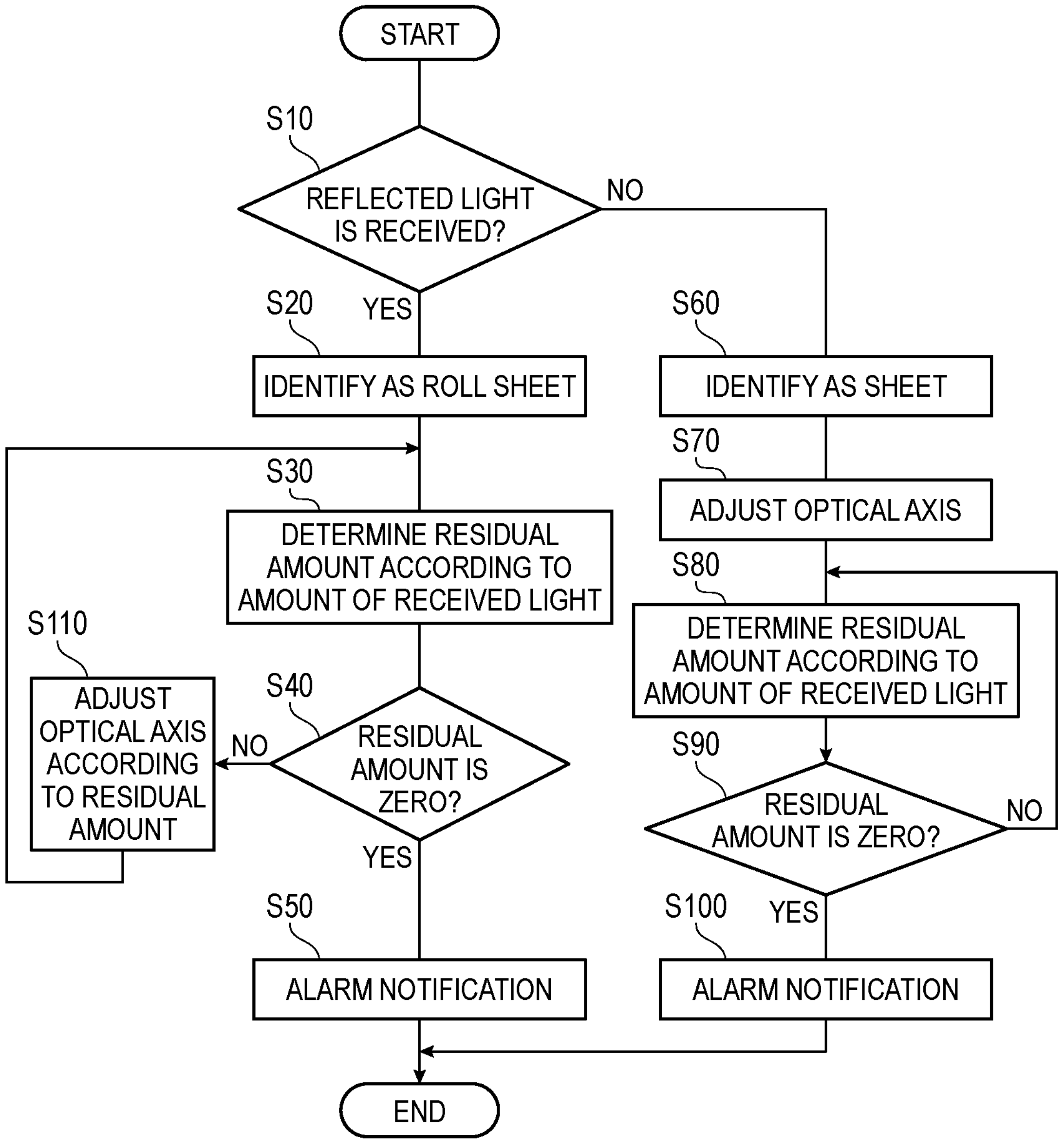
FIG. 20 is a flowchart depicting a control procedure that is executed by the CPU of the ASIC.

In the above, the flowcharts shown in FIGS. 15, 17 and 20 are not to be construed as limiting the present disclosure to the procedures shown in the flowcharts, and a procedure can be added/deleted or a sequence may be changed without departing from the gist and technical spirit of the disclosure.

In addition to the above, the methods of the second embodiment and the modified embodiments thereof may be appropriately combined and used.

Third Embodiment

In the below, an inkjet printer (hereinbelow, simply referred to as "printer") in accordance with a third embodiment of the present disclosure is described with reference to the drawings. In descriptions below, the upper and lower direction is defined based on a state (a state shown in FIG. 21) where a printer 2001 is equipped to be usable, the front and rear direction is defined based on a state where a side on which an opening 2013 of a housing 2011 is provided is a front side (front face), and the right and left direction is defined based on a state where the printer 2001 is seen from the front side (front face).

Figure 21:
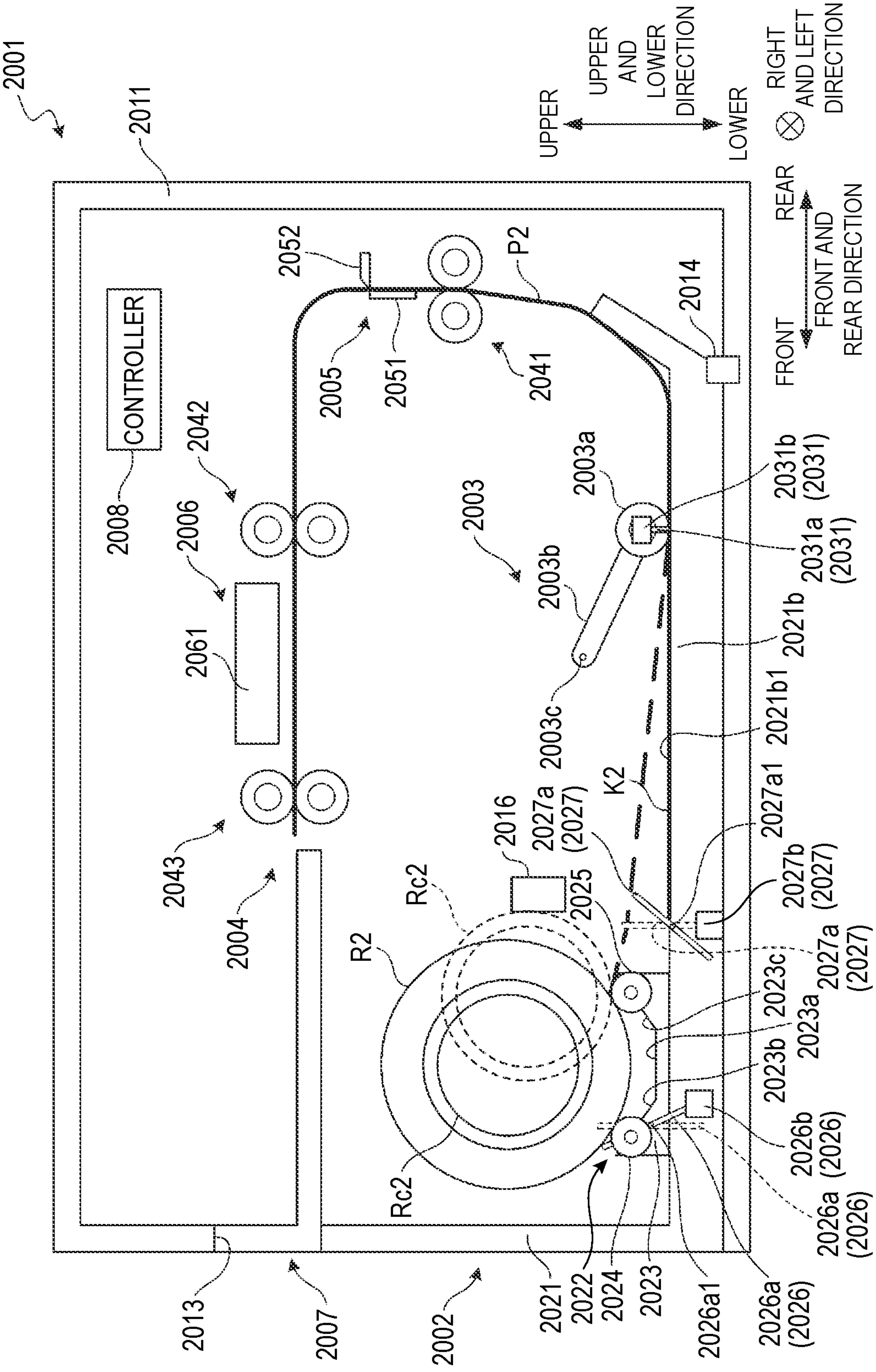
FIG. 21 is a side view depicting a schematic configuration of a printer in accordance with a third embodiment of the present disclosure.

As shown in FIG. 21, the printer 2001 mainly includes a feeding cassette 2002, a feeding unit 2003, a conveying unit 2004, a cutting mechanism 2005, a recording unit 2006, a discharge tray 2007, a controller 2008, and the like. The feeding cassette 2002 is arranged below the recording unit 2006 in the housing 2011. The discharge tray 2007 is arranged in front of the recording unit 2006 and above the feeding cassette 2002, in the housing 2011.

The feeding cassette 2002 and the discharge tray 2007 can be inserted into the housing 2011 through the opening 2013 in the front and rear direction. The feeding cassette 2002 and the discharge tray 2007 mounted in the housing 2011 can also be demounted through the opening 2013 in the front and rear direction. The housing 2011 is provided with a cassette detection sensor 2014 capable of detecting whether the feeding cassette 2002 is mounted or demounted.

The cassette detection sensor 2014 is a switch-type mechanical sensor to and from which the feeding cassette 2002 comes into contact and separated, and is configured to output a signal to the controller 2008. When the feeding cassette 2002 is mounted, the cassette detection sensor 2014 is in contact with the feeding cassette 2002 and an output signal becomes on, and when the feeding cassette 2002 is demounted, the cassette detection sensor 2014 separates from the feeding cassette 2002 and an output signal becomes off. The mechanism of the cassette detection sensor 2014 is not limited thereto. For example, a non-contact type using a photo sensor may also be used.

The feeding cassette 2002 can selectively accommodate any one sheet P2 of a roll sheet R2 (corresponding to the "roll medium" of the present disclosure) and a cut sheet K2 (corresponding to the "single sheet medium" of the present disclosure). The roll sheet R2 has a configuration where a long sheet P is wound in a roll shape on an outer peripheral surface of a cylindrical core member (paper tube) Rc2. As shown in FIG. 21, the feeding cassette 2002 mainly includes a tray 2021 having a box shape opened upward, a support part 2022 configured to rotatably support the roll sheet R2 by contacting an outer peripheral surface of a lower part of the roll sheet R2, a roll sheet detection sensor 2026, and a medium rear end detection sensor 2027. Also, a stopper 2016 is provided at the rear of an area of the feeding cassette 2002, in which the roll sheet R2 is accommodated. The stopper 2016 may be supported by the housing 2011 or by the feeding cassette 2002.

The support part 2022 is arranged on a front side (a left side in FIG. 21) part of a bottom part 2021*b* of the tray 2021. As for the cut sheet K2, the entire cut sheet K2 is supported on a support surface 2021*b*1 that is an upper surface of the bottom part 2021*b* of the tray 2021, in a state where the support part 2022 is detached from the tray 2021. The cut sheet K2 is accommodated in the feeding cassette 2002 with a rear end thereof coinciding with a rear end of the support surface 2021*b*1 of the tray 2021 (refer to FIGS. 25B and 25C).

The support part 2022 includes a support base 2023 and two rollers 2024 and 2025. The roll sheet R2 is supported on the support part 2022 in a posture where an axis direction is parallel to the right and left direction (a direction perpendicular to the drawing sheet of FIG. 21). The support base 2023 is detachably provided on the bottom part 2021*b* of the tray 2021. The support base 2023 extends in the right and left direction. The rollers 2024 and 2025 are all rotatably supported on the support base 2023 in a posture where axis directions are parallel to the right and left direction.

The support base 2023 has a first surface 2023*a* that is a horizontal surface facing upward, a second surface 2023*b* that is a planar surface located in front (the left in FIG. 21) of the first surface 2023*a*, and a third surface 2023*c* that is a planar surface located at the rear (the right in FIG. 21) of the first surface 2023*a*. The second surface 2023*b* is an inclined surface inclined so that a front side is located higher than a rear side, and a rear end thereof is connected to the first surface 2023*a*. The third surface 2023*c* is an inclined surface inclined so that a rear side is located higher than a front side, and a front end thereof is connected to the first surface 2023*a*. The roller 2024 is arranged on the second surface 2023*b*. The roller 2025 is arranged on the third surface 2023*c*. The rollers 2024 and 2025 are configured to support the roll sheet R2 from below in a state of contacting the outer peripheral surface of the lower part of the roll sheet R2.

In the feeding cassette 2002, the roll sheet R2 is placed on the rollers 2024 and 2025, so that the roll sheet R2 can be supported on the support part 2022. Therefore, for example, as compared to a configuration where a spool is configured to support the roll sheet R2, it is easier to perform a replacement operation for the roll sheet R2.

Here, examples of the roll sheet R2 include a roll sheet whose rear end portion is not fixed to the winding core Rc2 and a roll sheet whose rear end portion is fixed to the winding core Rc2. In a case where the roll sheet R2 whose rear end portion is not fixed to the winding core Rc2 is supported on the support part 2022, when the sheet has run out, the rear end portion of the roll sheet R2 separates from the winding core Rc2 and is fed rearward by the feeding unit 2003, which will be described in detail later. On the other hand, in a case where the roll sheet R2 whose rear end portion is fixed to the winding core Rc2 is supported on the support part 2022, when the sheet has run out, the winding core Rc2 is pulled and moved rearward by the sheet P2 that is fed rearward by the feeding unit 2003. The winding core Rc2 that is moving rearward separates from the support part 2022, and comes into contact with the stopper 2016 and is stopped by the stopper 2016, as shown with the broken line in FIG. 21.

The roll sheet detection sensor 2026 can detect whether the roll sheet R2 is supported on the support part 2022. The roll sheet detection sensor 2026 corresponds to the "first sensor" of the present disclosure. The roll sheet detection sensor 2026 includes an actuator 2026*a*, and a photo sensor 2026*b* having a light-emitting element and a light-receiving element (not shown). The actuator 2026*a* can rotate about a shaft 2026*a*1 that is a rod-shaped member and extends in the right and left direction (a direction perpendicular to the drawing sheet of FIG. 21). The shaft 2026*a*1 is supported by the support base 2023. The actuator 2026*a* is urged in a clockwise direction in FIG. 21 by an urging member (not shown).

When the roll sheet R2 is not supported on the support part 2022, the actuator 2026*a* is in a vertical posture where a length direction thereof coincides with the upper and lower direction, as shown with the broken line in FIG. 21. When the roll sheet R2 is supported on the support part 2022, an upper end portion of the actuator 2026*a* is pushed by the roll sheet R2 and is thus rotated in a counterclockwise direction in FIG. 21, so that the actuator 2026*a* is in an inclined posture where an upper end is positioned on a front side and a lower end is positioned on a rear side, as shown with the solid line in FIG. 21.

The photo sensor 2026 is configured to output a signal to the controller 2008. The photo sensor 2026*b* is provided at a position at which it can detect a lower end portion of the actuator 2026*a* in the inclined posture and cannot detect the actuator 2026*a* in the vertical posture. Therefore, when the roll sheet R2 is not supported on the support part 2022 and when the support part 2022 is demounted from the tray 2021, the output signal of the photo sensor 2026*b* becomes off. When the roll sheet R2 is supported on the support part 2022, the output signal of the photo sensor 2026*b* becomes on.

The medium rear end detection sensor 2027 includes an actuator 2027*a*, and a photo sensor 2027*b* having a light-emitting element and a light-receiving element (not shown). The medium rear end detection sensor 2027 corresponds to the "second sensor" of the present disclosure. The actuator 2027*a* is arranged between the support part 2022 and the feeding unit 2003, which will be described in detail later. The actuator 2027*a* can rotate about a shaft 2027*a*1 that is a rod-shaped member and extends in the right and left direction (a direction perpendicular to the drawing sheet of FIG. 21). The shaft 2027*a*1 is supported on the bottom part 2021*b* of the tray 2021. The actuator 2027*a* is urged in a counterclockwise direction in FIG. 21 by an urging member (not shown). When the actuator 2027*a* is not in contact with the sheet P2, the actuator 2027*a* is in a vertical posture where a length direction coincides with the upper and lower direction.

The photo sensor 2027*b* is configured to output a signal to the controller 2008. The photo sensor 2027*b* is provided at a position at which it can detect a lower end portion of the actuator 2027*a* in the vertical posture. When the sheet P2 comes into contact with the actuator 2027*a* in the vertical posture, the actuator 2027*a* is pushed by the sheet P2 and is thus rotated in a clockwise direction in FIG. 21. Thereby, the lower end portion of the actuator 2027*a* is not detected by the photo sensor 2027*b*. The position of the actuator 2027*a* in the vertical posture is a detection position of the medium rear end detection sensor 2027, and when there is no sheet P2 at the detection position, an output signal from the photo sensor 2027*b* becomes on, and when there is the sheet P2 at the detection position, an output signal from the photo sensor 2027*b* becomes off.

The detection position of the medium rear end detection sensor 2027, i.e., the position of the actuator 2027*a* in the vertical posture is located on a path through which the sheet P2 unwound from the roll sheet R2 passes. Therefore, while the sheet P2 is unwound from the roll sheet R2 supported on the support part 2022, the actuator 2027*a* is pushed by the sheet P2 and is thus rotated in the clockwise direction in FIG. 21. As a result, the actuator 2027*a* is inclined so that an upper end is positioned rearward and a lower end is positioned forward, as shown with the solid line in FIG. 21.

Figure 25A:
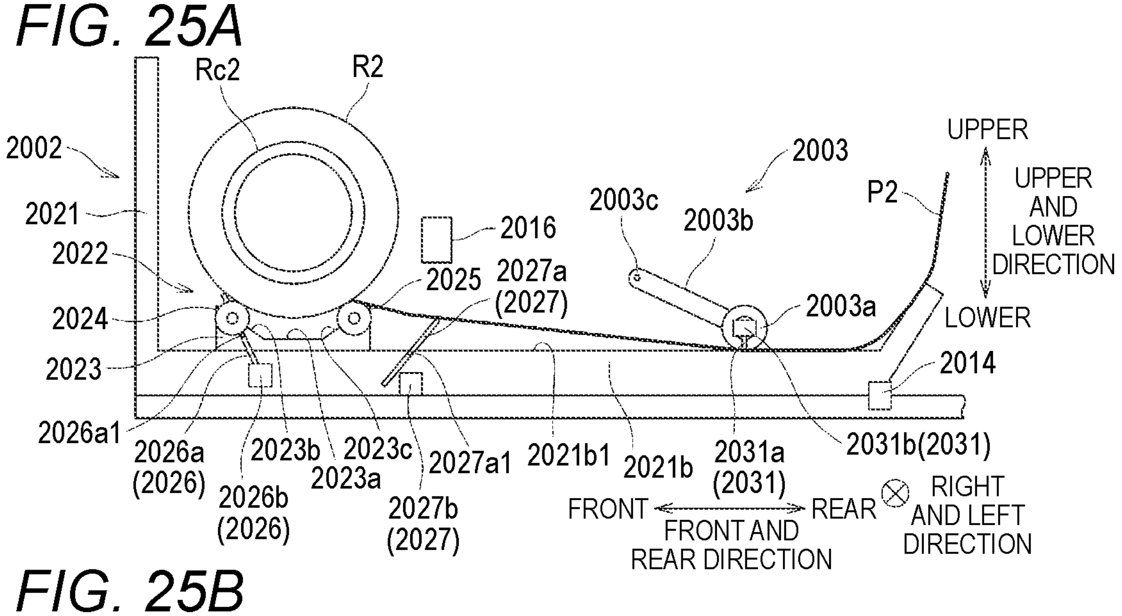
FIG. 25A is a side view of a feeding cassette shown in FIG. 21, depicting a state where a roll sheet is accommodated.
Figure 25B:
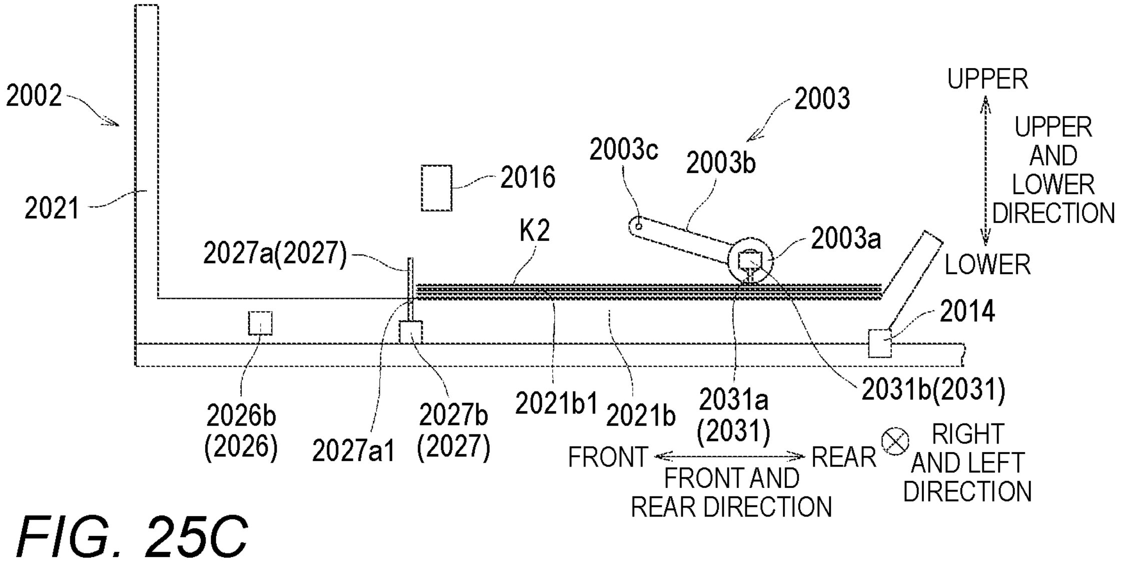
FIG. 25B is a side view of the feeding cassette shown in FIG. 21, depicting a state where a cut sheet having a predetermined size is accommodated.
Figure 25C:
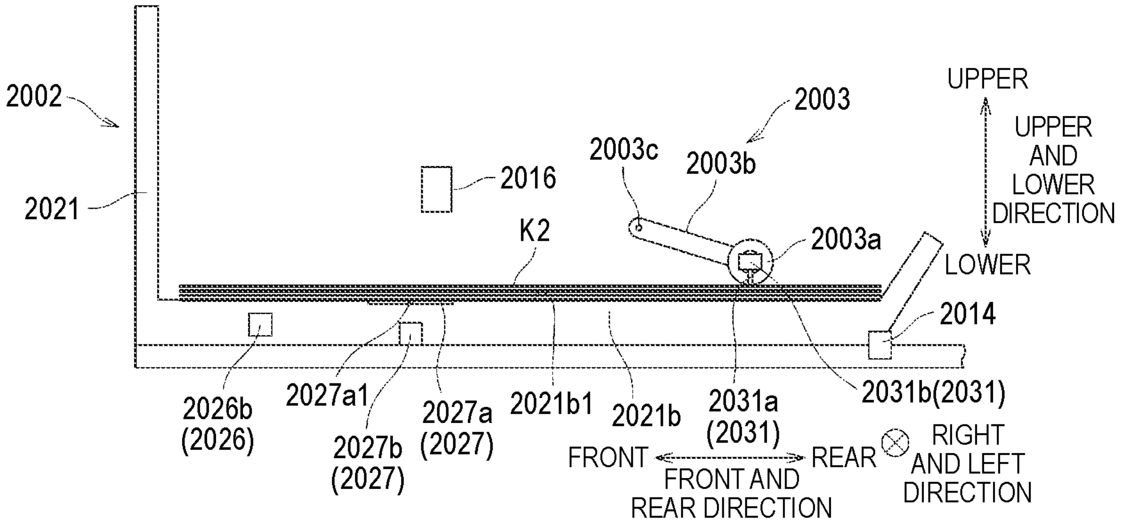
FIG. 25C is a side view of the feeding cassette shown in FIG. 21, depicting a state where a cut sheet having a size larger than the predetermined size is accommodated.

The detection position of the medium rear end detection sensor 2027, i.e., the position of the actuator 2027*a* in the vertical posture is located in the vicinity of a front end of the cut sheet K2 on the support surface 2021*bl* of the tray 2021 when the cut sheet K2 of a predetermined size (in the third embodiment, A4 size) is accommodated in the feeding cassette 2002. More specifically, the detection position of the medium rear end detection sensor 2027 is a position located outside of an area of the support surface 2021*b*1 of the tray 2021 in which the cut sheet K2 of a predetermined size is supported, and adjacent to a front end portion of the area. As shown in FIG. 25B, the actuator 2027*a* is in the vertical posture when the cut sheet K2 having a size (a length in the front and rear direction) equal to or smaller than the predetermined size is accommodated in the feeding cassette 2002. As shown in FIG. 25C, when the cut sheet K2 having a size (a length in the front and rear direction) larger than the predetermined size is accommodated in the feeding cassette 2002, the actuator 2027*a* is pushed by the sheet P2 and is thus rotated in the clockwise direction in FIG. 21, so that the length direction thereof faces toward the horizontal direction.

The output signal from the photo sensor 2026*b* becomes on when the sheet P2 unwound from the roll sheet R2 supported on the support part 2022 does not exist at the detection position (for example, a state shown in FIG. 26A), when no cut sheet K is accommodated in the feeding cassette 2002, and when the cut sheet K2 having a size equal to or smaller than the predetermined size is accommodated in the feeding cassette 2002 (a state shown in FIG. 25B). The output signal from the photo sensor 2026*b* becomes off when the sheet P2 unwound from the roll sheet R2 supported on the support part 2022 exists at the detection position (for example, a state shown in FIG. 26B) and when the cut sheet K2 having a size larger than the predetermined size is accommodated in the feeding cassette 2002 (a state shown in FIG. 25C).

The feeding unit 2003 is arranged above the feeding cassette 2002, and mainly includes a feeding roller 2003*a*, an arm 2003*b*, a feeding motor 2003M (refer to FIG. 22) and a medium presence detection sensor 2031. The feeding roller 2003*a* is pivotally supported by a tip end of the arm 2003*b*. The arm 2003*b* is rotatably supported by a support shaft 2003*c*. The arm 2003*b* is urged by a spring or the like in a direction in which the feeding roller 2003*a* comes into contact with the support surface 2021*b*1 of the tray 2021. Therefore, when the sheet P2 is supported on the support surface 2021*b*1, the feeding roller 2003*a* comes into contact with the sheet P2. The arm 2003*b* is also configured to retreat upward when mounting and demounting the feeding cassette 2002. The feeding roller 2003*a* is configured to rotate as a drive force from the feeding motor 2003M is transmitted thereto, thereby applying a conveying force in a feeding direction (rearward) to the sheet P2. When the feeding motor 2003M is driven under control of the controller 2008, the feeding roller 2003*a* rotates, so that any sheet P2 of the roll sheet R2 and the cut sheet K2 accommodated in the feeding cassette 2002 is fed rearward. Note that, the sheet P2 fed rearward by the feeding unit 2003 faces upward at a rear end portion of the feeding cassette 2002.

The medium presence detection sensor 2031 is a sensor supported by the arm 2003*b* and capable of detecting whether the sheet P2 is located at a position at which the sheet P2 can be fed by the feeding unit 2003. The medium presence detection sensor 2031 corresponds to the "third sensor" of the present disclosure. The medium presence detection sensor 2031 includes an actuator 2031*a*, and a photo sensor 2031*b* having a light-emitting element and a light-receiving element (not shown).

The actuator 2031*a* is a rod-shaped member arranged in the vicinity of the feeding roller 2003*a* in a posture where a length direction thereof faces toward the upper and lower direction, and can move in the upper and lower direction. The actuator 2031*a* is urged downward by an urging member (not shown) and is located at a descent position at which a lower end portion thereof is positioned lower than a lower end of the feeding roller 2003*a* when the actuator is not in contact with the sheet P2. When the lower end portion of the actuator 2031*a* comes into contact with the sheet P2, the actuator 2031*a* is pushed and moved upward by the sheet P2 and is located at an ascent position at which the lower end of the actuator is substantially flush with the lower end of the feeding roller 2003*a*.

The photo sensor 2031*b* is configured to output a signal to the controller 2008. The photo sensor 2031*b* is provided at a position at which it can detect an upper end portion of the actuator 2031*a* located at the ascent position and cannot detect the actuator 2031*a* located at the descent position. Therefore, the vicinity of the feeding roller 2003*a*, in which the actuator 2031*a* is arranged, becomes the detection position of the medium presence detection sensor 2031. In a case where the sheet P2 does not exist at the detection position of the medium presence detection sensor 2031, the output signal from the photo sensor 2031*b* becomes off, and in a case where the sheet P2 exists at the detection position, the output signal from the photo sensor 2031*b* becomes on.

The conveying unit 2004 is configured to convey the sheet P2, which is fed from the feeding cassette 2002 by the feeding unit 2003, in a direction perpendicular to the right and left direction in the housing 2011. The conveying unit 2004 mainly includes three conveying roller pairs 2041 to 2043 arranged in order from an upstream side with respect to the conveying direction, and a conveying motor 2004M (refer to FIG. 22). The conveying roller pairs 2041 to 2043 are each configured to apply a conveying force in the conveying direction to the sheet P2 by contacting the sheet P2. The conveying roller pairs 2041 and 2042 correspond to the "first conveying unit" and the "second conveying unit" of the present disclosure, respectively, and are arranged on an upstream side and on a downstream side of the cutting mechanism 2005 with respect to a feeding direction of the sheet P2 by the feeding unit 2003.

Each of the conveying roller pairs 2041 to 2043 is configured by a drive roller configured to rotate as a drive force from the conveying motor 2004M is transmitted thereto, and a driven roller configured to rotate in conjunction with the drive roller. When the conveying motor 2004M is driven under control of the controller 2008, the drive rollers and the driven rollers of the conveying roller pairs 2041 to 2043 rotate in a state of nipping the sheet P2, so that the sheet P2 is conveyed in the conveying direction.

Here, in order to send the sheet P2 fed from the feeding unit 2003 to a downstream side of the cutting mechanism 2005, a length of the sheet P2 in the conveying direction is required to be equal to or greater than a length along a conveying path from a nip position of the sheet P2 by the conveying roller pair 2041 to a nip position of the sheet P2 by the conveying roller pair 2042. Therefore, the length along the conveying path from the nip position of the sheet P2 by the conveying roller pair 2041 to the nip position of the sheet P2 by the conveying roller pair 2042 is set as a length necessary for conveying.

Figure 22:
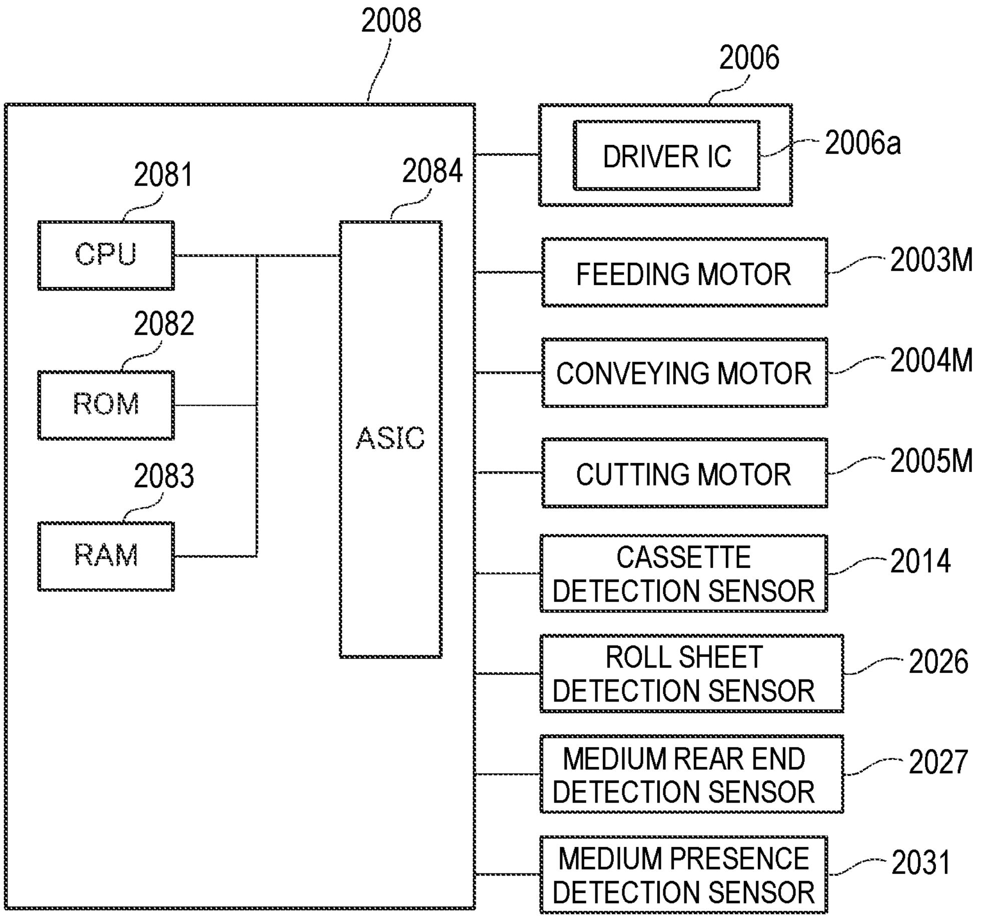
FIG. 22 is a block diagram of a controller of the printer shown in FIG. 21.

The cutting mechanism 2005 mainly includes a fixed blade 2051, a movable blade 2052 and a cutting motor 2005M (refer to FIG. 22). The fixed blade 2051 extends in the right and left direction (a direction perpendicular to the drawing sheet of FIG. 21). The movable blade 2052 is configured to be movable in the right and left direction as a drive force from the cutting motor 2005M is transmitted thereto. When the cutting motor 2005M is driven under control of the controller 2008 and the movable blade 2052 is thus moved in the right and left direction, the fixed blade 2051 and the movable blade 2052 cooperatively cut, in the width direction, the sheet P2 unwound from the roll sheet R2 and fed by the feeding unit 2003. Thereby, a rear end of the sheet P2 is formed.

The recording unit 2006 is arranged between the conveying roller pair 2042 and the conveying roller pair 2043, and mainly includes a recording head 2061 and a driver IC 2006*a* (refer to FIG. 22). The recording head 2061 has a plurality of nozzles (not shown) formed in a lower surface thereof. When the driver IC 2006*a* is driven under control of the controller 2008, the recording head 2061 ejects, from the nozzles, ink supplied from an ink cartridge (not shown) or an ink tank (not shown) having an injection port through which ink can be supplemented, thereby recording an image on the sheet P2 conveyed by the conveying roller pairs 2042. The sheet P2 having an image recorded thereon is conveyed forward (the left in FIG. 21) by the conveying roller pair 2043. Note that, the recording head 2061 of the present embodiment is a serial type configured to eject ink from nozzles while moving in the right and left direction but may also be a line type configured to eject ink from nozzles in a position fixed state.

In the discharge tray 2007, the sheet P2 having an image recorded by the recording unit 2006 and conveyed forward by the conveying roller pair 2043 is accommodated. The conveying roller pair 2043 corresponds to the "discharge part" of the present disclosure. The sheet P2 accommodated in the discharge tray 2007 is any one of the sheet P2 unwound from the roll sheet R, having a rear end formed by the cutting mechanism 2005 and having an image recorded thereon by the recording unit 2006, and the sheet P2 having an image recorded on the cut sheet K2 by the recording unit 2006.

Subsequently, the controller 2008 responsible for control on the entire printer 2001 is described with reference to FIG. 22. The controller 2008 is connected to the driver IC 2006*a*, the feeding motor 2003M, the conveying motor 2004M, the cutting motor 2005M, the cassette detection sensor 2014, the roll sheet detection sensor 2026, the medium rear end detection sensor 2027, the medium presence detection sensor 2031 and a display 2009 by a bus. The display 2009 is provided on an outer surface of the housing 2011.

The controller 2008 includes a CPU (Central Processing Unit) 2081, a ROM (Read Only Memory) 2082, a RAM (Random Access Memory) 2083, an ASIC (Application Specific Integrated Circuit) 2084 and the like connected to each other by a bus. In the ROM 2082, a control program for controlling the printer 2001, a variety of settings, initial values and the like are stored. The RAM 2083 is used as a work area from which diverse control programs are read out or a storage area in which data is temporarily stored. They cooperate with each other to control operations of the driver IC 2006*a*, the feeding motor 2003M, the conveying motor 2004M, the cutting motor 2005M, the display 2009 and the like. The controller 2008 is also configured to receive signals from the cassette detection sensor 2014, the roll sheet detection sensor 2026, the medium rear end detection sensor 2027, and the medium presence detection sensor 2031.

In the RAM 2083, image data relating to image recording on the sheet P2 that is executed by the recording unit 2006 can be stored. The recording data is transmitted from a terminal such as a PC (Personal Computer) connected to the printer 2001 and a smart phone, a digital camera, a scanner and the like to the RAM 2083. In descriptions below, the recording data that is recorded on the same sheet P is referred to as "one recording job". In a case of the cut sheet K2, the "same sheet P2" means one cut sheet K. In a case of the roll sheet R2, the "same sheet P2" means one sheet P2 that is a part of the long sheet P2 wound on the outer peripheral surface of the winding core Rc2 and has at least one of a tip end and a rear end in the conveying direction formed as a result of cutting by the cutting mechanism 2005.

The controller 2008 is configured to execute medium determining processing of determining whether the sheet P2 accommodated in the feeding cassette 2002 is the roll sheet R2 or the cut sheet K2, based on an output signal from the photo sensor 2026*b* of the roll sheet detection sensor 2026. In the medium determining processing, in a case where the output signal from the photo sensor 2026*b* is an ON signal indicating that the roll sheet R2 is supported on the support part 2022, it is determined that the roll sheet R2 is accommodated in the feeding cassette 2002 (refer to FIG. 25A). In a case where the output signal from the photo sensor 2026*b* is an OFF signal indicating that the roll sheet R2 is not supported on the support part 2022, it is determined that the cut sheet K is accommodated in the feeding cassette 2002 (refer to FIGS. 25B and 25C).

The controller 2008 is configured to execute roll medium-running out determining processing of determining whether the roll sheet R2 has run out, based on output signals from the photo sensor 2026*b* of the roll sheet detection sensor 2026 and the photo sensor 2027*b* of the medium rear end detection sensor 2027. Here, in a case of the roll sheet R2 whose rear end portion is fixed to the winding core Rc2, when the sheet has run out, the winding core Rc2 is pulled and moved rearward by the sheet P2 that is sent rearward by the feeding unit 2003, and separates from the support part 2022, as shown in FIG. 26B. Therefore, the roll medium-running out determining processing determines that the roll sheet R2 has run out when the output signal from the photo sensor 2026*b* is switched to the OFF signal indicating that the roll sheet R2 is not supported on the support part 2022 while the sheet P2 is fed by the feeding unit 2003 after it is determined in the medium determining processing that the roll sheet R2 is accommodated in the feeding cassette 2002.

Figure 26A:
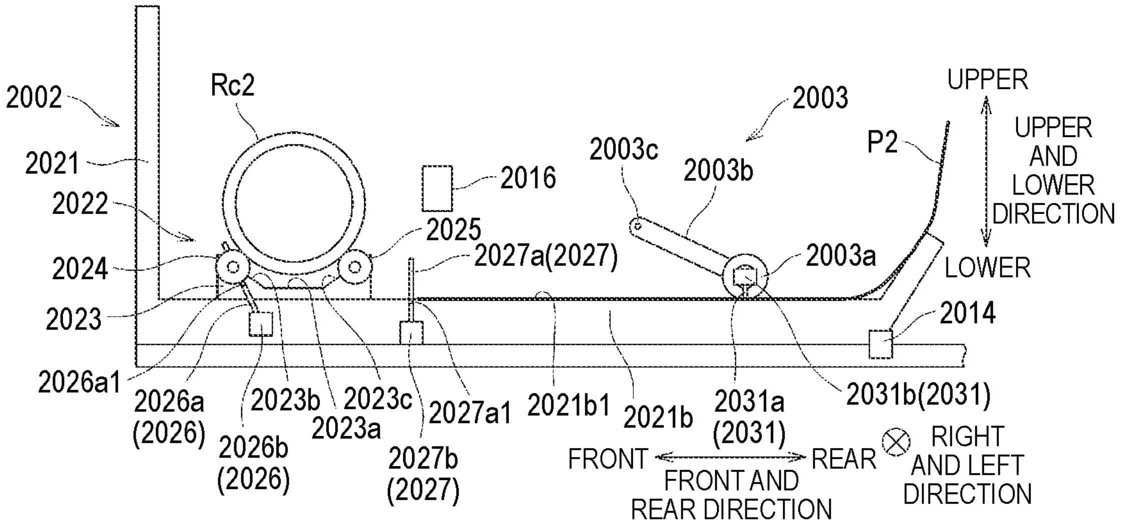
FIG. 26A is a side view of the feeding cassette shown in FIG. 21, depicting a state where a roll sheet whose rear end portion is not fixed to a winding core has run out of sheet.
Figure 26B:
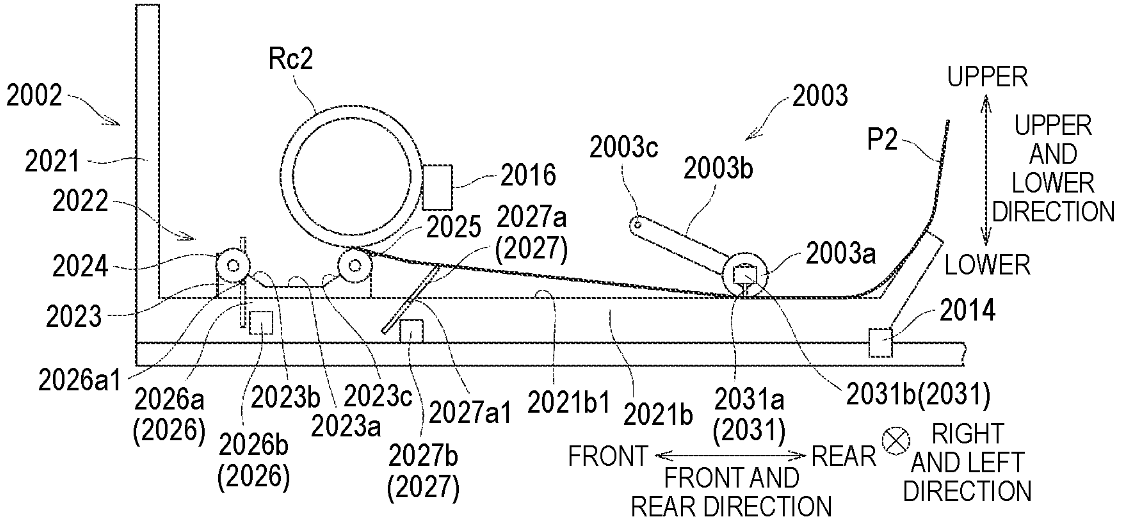
FIG. 26B is a side view of the feeding cassette shown in FIG. 21, depicting a state where a roll sheet whose rear end portion is fixed to a winding core has run out of sheet.

In a case of the roll sheet R2 whose rear end portion is not fixed to the winding core Rc2, when the sheet has run out, the rear end portion of the roll sheet R2 separates from the winding core Rc2 and is fed rearward by the feeding unit 2003, as shown in FIG. 26A. Note that, the winding core Rc2 is held supported on the support part 2022. Therefore, the roll medium-running out determining processing determines that the roll sheet R2 has run out when the output signal from the photo sensor 2027*b* is switch from the signal (i.e., ON signal), which indicates that the sheet P2 exists at the detection position, to the signal (i.e., OFF signal), which indicates that the sheet P2 does not exist at the detection position, while the sheet P2 is fed by the feeding unit 2003 after it is determined in the medium determining processing that the roll sheet R2 is accommodated in the feeding cassette 2002.

Here, in the case of the roll sheet R2 whose rear end portion is not fixed to the winding core Rc2, a residual length of the sheet P2 at the time it is determined in the roll medium-running out determining processing that the roll sheet R2 has run out is always longer than a length along a conveying path from the detection position of the medium rear end detection sensor 2027 to a cutting position for the sheet P2 by the cutting mechanism 2005. Therefore, the length along the conveying path from the detection position of the medium rear end detection sensor 2027 to the cutting position for the sheet P2 by the cutting mechanism 2005 is set as the shortest residual length. The shortest residual length is set longer than the length necessary for conveying (a length along the conveying path from the nip position of the sheet P2 by the conveying roller pair 2041 to the nip position of the sheet P2 by the conveying roller pair 2042). Therefore, after it is determined that the roll sheet R2 has run out, it is possible to convey the sheet P2 to a further downstream side than the cutting mechanism 2005 by the conveying roller pair 2041 and the conveying roller pair 2042.

In a case where it is determined in the roll medium-running out determining processing that the sheet has run out as the output signal from the photo sensor 2026*b* is switched to the signal indicating that the roll sheet R2 is not supported on the support part 2022, the controller 2008 does not permit recording by the recording unit 2006.

The controller 2008 executes comparison processing at the time it is determined in the roll medium-running out determining processing that the sheet has run out as the output signal from the photo sensor 2027*b* is switched from the signal indicating that there is the sheet P2 to the signal indicating that there is no sheet P2. In the comparison processing, a length necessary for recording that is a length of the sheet P2 necessary to complete one recording job for recording on the same sheet P2 by the recording unit 2006 from now on is compared with an unrecorded residual length that is a length of a part of the sheet P2 of the roll sheet R2 on which an image is not recorded yet by the recording unit 2006.

In a case where it is determined in the comparison processing that the unrecorded residual length is equal to or longer than the length necessary for recording, the controller 2008 permits recording in the recording unit 2006. In a case where it is determined in the comparison processing that the unrecorded residual length is shorter than the length necessary for recording, the controller 2008 does not permit recording in the recording unit 2006 and discharges the sheet P2 by the conveying roller pair 2043.

The controller 2008 is configured to execute roll medium setting determining processing of determining whether the roll sheet R2 is (normally) set in the feeding cassette 2002 in a state in which the roll sheet R2 can be fed by the feeding unit 2003, based on the output signal from the photo sensor 2031*b* of the medium presence detection sensor 2031. The roll medium setting determining processing determines that the roll sheet R2 is normally set in the feeding cassette 2002, in a case where the output signal from the photo sensor 2031*b* is an ON signal indicating that the sheet P exists at the detection position.

Figure 23:
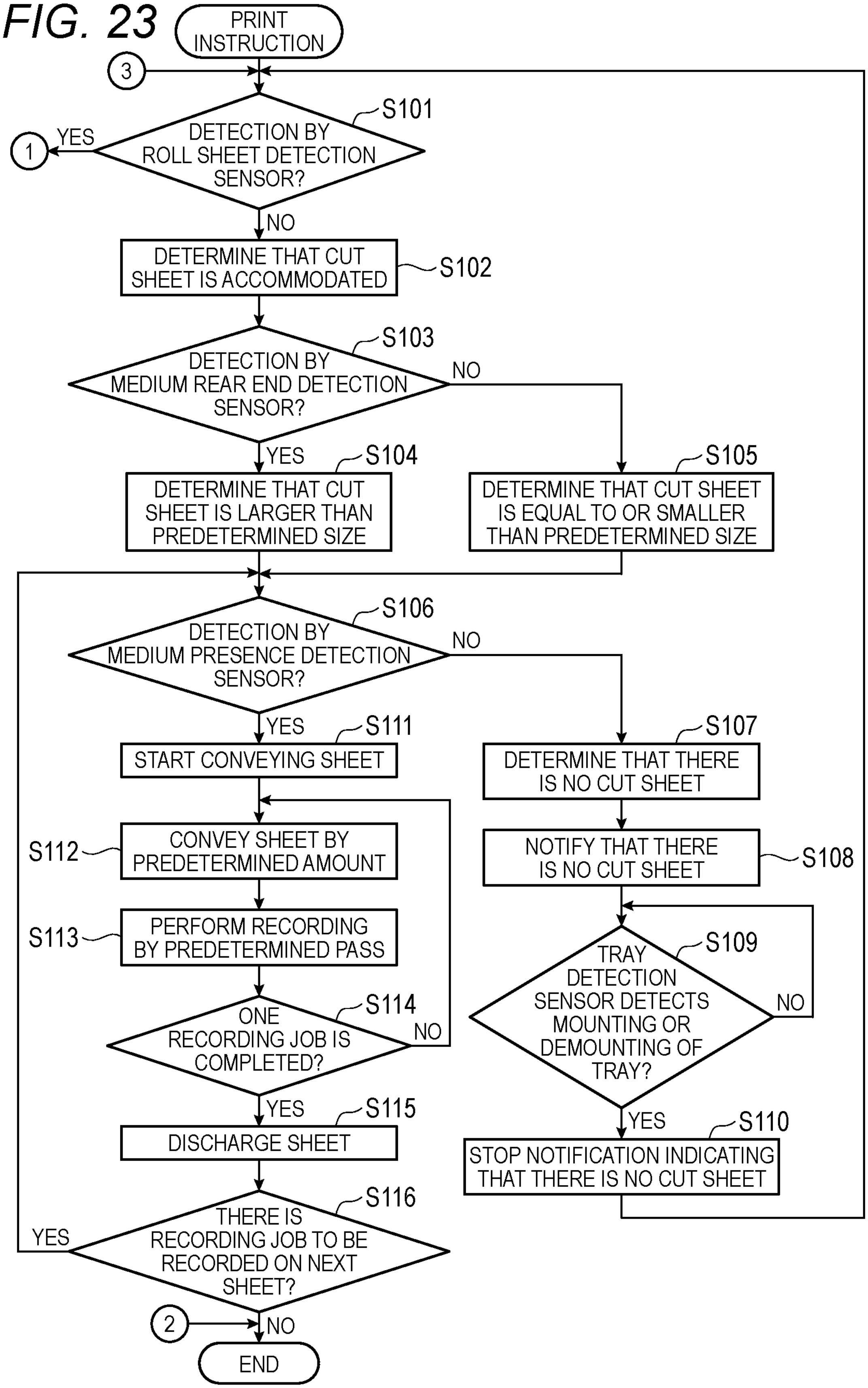
FIG. 23 is a first half part of a flowchart depicting an example of a processing procedure that is executed in the printer shown in FIG. 21.
Figure 24A:
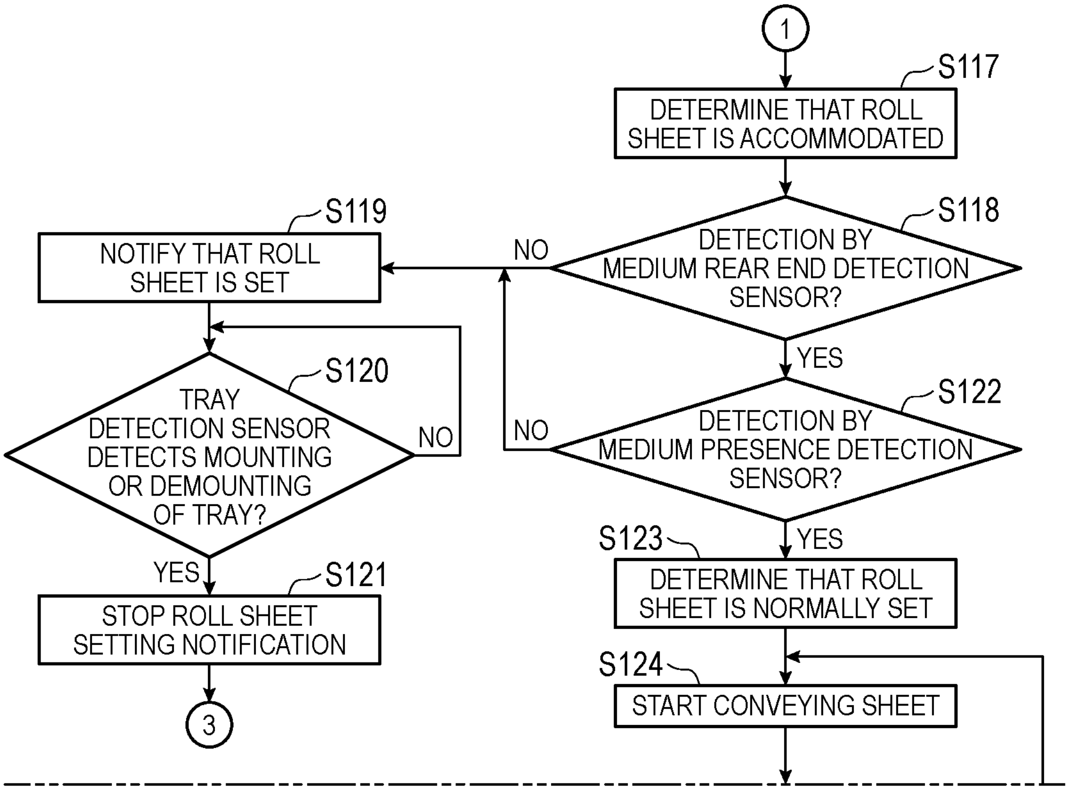
FIGS. 24A and 24B are a second half part of the flowchart depicting the example of the processing procedure that is executed in the printer shown in FIG. 21.
Figure 24B:
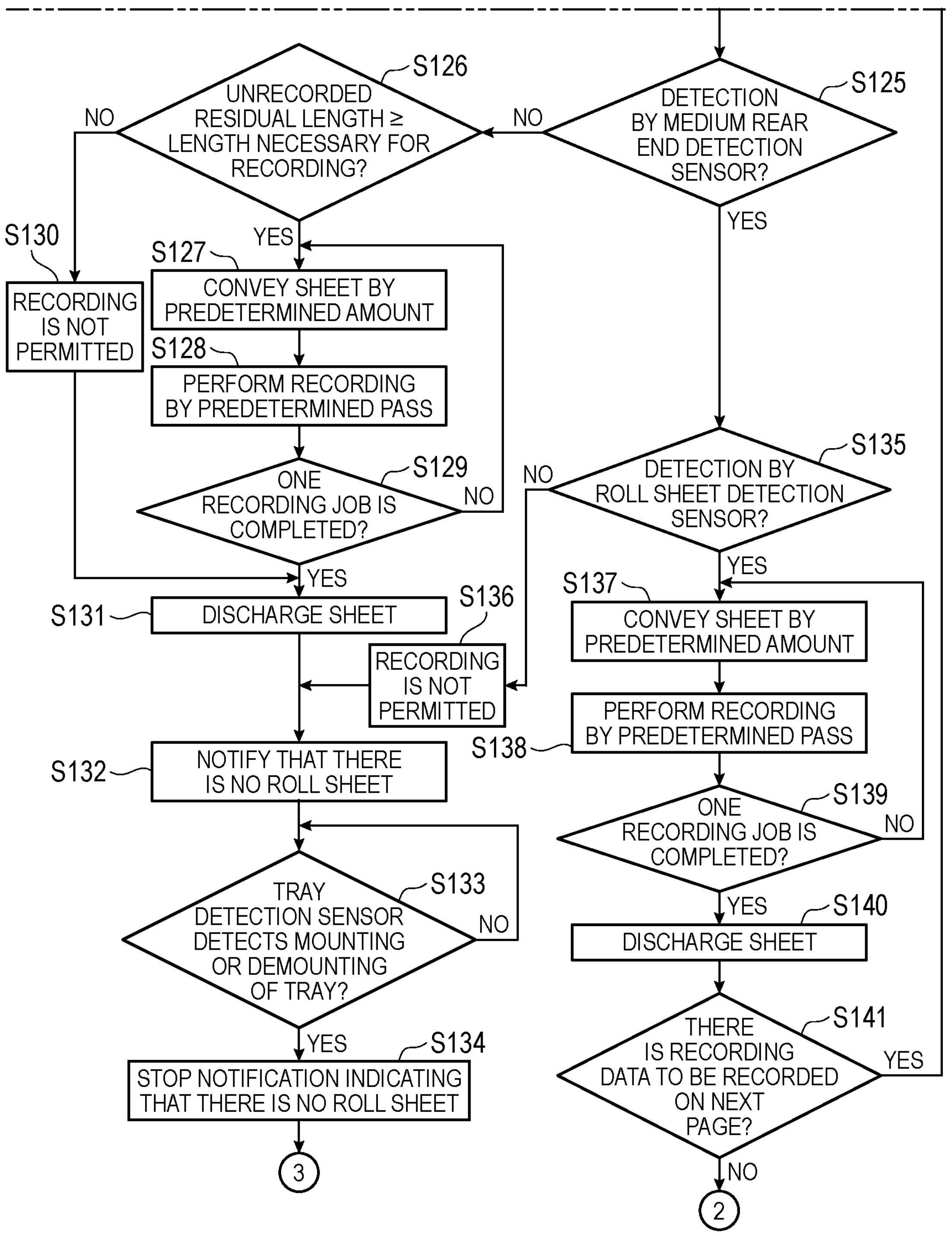

Subsequently, an example of processing that is executed in the controller 2008 when recording an image in the printer 2001 is described with reference to FIGS. 23, 24A, and 24B. The processing that is described below starts when the controller 2008 receives a print instruction. The print instruction is input by a user via a terminal such as a PC connected to the printer 2001 and a smart phone or via an input device (not shown) provided to the printer 2001.

First, the controller 2008 determines whether the roll sheet detection sensor 2026 detects that the roll sheet R2 is supported on the support part 2022 (S101: medium determining processing). In a case where it is determined that the roll sheet detection sensor 2026 detects that the roll sheet R2 is supported on the support part 2022 (S101: YES), the flow proceeds to step S117, which will be described later. In a case where it is determined that the roll sheet detection sensor 2026 does not detect that the roll sheet R2 is supported on the support part 2022 (S101: NO), it is determined that the cut sheet K2 is accommodated in the feeding cassette 2002 (S102).

Subsequently, the controller 2008 determines whether the medium rear end detection sensor 2027 detects that the sheet P2 exists at the detection position (S103). In a case where it is determined that the medium rear end detection sensor 2027 detects that the sheet P2 exists at the detection position (S103: YES), it is determined that the cut sheet K2 accommodated in the feeding cassette 2002 is larger than the predetermined size (S104), and the flow proceeds to step S106, which will be described later. In a case where it is determined that the medium rear end detection sensor 2027 does not detect that the sheet P2 exists at the detection position (S103: NO), it is determined that the cut sheet K2 accommodated in the feeding cassette 2002 is equal to or smaller than the predetermined size (S105), and the flow proceeds to step S106, which will be described later.

Then, the controller 2008 determines whether the medium presence detection sensor 2031 detects that the sheet P2 exists at a position at which the sheet P2 can be fed by the feeding unit 2003 (S106). In a case where it is determined that the medium presence detection sensor 2031 does not detect that the sheet P2 exists at a position at which the sheet P2 can be fed by the feeding unit 2003 (S106: NO), it is determined that there is no cut sheet K2 in the feeding cassette 2002 (S107). Then, the controller 2008 controls the display 2009 so that a message, which notifies the user that there is no cut sheet K2, is to be displayed on the display 2009 (S108). Also, the controller 2008 determines whether mounting or demounting of the feeding cassette 2002 is detected by the cassette detection sensor 2014 (S109).

The determination in step S109 is repeatedly performed until it is determined that mounting or demounting of the feeding cassette 2002 is detected by the cassette detection sensor 2014. In a case where it is determined that mounting or demounting of the feeding cassette 2002 is detected by the cassette detection sensor 2014 (S109: YES), the controller 2008 controls the display 2009 to stop the display of the message, which notifies the user that there is no cut sheet K2 (S110), and the flow returns to step S101.

On the other hand, in a case where it is determined in step S106 that the medium presence detection sensor 2031 detects that the sheet P2 exists at a position at which the sheet P2 can be fed by the feeding unit 2003 (S106: YES), the controller 2008 controls the feeding motor 2003M and the conveying motor 2004M to start conveying the sheet P2 (S111). The controller 2008 controls the feeding motor 2003M and the conveying motor 2004M to convey the sheet P2 by a predetermined amount (S112), and controls the driver IC 2006*a* to perform recording by a predetermined pass (S113). Then, the controller 2008 determines whether one recording job to be recorded on the same sheet P2 is completed (S114).

In a case where it is determined that one recording job to be recorded on the same sheet P2 is not completed (S114: NO), the flow returns to step S112. In a case where it is determined that one recording job to be recorded on the same sheet P2 is completed (S114: YES), the controller 2008 controls the conveying motor 2004M to discharge the sheet P (S115). In addition, the controller 2008 determines whether there is a recording job to be recorded on a next sheet P2 (S116). In a case where it is determined that there is a recording job to be recorded on a next sheet P2 (S116: YES), the flow returns to step S106. In a case where it is determined that there is no recording job to be recorded on a next sheet P2 (S116: NO), the processing is over.

In a case where it is determined in step S101 that the roll sheet detection sensor 2026 detects that the roll sheet R2 is supported on the support part 2022 (S101: YES), it is determined that the roll sheet R2 is accommodated in the feeding cassette 2002 (S117). Then, the controller 2008 determines whether the medium rear end detection sensor 2027 detects that the sheet P2 exists at the detection position (S118).

In a case where it is determined that the medium rear end detection sensor 2027 does not detect that the sheet P2 exists at the detection position (S118: NO), the roll sheet R2 supported on the support part 2022 is not unwound to the detection position of the medium rear end detection sensor 2027 and the roll sheet R2 is not normally set in the feeding cassette 2002. Therefore, the controller 2008 controls the display 2009 so that a message, which notifies the user that the roll sheet R2 should be normally set, is displayed on the display 2009 (S119). In addition, the controller 2008 determines whether mounting or demounting of the feeding cassette 2002 is detected by the cassette detection sensor 2014 (S120).

The determination in step S120 is repeatedly performed until it is determined that mounting or demounting of the feeding cassette 2002 is detected by the cassette detection sensor 2014. In a case where it is determined that mounting or demounting of the feeding cassette 2002 is detected by the cassette detection sensor 2014 (S120: YES), the controller 2008 controls the display 2009 to stop the display of the message, which notifies the user that the roll sheet R2 should be normally set (S110), and the flow returns to step S101.

On the other hand, in a case where it is determined in step S118 that the medium rear end detection sensor 2027 detects that the sheet P2 exists at the detection position (S118: YES), the controller 2008 determines whether the medium presence detection sensor 2031 detects that the sheet P2 exists at a position at which the sheet P2 can be fed by the feeding unit 2003 (S122: roll medium setting determining processing). In a case where it is determined that the medium presence detection sensor 2031 does not detect that the sheet P2 exists at a position at which the sheet P2 can be fed by the feeding unit 2003 (S122: NO), the roll sheet R2 supported on the support part 2022 is not unwound to the position at which the sheet P2 can be fed by the feeding unit 2003 and the roll sheet R2 is not normally set in the feeding cassette 2002. Therefore, the flow proceeds to step S119 and the controller 2008 controls the display 2009 so that a message, which notifies the user that the roll sheet R2 should be normally set, is displayed on the display 2009.

In a case where it is determined that the medium presence detection sensor 2031 detects that the sheet P2 exists at a position at which the sheet P2 can be fed by the feeding unit 2003 (S122: YES), it is determined that the roll sheet R2 is normally set in the feeding cassette 2002 (S123). Then, the controller 2008 controls the feeding motor 2003M and the conveying motor 2004M to start conveying the sheet P2 (S124). Subsequently, the controller 2008 determines whether the medium rear end detection sensor 2027 detects that the sheet P2 exists at the detection position (S125: roll medium-running out determining processing).

In a case where it is determined in step S125 that the medium rear end detection sensor 2027 does not detect that the sheet P2 exists at the detection position (S125: NO), the roll sheet R2 whose rear end portion is not fixed to the winding core Rc2 has run out of sheet, and the rear end thereof is passing through the detection position of the medium rear end detection sensor 2027. At this time, the controller 2008 determines whether the unrecorded residual length of the sheet P2 configuring the roll sheet R2 is equal to or longer than the length necessary for recording of the sheet P2, which is necessary to complete one recording job from now on (S126: comparison processing).

In a case where it is determined that the unrecorded residual length is shorter than the length necessary for recording (S126: NO), the controller 2008 does not permit recording by the recording unit 2006 (S130), and the flow proceeds to S131, which will be described later. In a case where it is determined that the unrecorded residual length is equal to or longer than the length necessary for recording (S126: YES), the controller 2008 controls the feeding motor 2003M and the conveying motor 2004M to convey the sheet P2 by a predetermined amount (S127), and controls the driver IC 2006*a* to perform recording by a predetermined pass (S128). Then, the controller 2008 determines whether one recording job to be recorded on the same sheet P2 is completed (S129). In a case where it is determined that one recording job to be recorded on the same sheet P2 is not completed (S129: NO), the flow returns to step S127.

In a case where it is determined that one recording job to be recorded on the same sheet P2 is completed (S129: YES), the controller 2008 controls the conveying motor 2004M to discharge the sheet P2 (S131). Meanwhile, in a case where it is determined that the unrecorded residual length is equal to or longer than the length necessary for recording (S126: YES), the controller 2008 may control the cutting mechanism 2005 to cut the sheet P2 in any processing up to step S131 or may not perform the cutting for the sheet P2 by the cutting mechanism 2005.

Then, the controller 2008 controls the display 2009 so that a message, which notifies the user that there is no roll sheet R2, is displayed on the display 2009 (S132). In addition, the controller 2008 determines whether mounting or demounting of the feeding cassette 2002 is detected by the cassette detection sensor 2014 (S133). The determination in step S133 is repeatedly performed until it is determined that mounting or demounting of the feeding cassette 2002 is detected by the cassette detection sensor 2014. In a case where it is determined that mounting or demounting of the feeding cassette 2002 is detected by the cassette detection sensor 2014 (S133: YES), the controller 2008 controls the display 2009 to stop the display of the message, which notifies the user that there is no roll sheet R2 (S134), and the flow returns to step S101.

On the other hand, in a case where it is determined that the medium rear end detection sensor 2027 detects that the sheet P2 exists at the detection position (S125: YES), it is determined whether the roll sheet detection sensor 2026 detects that the roll sheet R2 is supported on the support part 2022 (S135). In a case where it is determined that the roll sheet detection sensor 2026 does not detect that the roll sheet R2 is supported on the support part 2022 (S135: NO), the roll sheet R2 whose rear end portion is fixed to the winding core Rc2 has run out of sheet, and the winding core Rc2 separates from the support part 2022. Therefore, the controller 2008 prohibits recording by the recording unit 2006 (S136), and proceeds to step S132 to control the display 2009 so that a message, which notifies the user that there is no roll sheet R2, is displayed on the display 2009.

In a case where it is determined in step S135 that the roll sheet detection sensor 2026 detects that the roll sheet R2 is supported on the support part 2022 (S135: YES), the controller 2008 controls the feeding motor 2003M and the conveying motor 2004M to convey the sheet P2 by a predetermined amount (S137), and controls the driver IC 2006*a* to perform recording by a predetermined pass (S138). Then, it is determined whether one recording job to be recorded on the same sheet P2 is completed (S139). In a case where it is determined that one recording job to be recorded on the same sheet P2 is not completed (S139: NO), the flow returns to step S137.

In a case where it is determined that one recording job to be recorded on the same sheet P2 is completed (S139: YES), the controller 2008 controls the conveying motor 2004M to discharge the sheet P2 (S140). On the other hand, in a case where it is determined that the roll sheet detection sensor 2026 detects that the roll sheet R2 is supported on the support part 2022 (S135: YES), the controller 2008 controls the cutting mechanism 2005 to cut the sheet P2 in any processing up to step S140.

In addition, the controller 2008 determines whether there is a recording job to be recorded on a next sheet P2 (S141). In a case where it is determined that there is a recording job to be recorded on a next sheet P2 (S141: YES), the flow returns to step S124. In a case where it is determined that there is no recording job to be recorded on a next sheet P2 (S141: NO), the processing is over.

As described above, in the printer 2001 of the third embodiment, the feeding cassette 2002 is capable of selectively accommodating any one sheet P2 of the roll sheet R2 and the cut sheet K2. The feeding cassette 2002 includes the support part 2022 configured to rotatably support the roll sheet R2 by contacting the outer peripheral surface of the lower part of the roll sheet R2, the roll sheet detection sensor 2026 configure to detect whether the roll sheet R2 is supported on the support part 2022, and the medium rear end detection sensor 2027 configured to detect whether the sheet P2 exists at the detection position located on the path which is between the support part 2022 and the feeding unit 2003 and through which the sheet P2 unwound from the roll sheet R2 passes. The controller 2008 is configured to determine that the roll sheet R2 is accommodated in a case where the output signal from the roll sheet detection sensor 2026 is a signal indicating that the roll sheet R2 is supported and determine that the cut sheet K2 is accommodated in a case where the output signal from the roll sheet detection sensor 2026 is a signal indicating that the roll sheet R2 is not supported (the medium determining processing), and determine that the roll sheet R2 has run out (i) in a case where the output signal from the roll sheet detection sensor 2026 is switched to the signal indicating that the roll sheet R2 is not supported while the sheet P2 is fed by the feeding unit 2003 after the determining determines that the roll sheet R2 is accommodated and (ii) in a case where the output signal from the medium rear end detection sensor 2027 is switched from the signal indicating that there is the sheet P2 to the signal indicating that there is no sheet P2 while the sheet P2 is fed by the feeding unit 2003 after the determining determines that the roll sheet R2 is accommodated (the roll medium-running out determining processing).

By the medium determining processing, it is possible to determine whether the sheet P2 accommodated in the feeding cassette 2002 is the roll sheet R2 or the cut sheet K2. Also, in the case of the roll sheet R2 whose rear end portion is fixed to the winding core Rc2, when the sheet has run out, the sheet P2 is fed by the feeding unit 2003, so that the winding core Rc2 separates from the support part 2022. Therefore, while the sheet P2 is fed by the feeding unit 2003, when the output signal from the roll sheet detection sensor 2026 is switched to the signal indicating that the roll sheet R2 is not supported on the support part 2022, it is possible to determine that the roll sheet R2 has run out. In the case of the roll sheet R2 whose rear end portion is not fixed to the winding core Rc2, when the sheet has run out, the sheet P2 is fed by the feeding unit 2003, so that the rear end portion of the sheet P2 passes through the detection position of the medium rear end detection sensor 2027. Therefore, while the sheet P2 is fed by the feeding unit 2003, in a case where the output signal from the medium rear end detection sensor 2027 is switched from the signal indicating that there is the sheet P2 to the signal indicating that there is no sheet P2, it is possible to determine that the roll sheet R2 has run out. In this way, in both cases where the roll sheet R2 whose rear end portion is fixed to the winding core Rc2 and where the roll sheet R2 whose rear end portion is not fixed to the winding core Rc2, it is possible to accurately determine whether the sheet has run out.

In the printer 2001 of the third embodiment, the shortest residual length that is a length along the conveying path from the detection position of the medium rear end detection sensor 2027 to the cutting position for the sheet P2 by the cutting mechanism 2005 is longer than the length necessary for conveying that is a length along the conveying path from the nip position of the sheet P2 by the conveying roller pairs 2041 to the nip position of the sheet P2 by the conveying roller pairs 2042. Therefore, in the case of the roll sheet R2 whose rear end portion is not fixed to the winding core Rc2, the length of the sheet P2 at the time the output signal is switched from the signal indicating that there is the sheet P2 to the signal indicating that there is no sheet P2 while the sheet P2 is fed, i.e., at the time it can be determined that the sheet has run out is always longer than the length necessary for conveying. Therefore, in the case of the roll sheet R2 whose rear end portion is not fixed to the winding core Rc2, after it is determined that the sheet has run out, the sheet P2 can be conveyed to a downstream side of the cutting mechanism 2005 by the conveying roller pair 2041 and the conveying roller pair 2042.

In addition, in the printer 2001 of the third embodiment, the detection position of the medium rear end detection sensor 2027 is located at the position adjacent to the area, in which the cut sheet K2 having a predetermined size is supported, of the support surface 2021*b*1 of the feeding cassette 2002. Therefore, in a case where the cut sheet K2 of a size equal to or smaller than the predetermined size is accommodated in the feeding cassette 2002, since the cut sheet K2 is not supported at the detection position of the medium rear end detection sensor 2027 on the support surface 2021*b*1, the signal indicating that there is no sheet P2 is output from the medium rear end detection sensor 2027. In a case where the cut sheet K2 of a size larger than the predetermined size is accommodated in the feeding cassette 2002, since the cut sheet K2 is supported at the detection position of the medium rear end detection sensor 2027 on the support surface 2021*b*1, the signal indicating that there is the sheet P2 is output from the medium rear end detection sensor 2027. Therefore, it is also possible to determine whether the cut sheet K2 accommodated in the feeding cassette 2002 is larger than the predetermined size by using the medium rear end detection sensor 2027.

Additionally, the printer 2001 of the third embodiment includes the medium presence detection sensor 2031 configured to detect whether the sheet P2 is located at the position at which the sheet P2 can be fed by the feeding unit 2003, and in a case where the output signal from the medium presence detection sensor 2031 indicates that there is the sheet P2, the controller 2008 determines that the roll sheet R2 is set in the feeding cassette 2002 in a state where the sheet is capable of being fed by the feeding unit 2003 (the roll medium setting determining processing). Therefore, it is possible to determine whether the roll sheet R2 is normally set in the feeding cassette 2002 in a state in which the roll sheet R2 can be fed by the feeding unit 2003.

In the printer 2001 of the third embodiment, the controller 2008 does not permit recording by the recording unit 2006 in a case where it is determined in the roll medium-running out determining processing that the roll sheet R2 has run out based on the output signal from the roll sheet detection sensor 2026 being switched to the signal indicating that the roll sheet R2 is not supported on the support part 2022. In the case of the roll sheet R2 whose rear end portion is fixed to the winding core Rc2, the rear end portion of the sheet P2 cannot be sent to the recording unit 2006. Therefore, in a case where it is determined that the sheet has run out, the recording by the recording unit 2006 is not permitted, so that it is possible to prevent useless recording from being performed in the recording unit 2006.

In the printer 2001 of the third embodiment, the controller 2008 is configured to compare the length necessary for recording and the unrecorded residual length of the sheet P2 configuring the roll sheet R2 at the time it is determined in the roll medium-running out determining processing that the roll sheet R2 has run out based on the output signal from the medium rear end detection sensor 2027 is switched from the signal indicating that there is the sheet P2 to the signal indicating that there is no sheet P2 (the comparison processing). The length necessary for recording is a length of the sheet P2 necessary to complete one recording job from now on. The recording by the recording unit 2006 is permitted in a case where it is determined in the comparison processing that the unrecorded residual length is equal to or longer than the length necessary for recording, and the recording by the recording unit 2006 is not permitted in a case where it is determined that the unrecorded residual length is shorter than the length necessary for recording. Therefore, in the case of the roll sheet R2 whose rear end portion is not fixed to the winding core Rc2, when an amount of the sheet P2 capable of completing one recording job remains at the time it is determined that the sheet has run out, the recording in the recording unit 2006 is permitted, so that the recording job can be completed. On the other hand, when an amount of the sheet P2 capable of completing one recording job does not remain at the time it is determined that the sheet has run out, the recording in the recording unit 2006 is not permitted, so that it is possible to prevent useless recording from being performed in the recording unit 2006.

In the printer 2001 of the third embodiment, the controller 2008 causes the conveying roller pair 2041 to discharge the sheet P2 in a case where it is determined in the comparison processing that the unrecorded residual length is shorter than the length necessary for recording. Therefore, since it is possible to discharge the remaining sheet P2 by the conveying roller pair 2041, it is not necessary for the user to perform an operation of removing the remaining sheet P2.

Although the third embodiment of the present disclosure has been described with reference to the drawings, it should be appreciated that the specific configuration is not limited to the embodiment. The scope of the present disclosure is defined in the claims, not in the descriptions of the embodiment, and includes all changes within the meaning and scope equivalent to the claims.

In the third embodiment, it has been described that the roll sheet detection sensor 2026, the medium rear end detection sensor 2027 and the medium presence detection sensor 2031 each have the actuator 2026*a*, 2027*a*, 2031*a* and the photo sensor 2026*b*, 2027*b*, 2031*b* capable of detecting displacement of the actuator 2026*a*, 2027*a*, 2031*a*. However, the configurations of the sensors are not limited thereto. That is, the sensors may not have an actuator, and may be configured to detect whether there is the sheet P2 or the winding core Rc2 depending on whether the light beam from the photo sensor is reflected on the sheet P2 or the winding core Rc2.

In the third embodiment, as for the feeding direction of the sheet P2 by the feeding unit 2003, it has been described that the conveying roller pair 2041 is arranged upstream of the cutting mechanism 2005. However, the conveying roller pair 2041 may not be provided. In a case where the conveying roller pair 2041 is not provided, the feeding roller 2003*a* corresponds to the "first conveying unit" of the present disclosure, and a length along a conveying path from a contact position at which the feeding roller 2003*a* is in contact with the sheet P2 to the nip position of the sheet P2 by the conveying roller pair 2042 is set as the length necessary for conveying.

In the third embodiment, it has been described that the shortest residual length, which is the length along the conveying path from the detection position of the medium rear end detection sensor 2027 to the cutting position of the sheet P2 by the cutting mechanism 2025, is longer than the length necessary for conveying that is the length along the conveying path from the nip position of the conveying roller pair 2041 to the nip position of the conveying roller pair 2042. However, the present disclosure is not limited thereto.

For example, the shortest residual length may be equal to or shorter than the length necessary for conveying.

In the third embodiment, it has been described that the detection position of the medium rear end detection sensor 2027 is adjacent to the area of the support surface **2021*b*1 of the feeding cassette 2002, in which the cut sheet K2 of a predetermined size is supported, so that it is possible to determine whether the cut sheet K2 accommodated in the feeding cassette 2002 is larger than the predetermined size by using the medium rear end detection sensor 2027. However, the present disclosure is not limited thereto. For example, the determination as to whether the cut sheet K2 accommodated in the feeding cassette 2002 is larger than the predetermined size by using the medium rear end detection sensor 2027** may not be performed.

In the third embodiment, it has been described that the medium presence detection sensor 2031 capable of detecting whether the sheet P2 is located at the position at which the sheet P2 can be fed by the feeding unit 2003 is provided. However, the medium presence detection sensor 2031 may not be provided.

In the third embodiment, it has been described that when it is determined that the roll sheet R2 fixed to the winding core Rc2 has run out of sheet, the recording in the recording unit 2006 is not permitted. However, the present disclosure is not limited thereto. When it is determined that the roll sheet R2 fixed to the winding core Rc2 has run out of sheet, the recording in the recording unit 2006 may be permitted.

In the third embodiment, it has been described that the comparison processing of comparing the length necessary for recording, which is a length of the sheet P2 necessary to complete one recording job from now on, and the unrecorded residual length of the sheet P2 configuring the roll sheet R2 is executed at the time it is determined that the roll sheet R2 whose end portion is not fixed to the winding core Rc2 has run out of sheet. However, the present disclosure is not limited thereto. For example, the comparison processing may not be executed, and when it is determined that the roll sheet R2 whose rear end portion is not fixed to the winding core Rc2 has run out of sheet, the sheet P2 may be discharged without performing the recording in the recording unit 2006, irrespective of the unrecorded residual length. Also, the sheet P2 may not be discharged.

The present disclosure can be applied to all image recording apparatuses including a medium cassette capable of selectively accommodating any recording medium of a roll medium and a single sheet medium.

The roll medium (continuous medium) of the present disclosure may be a cloth.

In addition, although not exemplified one by one, the present disclosure is executed with diverse changes without departing from the spirit thereof.

What is claimed is:

1. A medium cassette capable of selectively accommodating any recording medium of a roll medium having a continuous medium which is wound in a roll shape and a single sheet medium, the medium cassette having a first area and a second area, when accommodated, the roll medium is located in the first area and, when accommodated, the single sheet medium is located in the second area, where at least part of the first area coincides with at least part of the second area.

2. The medium cassette according to claim 1, further comprising:

a support part configured to rotatably support the roll medium by contacting an outer peripheral surface of a lower part of the roll medium accommodated in the medium cassette; and a sensor configured to output a signal as to whether the roll medium is supported on the support part.

3. The medium cassette according to claim 2, wherein the support part is configured to contact the outer peripheral surface at least at a first position and a second position thereof in a direction perpendicular to a rotation axis of the roll medium, a lower end of the roll medium being located between the first position and the second position in the direction perpendicular to the rotation axis of the roll medium.

4. The medium cassette according to claim 3, wherein the support part includes two support rollers which are capable of rotating about rotation axes parallel to the rotation axis of the roll medium while being in contact with the outer peripheral surface of the roll medium at the first position and the second position.

5. The medium cassette according to claim 2, wherein the sensor is a light reflection-type sensor arranged lower than a position at which the support part is in contact with the outer peripheral surface, the light reflection-type sensor being configured to detect the roll medium by detecting a lower end of the roll medium.

6. The medium cassette according to claim 2, further comprising:

a tray capable of selectively accommodating the roll medium and the single sheet medium, wherein the support part includes a support base arranged on a surface of the tray and configured to support the roll medium, wherein the support base has a pair of inclined surfaces each inclined so that a height from the surface increases as a distance from a rotation axis of the roll medium increases in a direction including the surface and perpendicular to the rotation axis of the roll medium, and wherein the sensor is a light reflection-type sensor arranged on one of the inclined surfaces, the light reflection-type sensor being configured to detect the roll medium by detecting the continuous medium which is unwound from the roll medium supported on the support base and is provided along the inclined surface.

7. The medium cassette according to claim 2, wherein the sensor is a pressure sensor configured to detect the roll medium by detecting a pressing force applied by a lower end of the roll medium supported on the support part.

8. An image recording apparatus comprising:

the medium cassette according to claim 1; and an apparatus main body configured to accommodate the medium cassette, wherein the medium cassette further includes:

a support part configured to rotatably support the roll medium by contacting an outer peripheral surface of a lower part of the roll medium accommodated in the medium cassette, and a sensor configured to output a signal as to whether the roll medium is supported on the support part, wherein the apparatus main body is provided therein with:

a conveying mechanism configured to convey the continuous medium of the roll medium or the single sheet medium accommodated in the medium cassette, a recording unit configured to record an image on the continuous medium or the single sheet medium which is conveyed by the conveying mechanism, and a controller configured to control the conveying mechanism and the recording unit, and wherein the controller permits image recording on the continuous medium of the roll medium in a case where it is determined based on the signal that the roll medium is supported on the support part, and does not permit image recording on the continuous medium of the roll medium in a case where it is determined based on the signal that the roll medium is not supported on the support part.

9. An image recording apparatus comprising:

the medium cassette according to claim 1;

a recording unit configured to record an image on the roll medium or the single sheet medium; and an optical sensor provided above the medium cassette and including a light-emitting unit and a light-receiving unit, wherein the optical sensor is arranged so that an optical axis of emission light from the light-emitting unit is inclined at an inclination at which reflected light from the single sheet medium is not received by the light-receiving unit and reflected light from the roll medium is received by the light-receiving unit.

10. The image recording apparatus according to claim 9, wherein the optical sensor is arranged so that the optical axis forms a predetermined acute angle θ with respect to a direction perpendicular to a sheet surface of the single sheet medium.

11. The image recording apparatus according to claim 9, wherein the medium cassette includes a housing configuring an outer shell of the medium cassette and having therein a roll having the roll medium, wherein the housing has an opening which is provided on one side in a front and rear direction and through which an inside and an outside of the housing communicate with each other, wherein the opening is positioned further to the one side than the roll in the front and rear direction, and wherein the optical sensor is positioned further to another side than the opening and further to the one side than the roll in the front and rear direction, the another side being opposite to the one side.

12. The image recording apparatus according to claim 11, further comprising:

a feeder roller arranged in the medium cassette, positioned further to the other side than the roll in the front and rear direction, and configured to convey the continuous medium unwound from the roll medium toward the recording unit.

13. The image recording apparatus according to claim 9, further comprising:

a controller, wherein the controller is configured to:

determine that the roll medium is accommodated in the medium cassette in a case where the light-receiving unit receives reflected light, and determine that the single sheet medium is accommodated in the medium cassette in a case where the light-receiving unit does not receive reflected light; and determine a residual amount of the roll medium on the basis of an amount of received light received by the light-receiving unit in a case where the determining determines that the roll medium is accommodated in the medium cassette.

14. The image recording apparatus according to claim 13, further comprising:

an adjustment mechanism configured to variably adjust an inclination of the optical axis of the optical sensor, wherein, in a case where the determining determines that the single sheet medium is accommodated in the medium cassette, the controller is further configured to:

adjust the inclination of the optical axis by controlling the adjustment mechanism so that the light-receiving unit receives reflected light from the single sheet medium, and determine a residual amount of the single sheet medium based on an amount of received light received by the light-receiving unit which is received after the adjusting of the inclination of the optical axis is performed.

15. The image recording apparatus according to claim 14, wherein the medium cassette further has a third area in which a recorded sheet of a minimum size on which an image can be recorded is located, the second area and the third area overlapping each other in the front and rear direction as seen from above, and wherein the adjusting of the inclination of the optical axis includes adjusting the inclination of the optical axis so that the emission light from the light-emitting unit is emitted toward the third area.

16. The image recording apparatus according to claim 14, wherein the controller is further configured to:

adjust the inclination of the optical axis by controlling the adjustment mechanism according to a change in residual amount of the roll medium, in a case where the determining determines that the roll medium is accommodated in the medium cassette.

17. The image recording apparatus according to claim 9, wherein the medium cassette is provided to be detachably mounted to an apparatus main body including the recording unit and the optical sensor.

18. The image recording apparatus according to claim 17, wherein the apparatus main body includes a protective rib provided above the medium cassette and arranged further to one side than the optical sensor in a front and rear direction, and wherein a position of a lower end of the protective rib in an upper and lower direction is lower than a position of a lower end of the optical sensor in the upper and lower direction.

19. An image recording apparatus comprising:

the medium cassette according to claim 1;

a feeding unit configured to feed the recording medium from the medium cassette; and a recording unit configured to record an image on the recording medium fed from the medium cassette by the feeding unit, wherein the medium cassette includes:

a support part configured to rotatably support the roll medium by contacting an outer peripheral surface of a lower part of the roll medium accommodated in the medium cassette;

a first sensor configured to detect whether the roll medium is supported on the support part; and a second sensor configured to detect whether the recording medium exists at a detection position, the detection position being located on a path which is between the support part and the feeding unit and through which the continuous medium unwound from the roll medium passes.

20. The image recording apparatus according to claim 19, further comprising:

a cutting mechanism configured to cut the recording medium fed by the feeding unit; and a first conveying unit arranged upstream of the cutting mechanism with respect to a feeding direction of the recording medium by the feeding unit, the first conveying unit being configured to apply a conveying force in the feeding direction to the recording medium by contacting the recording medium; and a second conveying unit arranged downstream of the cutting mechanism with respect to the feeding direction of the recording medium by the feeding unit, the second conveying unit configured to apply a conveying force in the feeding direction to the recording medium by contacting the recording medium, wherein a length along a conveying path of the recording medium by the feeding unit, the first conveying unit and the second conveying unit from the detection position of the second sensor to a cutting position of the recording medium by the cutting mechanism is longer than a length along the conveying path from a first contact position at which the first conveying unit is in contact with the recording medium to a second contact position at which the second conveying unit is in contact with the recording medium.

21. The image recording apparatus according to claim 19, wherein the medium cassette has a support surface configured to support the single sheet medium, and wherein the detection position of the second sensor is a position adjacent to an area of the support surface in which the single sheet medium of a predetermined size is supported.

22. The image recording apparatus according to claim 19, further comprising:

a controller, wherein the controller is configured to:

determine that the roll medium is accommodated in the medium cassette in a case where an output signal from the first sensor is a signal indicating that the roll medium is supported on the support part, and determine that the single sheet medium is accommodated in the medium cassette in a case where the output signal from the first sensor is a signal indicating that the roll medium is not supported on the support part, and determine that the roll medium has run out (i) in a case where the output signal from the first sensor is switched to the signal indicating that the roll medium is not supported on the support part while the recording medium is fed by the feeding unit after the determining determines that the roll medium is accommodated in the medium cassette and (ii) in a case where an output signal from the second sensor is switched from a signal indicating that there is the recording medium to a signal indicating that there is no recording medium while the recording medium is fed by the feeding unit after the determining determines that the roll medium is accommodated in the medium cassette.

23. The image recording apparatus according to claim 22, further comprising:

a third sensor configured to detect whether the recording medium is located at a position at which the recording medium is capable of being fed by the feeding unit, wherein the controller is further configured to:

determine that the roll medium is set in the medium cassette in a state where the roll medium is capable of being fed by the feeding unit, in a case where an output signal from the third sensor is a signal indicating that the recording medium is located at the position at which the recording medium is capable of being fed by the feeding unit, after the determining determines that the roll medium is accommodated in the medium cassette.

24. The image recording apparatus according to claim 22 wherein the controller does not permit recording by the recording unit in a case where the determining determines that the roll medium has run out based on the output signal from the first sensor being switched to the signal indicating that the roll medium is not supported on the support part.

25. The image recording apparatus according to claim 22, wherein the controller is further configured to:

compare a necessary length and a residual length at a time when the determining determines that the roll medium has run out based on the output signal from the second sensor being switched from the signal indicating that there is the recording medium to the signal indicating that there is no recording medium, the necessary length being a length of the recording medium necessary for completing one recording job to be recorded on the same recording medium by the recording unit from now on, and the residual length being a length of a part of the continuous medium of the roll medium on which an image is not recorded yet by the recording unit, and wherein the controller permits recording by the recording unit in a case where the controller determines that the residual length is equal to or longer than the necessary length as a result of the comparing of the necessary length and the residual length, and the controller does not permit recording by the recording unit in a case where the controller determines that the residual length is shorter than the necessary length as a result of the comparing of the necessary length and the residual length.

26. The image recording apparatus according to claim 25, further comprising:

a discharge part configured to discharge the recording medium fed from the medium cassette by the feeding unit, wherein the controller causes the discharge part to discharge the recording medium in a case where the controller determines that the residual length is shorter than the necessary length as a result of the comparing of the necessary length and the residual length.

27. The medium cassette according to claim 1, further comprising a supporting surface configured to support the roll medium, when accommodated in the medium cassette and rolled out from a roll.

28. The medium cassette according to claim 2, wherein the sensor is positioned to sense a medium in an area where at least part of the first area coincides with at least part of the second area.

* * * * *